(12) United States Patent
Miyake

(10) Patent No.: US 11,747,938 B2
(45) Date of Patent: Sep. 5, 2023

(54) TOUCH PANEL

(71) Applicant: SEMICONDUCTOR ENERGY LABORATORY CO., LTD., Atsugi (JP)

(72) Inventor: Hiroyuki Miyake, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 74 days.

(21) Appl. No.: 16/861,280

(22) Filed: Apr. 29, 2020

(65) Prior Publication Data

US 2020/0257402 A1  Aug. 13, 2020

Related U.S. Application Data

(63) Continuation of application No. 14/882,854, filed on Oct. 14, 2015, now abandoned.

(30) Foreign Application Priority Data

Oct. 17, 2014 (JP) .................. 2014-212646

(51) Int. Cl.
  *G06F 3/041* (2006.01)
  *G06F 3/044* (2006.01)
(52) U.S. Cl.
  CPC ........ *G06F 3/04166* (2019.05); *G06F 3/0412* (2013.01); *G06F 3/0443* (2019.05); *G06F 3/0446* (2019.05); *G06F 3/0448* (2019.05); *G06F 3/04164* (2019.05); *G06F 2203/04112* (2013.01)

(58) Field of Classification Search
  CPC combination set(s) only.
  See application file for complete search history.

(56) References Cited

U.S. PATENT DOCUMENTS 4,986,637 A * 1/1991 Yamaguchi ....... G02F 1/133514
                                                     345/32
6,972,753 B1  12/2005 Kimura et al.
7,399,991 B2   7/2008 Seo et al.
(Continued)

FOREIGN PATENT DOCUMENTS

EP         2530560 A     12/2012
JP     2000-172444 A      6/2000
(Continued)

*Primary Examiner* — William Boddie
*Assistant Examiner* — Alecia D English
(74) *Attorney, Agent, or Firm* — Fish & Richardson P.C.

(57) ABSTRACT

A touch panel with higher sensing accuracy or higher detection sensitivity is provided. The touch panel includes a first conductive layer, a second conductive layer, a plurality of display elements, and a scan line. In a plan view, the first conductive layer has an outline including a first portion that is linear and parallel to a first direction. In the plan view, the second conductive layer has an outline including a second portion that is linear and parallel to the first direction. The first portion and the second portion face each other. The display element is in a position not overlapping with the first conductive layer nor the second conductive layer. The scan line has a portion extending in a second direction. An angle between the first direction and the second direction is greater than or equal to 30° and less than or equal to 60°.

13 Claims, 35 Drawing Sheets

(56) References Cited

U.S. PATENT DOCUMENTS

| | | | |
|---|---|---|---|
| 8,367,440 B2 | 2/2013 | Takayama et al. | |
| 8,674,972 B2 | 3/2014 | Kurokawa et al. | |
| 8,823,893 B2 | 9/2014 | Yamazaki | |
| 8,917,252 B2 | 12/2014 | Kuriki | |
| 9,041,869 B2 | 5/2015 | Kim et al. | |
| 9,092,095 B2 | 7/2015 | Nakanishi et al. | |
| 9,268,358 B2 | 2/2016 | Kim et al. | |
| 9,400,576 B2 | 7/2016 | Chen et al. | |
| 9,401,712 B2 | 7/2016 | Yamagishi et al. | |
| 9,442,330 B2 | 9/2016 | Huo | |
| 9,454,279 B2 | 9/2016 | Nakanishi et al. | |
| 9,652,075 B2 | 5/2017 | Nakanishi et al. | |
| 9,684,400 B2 | 6/2017 | Liu | |
| 9,684,423 B2 | 6/2017 | Kuriki | |
| 9,851,860 B2 | 12/2017 | Kuriki | |
| 9,939,978 B2 | 4/2018 | Chen et al. | |
| 10,025,425 B2 | 7/2018 | Nakanishi et al. | |
| 10,031,635 B2 | 7/2018 | Kuriki | |
| 10,055,080 B2 | 8/2018 | Kuriki | |
| 10,268,330 B2 | 4/2019 | Kuriki | |
| 10,275,085 B2 | 4/2019 | Nakanishi et al. | |
| 10,817,108 B2 | 10/2020 | Nakanishi et al. | |
| 2009/0002337 A1 | 1/2009 | Chang | |
| 2011/0148781 A1* | 6/2011 | Chen | G06F 3/0412 345/173 |
| 2011/0174957 A1* | 7/2011 | Okada | H01L 27/14603 250/208.1 |
| 2011/0210935 A1 | 9/2011 | Chuang | |
| 2011/0290631 A1 | 12/2011 | Kuriki | |
| 2011/0310033 A1 | 12/2011 | Liu et al. | |
| 2012/0032898 A1 | 2/2012 | Li et al. | |
| 2012/0056820 A1* | 3/2012 | Corbridge | G06F 3/0443 345/173 |
| 2012/0153970 A1 | 6/2012 | Mignard et al. | |
| 2012/0206395 A1* | 8/2012 | Misaki | G06F 3/0446 345/173 |
| 2013/0257798 A1 | 10/2013 | Tamura et al. | |
| 2013/0321333 A1 | 12/2013 | Tamura | |
| 2013/0321366 A1 | 12/2013 | Kozuma et al. | |
| 2014/0043546 A1 | 2/2014 | Yamazaki et al. | |
| 2014/0057043 A1* | 2/2014 | Cok | G06F 3/0446 427/66 |
| 2014/0240617 A1 | 8/2014 | Fukutome et al. | |
| 2014/0267947 A1 | 9/2014 | Yeh et al. | |
| 2014/0285732 A1 | 9/2014 | Tanabe et al. | |
| 2014/0306260 A1 | 10/2014 | Yamazaki et al. | |
| 2014/0313434 A1* | 10/2014 | Kim | G02F 1/13338 349/12 |
| 2014/0320438 A1 | 10/2014 | Yurlov et al. | |
| 2014/0327846 A1 | 11/2014 | Hata et al. | |
| 2015/0009407 A1* | 1/2015 | Lu | H04N 9/04557 348/599 |
| 2015/0015532 A1* | 1/2015 | Choung | G06F 3/0445 345/174 |
| 2015/0015590 A1* | 1/2015 | Jeong | G09G 3/2003 345/502 |
| 2015/0042908 A1 | 2/2015 | Wang et al. | |
| 2015/0062525 A1 | 3/2015 | Hirakata | |
| 2015/0077656 A1 | 3/2015 | Ito et al. | |
| 2015/0144920 A1 | 5/2015 | Yamazaki et al. | |
| 2015/0255518 A1 | 9/2015 | Watanabe et al. | |
| 2016/0011713 A1 | 1/2016 | Kida | |
| 2019/0073067 A1 | 3/2019 | Kuriki | |

FOREIGN PATENT DOCUMENTS

| | | |
|---|---|---|
| JP | 2002-324673 A | 11/2002 |
| JP | 2003-174153 A | 6/2003 |
| JP | 2006-234870 A | 9/2006 |
| JP | 2010-250770 A | 11/2010 |
| JP | 2011-237839 A | 11/2011 |
| JP | 2012-256819 A | 12/2012 |
| JP | 2013-246825 A | 12/2013 |
| JP | 2014-056095 A | 3/2014 |
| JP | 2014-056564 A | 3/2014 |
| JP | 2014-508337 | 4/2014 |
| JP | 2014-086705 A | 5/2014 |
| JP | 2014-525098 | 9/2014 |
| KR | 2014-0031373 A | 3/2014 |
| WO | WO-2013/012667 | 1/2013 |
| WO | WO-2013/157526 | 10/2013 |

* cited by examiner writing period 3510
3511 sensing period 3510
3511

FIG. 32A
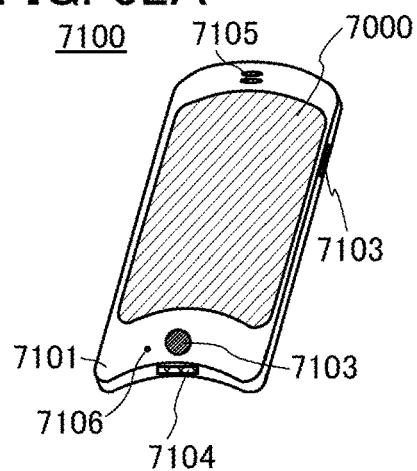
FIG. 32B
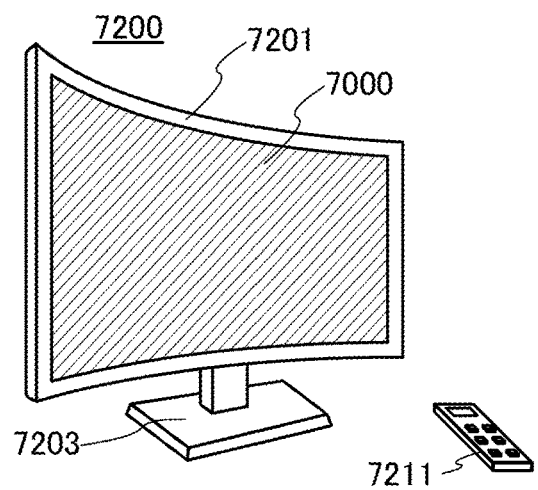
FIG. 32C1
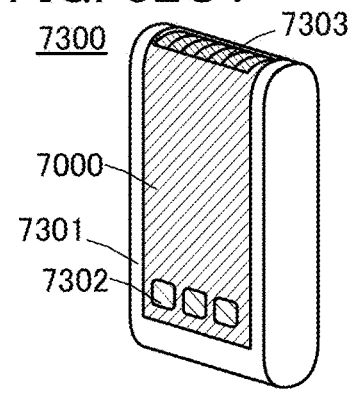
FIG. 32D
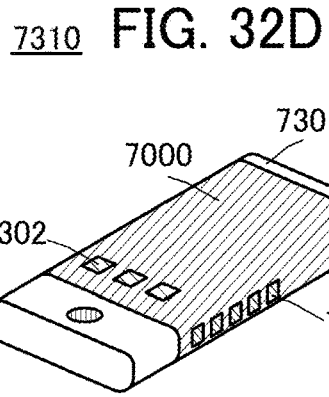
FIG. 32E
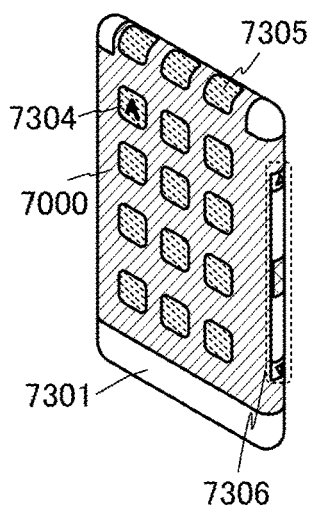
FIG. 32C2
FIG. 32F
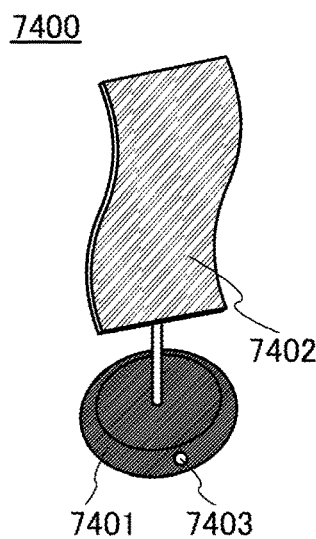
FIG. 32G
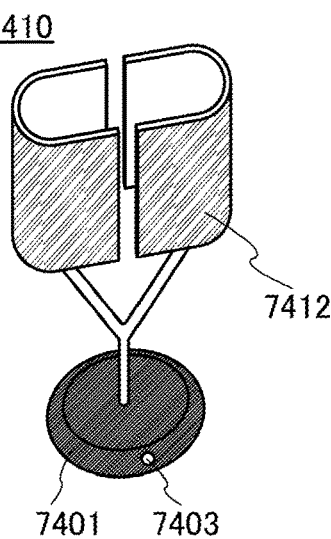
FIG. 32H
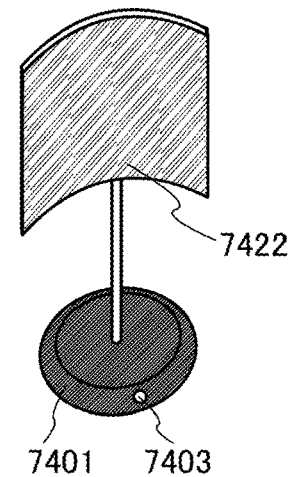

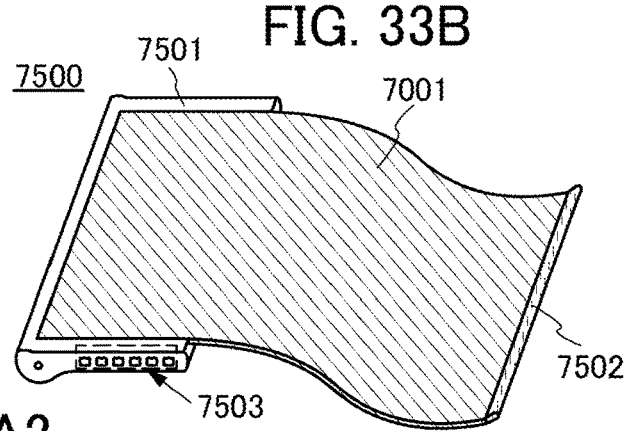
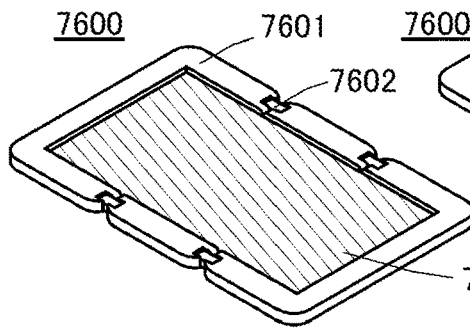
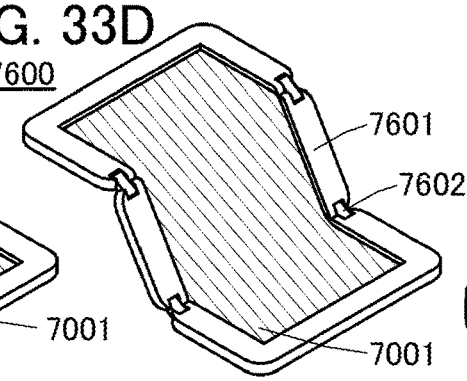
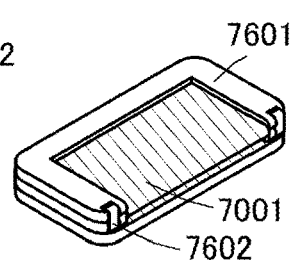
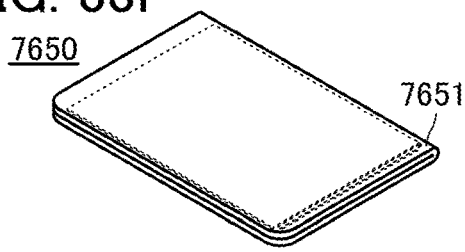
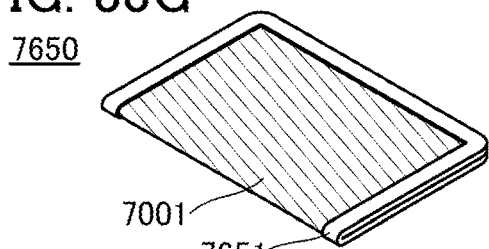
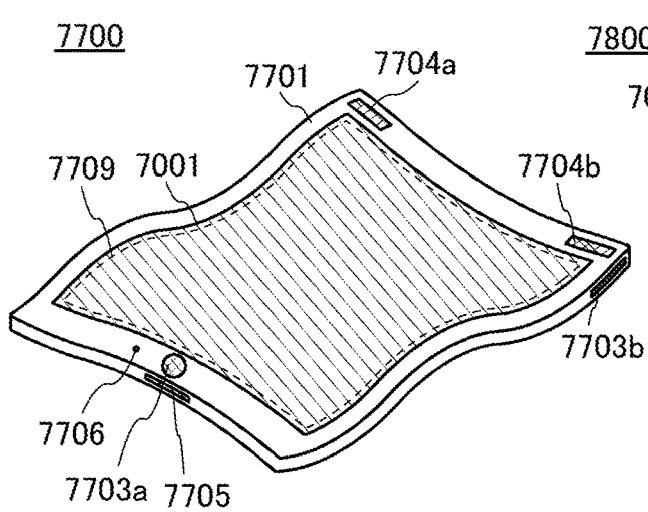
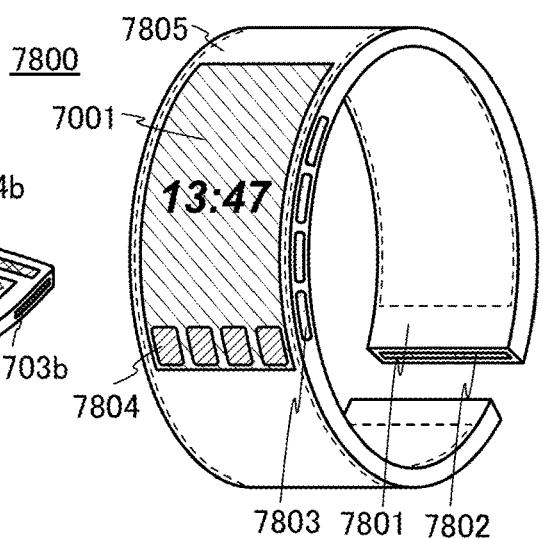

TOUCH PANEL

CROSS-REFERENCE TO RELATED APPLICATIONS

This application is a continuation of U.S. application Ser. No. 14/882,854, filed Oct. 14, 2015, now pending, which claims the benefit of a foreign priority application filed in Japan as Serial No. 2014-212646 on Oct. 17, 2014, both of which are incorporated by reference.

BACKGROUND OF THE INVENTION

1. Field of the Invention

One embodiment of the present invention relates to an input device. One embodiment of the present invention relates to a display device. Further, one embodiment of the present invention relates to an input/output device. In particular, one embodiment of the present invention relates to a touch panel.

Note that one embodiment of the present invention is not limited to the above technical field. Examples of the technical field of one embodiment of the present invention include a semiconductor device, a display device, a light-emitting device, a power storage device, a storage device, an electronic device, a lighting device, an input device, an input/output device, a driving method thereof, and a manufacturing method thereof.

In this specification and the like, a semiconductor device generally means a device that can function by utilizing semiconductor characteristics. A semiconductor element such as a transistor, a semiconductor circuit, an arithmetic device, and a memory device are each an embodiment of a semiconductor device. An imaging device, a display device, a liquid crystal display device, a light-emitting device, an input device, an input/output device, an electro-optical device, a power generation device (including a thin film solar cell, an organic thin film solar cell, and the like), and an electronic device may each include a semiconductor device.

2. Description of the Related Art

In recent years, a display device provided with a touch sensor as a position-input device has been in practical use. A display device provided with a touch sensor is called a touch panel, a touch screen, or the like (hereinafter also referred to simply as a touch panel). For example, a smartphone and a tablet terminal are examples of a portable information terminal provided with a touch panel.

Examples of the display device include, typically, a liquid crystal display device, a light-emitting device including a light-emitting element such as an organic electroluminescent (EL) element or a light-emitting diode (LED), and electronic paper performing display by an electrophoretic method or the like.

For example, in a basic structure of an organic EL element, a layer containing a light-emitting organic compound is provided between a pair of electrodes. By voltage application to this element, the light-emitting organic compound can emit light. A display device including such an organic EL element needs no backlight which is necessary for liquid crystal display devices and the like; therefore, thin, lightweight, high contrast, and low power consumption display devices can be obtained. Patent Document 1, for example, discloses an example of a display device using organic EL elements.

In a touch panel, a pressure-sensitive sensor array or a capacitive sensor array is provided so as to overlap with a display panel, for example; by touching a substrate of the sensor array with a finger or an input pen (also referred to as a stylus), the touched position is sensed.

Patent Document 2 discloses a structure of a touch panel in which a touch sensor is provided on a display screen of an electroluminescence display device.

REFERENCE

Patent Document

[Patent Document 1] Japanese Published Patent Application No. 2002-324673
[Patent Document 2] Japanese Published Patent Application No. 2000-172444

SUMMARY OF THE INVENTION

In order to obtain positional information of an object touching a touch sensor or a touch panel more precisely, a touch sensor with higher sensitivity is required.

An object of one embodiment of the present invention is to provide an input device or an input/output device with higher sensing accuracy. Another object is to provide an input device or an input/output device with higher detection sensitivity. Another object is to provide a novel input device or a novel input/output device.

Note that the descriptions of these objects do not disturb the existence of other objects. In one embodiment of the present invention, there is no need to achieve all the objects. Other objects can be derived from the description of the specification, the drawings, the claims, and the like.

One embodiment of the present invention is a touch panel including a first conductive layer, a second conductive layer, a plurality of display elements, and a scan line. In a plan view, the first conductive layer has an outline including a first portion that is linear and parallel to a first direction. In the plan view, the second conductive layer has an outline including a second portion that is linear and parallel to the first direction. The first portion and the second portion face each other. The display element is in a position not overlapping with the first conductive layer nor the second conductive layer. The scan line has a portion extending in a second direction. An angle between the first direction and the second direction is greater than or equal to 30° and less than or equal to 60°.

In the above touch panel, the first conductive layer and the second conductive layer each have a lattice shape where strips parallel to the first direction and strips parallel to a direction perpendicular to the first direction intersect with each other with openings between them. The opening and the display element preferably overlap with each other.

In the above touch panel, the display element preferably has a polygonal shape whose two sides are parallel to the first direction in the plan view.

The above touch panel preferably includes a first substrate and a second substrate that sandwich the first conductive layer, the second conductive layer, the display element, and the scan line. It is preferable that a light-blocking layer capable of blocking visible light be further included. In addition, it is preferable that the first substrate be provided with the display element and the scan line, and the second substrate be provided with the first conductive layer, the second conductive layer, and the light-blocking layer. Here, the light-blocking layer is preferably between the first conductive layer and the second substrate, and between the second conductive layer and the second substrate.

In the above touch panel, the first conductive layer and the second conductive layer are preferably in the same plane.

In the above touch panel, a distance between the first portion and the second portion is preferably greater than or equal to 1 μm and less than or equal to 10 mm.

Another embodiment of the present invention is a touch panel module including the above touch panel and an FPC.

Another embodiment of the present invention is an electronic device including the above touch panel or the above touch panel module, and at least one of an antenna, a button, a battery, a speaker, a microphone, and a lens.

According to one embodiment of the present invention, an input device or an input/output device with higher sensing accuracy can be provided. Alternatively, an input device or an input/output device with higher detection sensitivity can be provided. Alternatively, a novel input device or a novel input/output device can be provided.

Note that the descriptions of these effects do not disturb the existence of other effects. One embodiment of the present invention does not necessarily achieve all the effects listed above. Other effects can be derived from the description of the specification, the drawings, the claims, and the like.

BRIEF DESCRIPTION OF THE DRAWINGS

FIGS. 32A to 32H illustrate examples of electronic devices and lighting devices of one embodiment.

FIGS. 33A1, 33A2, 33B, 33C, 33D, 33E, 33F, 33G, 33H, and 33I illustrate examples of electronic devices of one embodiment.

DETAILED DESCRIPTION OF THE INVENTION

Figure 1A:
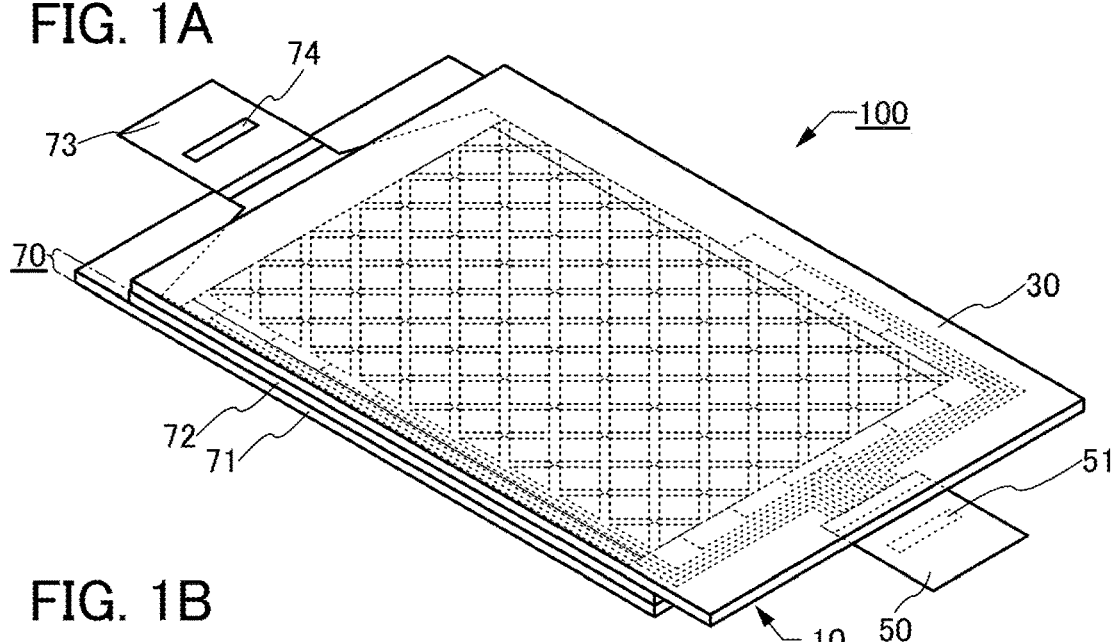
FIGS. 1A and 1B illustrate a structure example of a touch panel of one embodiment.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and description of such portions is not repeated. Further, the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, embodiments of the present invention are not limited to such a scale.

Note that in this specification and the like, ordinal numbers such as "first", "second", and the like are used in order to avoid confusion among components and do not limit the number.

A transistor is a kind of semiconductor elements and can achieve amplification of current or voltage, switching operation for controlling conduction or non-conduction, or the like. A transistor in this specification is an insulated-gate field effect transistor (IGFET) or a thin film transistor (TFT), for example.

Embodiment 1

In this embodiment, a structure example of an input device (a touch sensor) of one embodiment of the present invention, and a structure example of an input/output device (a touch panel) including the input device of one embodiment of the present invention and a display device (a display panel) are described with reference to drawings.

In the description below, a capacitive touch sensor is used as the touch sensor of one embodiment of the present invention.

Note that in this specification and the like, a touch panel has a function of displaying or outputting an image or the like on or to a display surface and a function as a touch sensor capable of detecting contact or proximity of an object such as a finger or a stylus on or to the display surface. Therefore, the touch panel is an embodiment of an input/output device.

In this specification and the like, a structure in which a connector such as a flexible printed circuit (FPC) or a tape carrier package (TCP) is attached to a substrate of a touch panel, or a structure in which an integrated circuit (IC) is directly mounted on a substrate by a chip on glass (COG) method is referred to as a touch panel module or simply referred to as a touch panel in some cases.

A capacitive touch sensor that can be used for one embodiment of the present invention includes a pair of conductive layers. A capacitor is formed in the pair of conductive layers. The capacitance of the pair of conductive layers changes when an object touches or gets close to the pair of conductive layers. Utilizing this effect, detection can be conducted.

Examples of the capacitive touch sensor are a surface capacitive touch sensor and a projected capacitive touch sensor. Examples of a projected capacitive touch sensor are a self-capacitive touch sensor and a mutual capacitive touch sensor. The use of a mutual capacitive touch sensor is preferable because multiple points can be detected simultaneously.

The two conductive layers each have an outline including linear portions when viewed in a plan view. The linear portions of the two conductive layers face and are parallel to each other. With such a structure, the capacitance between the two conductive layers can be increased. In a portion where the two conductive layers face and are parallel to each other, electrical lines of force generated when a potential difference is applied between the two conductive layers are distributed at a uniform density. Therefore, the difference of detection sensitivity depending on positions can be reduced. Thus, a touch sensor with higher sensing accuracy can be obtained.

The touch panel of one embodiment of the present invention includes the touch sensor and a display panel (a display device) that displays an image. The touch sensor is provided to overlap with a display surface of the display panel.

In addition, it is preferable that a display element of the display panel and the pair of conductive layers of a touch sensor be provided without overlapping with each other. With such a structure, a decrease of luminance of an image displayed on the touch panel can be prevented, and the touch panel can have higher visibility. Furthermore, power consumption can be reduced.

The direction of the linear portions of the pair of conductive layers is preferably inclined at approximately 45° to a horizontal direction or a perpendicular direction of a display image displayed on the display panel. For example, an angle between an extending direction of a scan line (also referred to as a gate line) in the display panel and a direction of the linear portion of the conductive layer is preferably greater than or equal to 40° and less than or equal to 50°.

The pair of conductive layers preferably has a lattice (mesh) shape; such a structure can increase the conductivity of the conductive layers. When the pair of conductive layers has a lattice shape, it is preferable that there be portions extending in a direction parallel to the linear portion and portions extending in a direction perpendicular to the linear portion in the lattice shape.

When the pair of conductive layers has a lattice shape, an opening of the lattice and the display element preferably overlap with each other in a plan view. Here, the display element preferably has a polygonal outline including a side parallel to the extending direction of the portion of the lattice in a plan view. Such a structure will increase an aperture ratio. Alternatively, the display element preferably has a polygonal outline including two sides parallel to the extending direction of the linear portion of the conductive layer or has an outline of closed line including a linear portion in a plan view.

Specifically, the following structure can be employed, for example.

Structure Example

As an example of an input/output device of one embodiment of the present invention, structure examples of a touch panel are described below with reference to drawings.

[Structure Example of Touch Panel]

Figure 1B:
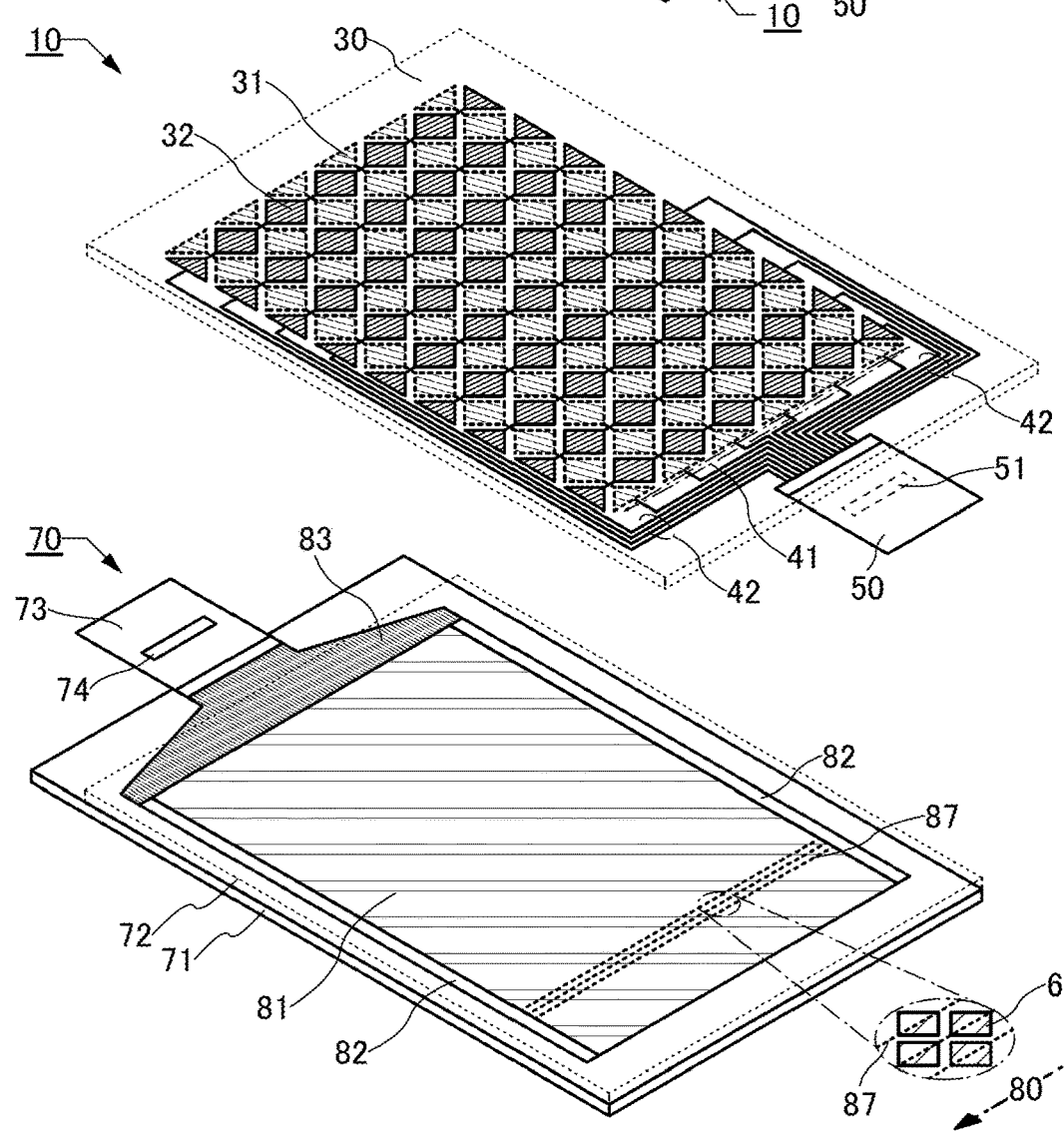

FIG. 1A is a schematic perspective view of a touch panel 100 of one embodiment of the present invention. FIG. 1B is a schematic perspective developed view of FIG. 1A. Note that only main components are illustrated for simplicity. In FIG. 1B, as to some components (a substrate 30, a substrate 72, and the like), only their outlines are shown by broken lines.

The touch panel 100 includes an input device 10 and a display panel 70 that overlap with each other.

In this example, the input device 10 includes the substrate 30. The substrate 30 includes an electrode 31, an electrode 32, a plurality of wirings 41, and a plurality of wirings 42. In addition, an FPC 50 to which the plurality of wirings 41 and the plurality of wirings 42 are electrically connected is attached to the substrate 30. An IC 51 is provided over the FPC 50.

As the input device 10, a capacitive touch sensor can be used, for example. An example of using a projected capacitive touch sensor will be described below.

As the input device 10, any of various sensors that can sense the proximity or contact of an object such as a finger or a stylus can be used.

Note that a specific structure of the input device 10 will be described later.

In this example, the display panel 70 includes a substrate 71 and a substrate 72 that face each other. A display portion 81, a driver circuit 82, a wiring 83 and the like are provided over the substrate 71. An FPC 73 electrically connected to the wiring 83 is provided to the substrate 71. An IC 74 is provided over the FPC 73.

The display portion 81 is a region where an image is displayed, and includes a plurality of pixels. FIG. 1B is a schematic view illustrating enlarged part of the display portion 81. The pixel includes at least one display element 60. The pixel preferably includes a transistor and the display element 60. As the display element 60, typically, a light-emitting element such as an organic EL element, a liquid crystal element, or the like can be used.

For the driver circuit 82, a circuit that can drive the pixels in the display portion 81, such as a scan line driver circuit or a signal line driver circuit, can be used. Here, an example where a scan line driver circuit is used as the driver circuit 82 is described.

The wiring 83 is capable of transferring a signal or an electric power to the display portion 81 or the driver circuit 82. The signal or the electric power is input from the outside or the IC 74 to the wiring 83 through the FPC 73.

The display portion 81 includes a plurality of scan lines (also referred to as gate lines) 87 that are electrically connected to the driver circuit 82. The scan line 87 is a wiring that is electrically connected to a gate of a transistor in the pixel. The driver circuit 82 can sequentially supply the scan lines 87 with signals each of which selects a plurality of pixels electrically connected to the scan line 87.

Here, an extending direction of the scan line 87 is shown as a direction 80 with an arrow in FIG. 1B. In the structure shown in FIG. 1B, the direction 80 is parallel to a direction perpendicular to a side (outline) where the driver circuit 82 of the display portion 81 is provided. When the outline of the display portion 81 is not a rectangle or a square, the direction 80 is not perpendicular to the outline of the display portion 81 in some cases. The scan line 87 is not necessarily linear, and may have a shape partly curving or twisting depending on the structure of the pixels. At this time, the direction 80 corresponds to a direction of a line connecting two end points of the scan line 87. Alternatively, the direction 80 corresponds to a direction of a line connecting two end portions of part of the scan line 87 that overlaps with the display portion 81. Alternatively, the direction 80 can be regarded as a direction parallel to an arrangement direction of the pixels (or subpixels) electrically connected to one scan line 87.

FIGS. 1A and 1B show an example where the IC 74 is mounted on the FPC 73 by a chip on film (COF) method. An IC serving as a scan line driver circuit, a signal line driver circuit, or the like can be used for the IC 74. Note that it is possible that the IC 74 is not provided when, for example, the display panel 70 includes circuits serving as a scan line driver circuit and a signal line driver circuit and when the circuits serving as a scan line driver circuit and a signal line driver circuit are provided outside and a signal for driving the display panel 70 is input through the FPC 73. Alternatively, the IC 74 may be directly mounted on the substrate 71 by a COG method or the like.

[Structure Example of Input Device]

Figure 2A:
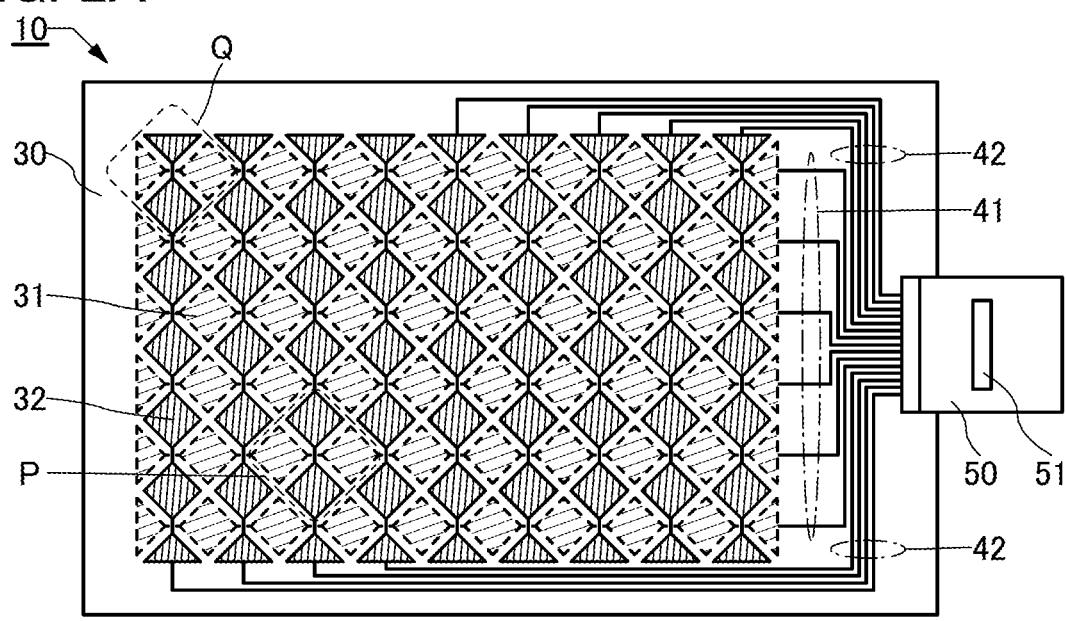
FIGS. 2A and 2B illustrate a structure example of an input device of one embodiment.

FIG. 2A is a schematic top plan view of the input device 10. The input device 10 includes the plurality of electrodes 31, the plurality of electrodes 32, the plurality of wirings 41, and the plurality of wirings 42 over the substrate 30. In addition, the substrate 30 is provided with the FPC 50 that is electrically connected to the plurality of wirings 41 and the plurality of wirings 42. FIG. 2A shows an example where the IC 51 is mounted on the FPC 50. Note that the outline of the electrode 32 and that of the electrode 31 are shown by the solid line and the broken line, respectively, to be distinguished clearly.

In FIG. 2A, the electrode 31 is positioned to extend horizontally. The electrode 32 is positioned to extend in a direction intersecting with the electrode 31. As shown in FIG. 2A, it is preferable that the electrode 31 and the electrode 32 be perpendicular to each other.

Each of the plurality of wirings 41 is electrically connected to one of the electrodes 31. Each of the plurality of wirings 42 is electrically connected to one of the electrodes 32.

The IC 51 includes a circuit for driving the input device 10. The IC 51 includes, for example, a circuit for achieving a driving method, such as a mutual capacitive method or a self-capacitive method.

Figure 2B:
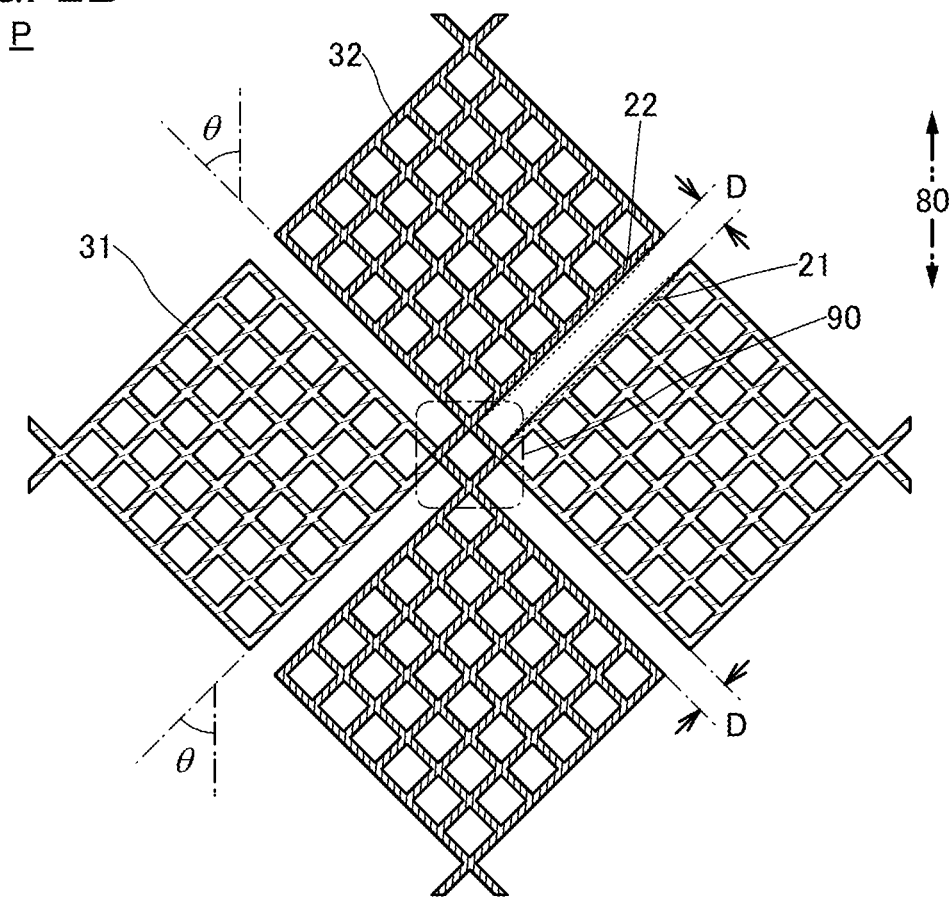

FIG. 2B is an enlarged view of a region P of FIG. 2A. The electrode 31 and the electrode 32 overlap with and intersect with each other at an intersection portion 90. At the intersection portion 90, an insulator is provided between the electrodes 31 and 32 in order to prevent the electrodes 31 and 32 from being short-circuited.

FIG. 2B shows the case where the electrode 32 locally has the same shape as the 90°-rotated electrode 31.

In a plan view, a plurality of rhombic patterns is connected in line, horizontally or vertically, to make the electrode 31 or the electrode 32. At this time, each rhombic pattern is preferably a square as shown in FIG. 2B, whereby a pitch of rhombic patterns of the electrode 31 arranged in a horizontal direction and a pitch of rhombic patterns of the electrode 32 arranged in a vertical direction in a view can be equal to each other. In this way, detecting points can be arranged at equal intervals in a sensing region of the input device 10, so that sensing accuracy can be increased.

Part of the outline of the electrode 31 has a linear portion 21. Part of the outline of the electrode 32 has a linear portion 22. The electrodes 31 and 32 are positioned such that the linear portions 21 and 22 face and are parallel to each other. With such a structure, a constant gap is obtained between the electrodes 31 and 32, and the length of the facing sides of the two electrodes can be increased. Therefore, the capacitance formed between the two electrodes can be increased. In a portion where the two electrodes face each other, electrical lines of force generated when a potential difference is applied between the two electrodes are distributed at a uniform density. Therefore, the difference of detection sensitivity depending on positions can be reduced. Thus, a touch sensor with higher sensing accuracy can be obtained.

Figure 3:
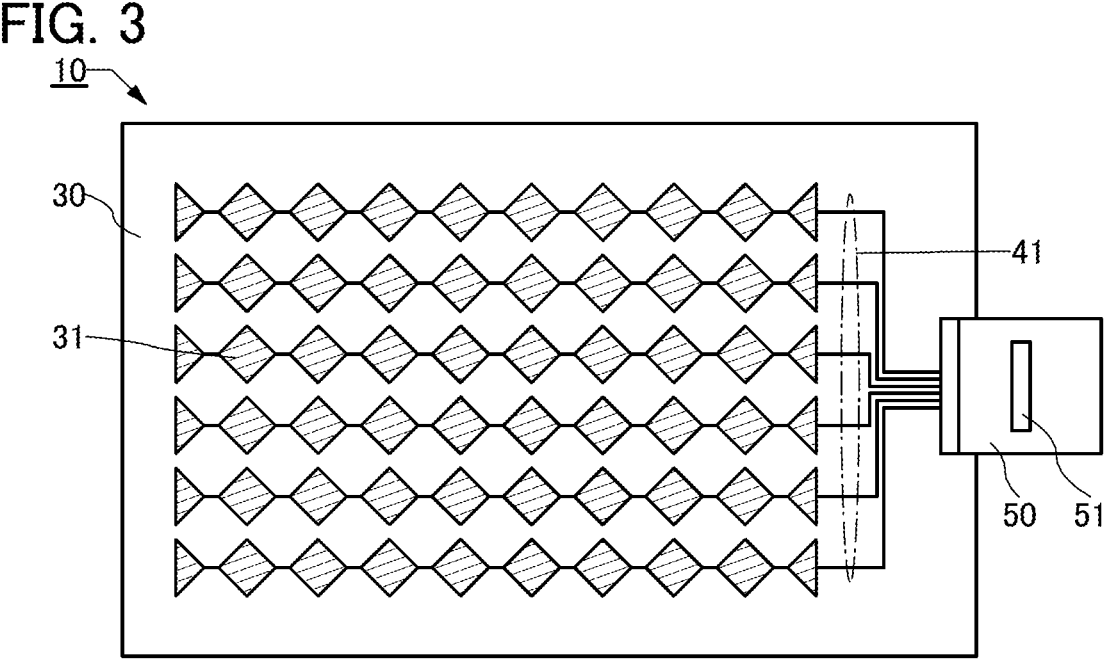
FIG. 3 illustrates a structure example of an input device of one embodiment.

As shown in FIG. 3, either the electrodes 31 or the electrodes 32 may be provided over the substrate 30. At this time, the other electrode may be provided on or in the display panel 70. For example, a common electrode of a liquid crystal element may be utilized as the electrode 31 or the electrode 32. Though the electrode 31 is provided over the substrate 30 in FIG. 3, the electrode 32 may be provided over the substrate 30.

FIG. 2B illustrates the direction 80 shown in FIG. 1B that is the extending direction of the scan line 87. When the linear portions 21 and 22 are parallel to each other, an angle between the direction 80 and the linear portion 21 and an angle between the direction 80 and the linear portion 22 are equal to each other. Here, an angle between the direction 80 and the linear portion 21 or 22 is expressed as an angle $\theta$. The angle $\theta$ is preferably greater than or equal to 30° and less than or equal to 60°, preferably greater than or equal to 40° and less than or equal to 50°, more preferably greater than or equal to 42° and less than or equal to 48°, and typically 45°.

A gap between the electrodes 31 and 32 is expressed as a gap D. As the gap D is smaller, the capacitance between the two electrodes can be increased and thus the detection sensitivity can be increased. The size of the gap D is, for example, greater than 0 mm and less than or equal to 10 mm, preferably greater than or equal to 1 µm and less than or equal to 5 mm, more preferably greater than or equal to 3 µm and less than or equal to 1 mm, or still more preferably greater than or equal to 5 µm and less than or equal to 500 µm. Alternatively, the gap D may be the integral multiple of a pitch of arranged subpixels or the integral multiple of a pitch of the arranged display elements 60.

FIG. 2B shows an example where the electrodes 31 and 32 each have a lattice shape. The integral multiple of a lattice spacing of the electrode 31 or 32 is preferably equal to the gap D between the electrodes 31 and 32. When the electrodes 31 and 32 have orthogonal lattice shapes as shown in FIG. 2B, one of two directions of the lattice is preferably parallel to the linear portion 21 or the linear portion 22. At this time, openings in the electrodes 31 and 32 are squares inclined at the angle θ to the direction 80.

Although an opening in the lattice is a square in FIG. 2B, the shape of the opening is not limited thereto and can have any of various shapes, such as a circle, an ellipse, and a polygon with rounded corners.

It is preferable that the electrodes 31 and 32 have been processed to be narrow enough not to be viewed from a user. When the electrodes 31 and 32 are processed to have a lattice (mesh) shape as shown in FIG. 2B, high conductivity and high visibility of the display device can be obtained. The widths of the narrowest portions of the electrodes 31 and 32 are preferably greater than or equal to 30 nm and less than or equal to 100 µm, preferably greater than or equal to 50 nm and less than or equal to 50 µm, or more preferably greater than or equal to 50 nm and less than or equal to 20 µm. In particular, the conductive film with a pattern width of 10 µm or less is preferable because the conductive film with such a width is rarely recognized by a user.

A conductive nanowire may be used for the electrodes 31 and 32. When nanowires are dispersed at an appropriate density such that adjacent nanowires are in contact with each other, a two-dimensional network is formed and works as a conductive film with an extremely high light-transmitting property. For example, a nanowire with an average diameter of greater than or equal to 1 nm and less than or equal to 100 nm, preferably greater than or equal to 5 nm and less than or equal to 50 nm, or more preferably greater than or equal to 5 nm and less than or equal to 25 nm can be used. As the nanowire, a carbon nanotube or a metal nanowire such as an Ag nanowire, a Cu nanowire, and an Al nanowire can be used. For example, in the case of using an Ag nanowire, light transmittance of 89% or more and a sheet resistance of 40 ohm/square or more and 100 ohm/square or less can be achieved.

Figure 4A:
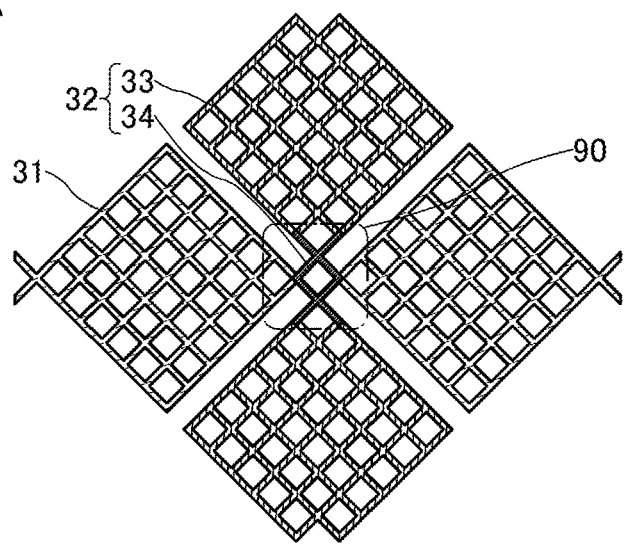
FIGS. 4A to 4C illustrate a structure example of an input device of one embodiment.
Figure 4B:
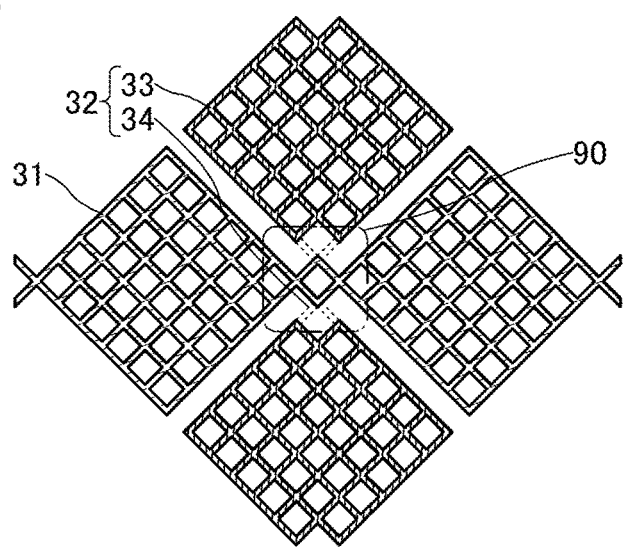
Figure 4C:
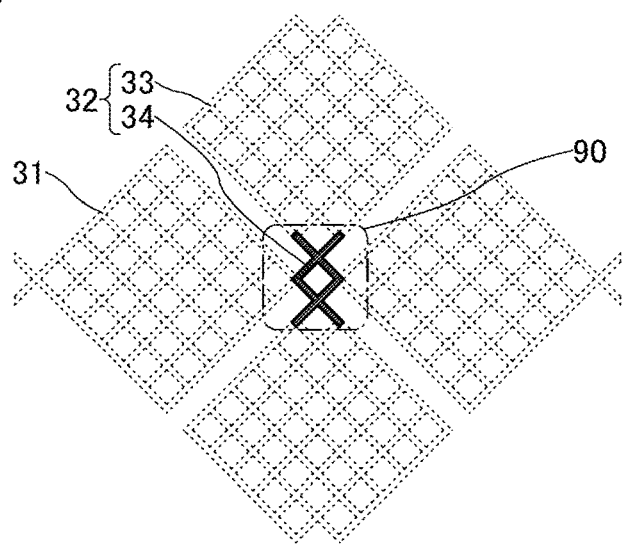

As shown in FIG. 4A, the electrode 32 may be composed of a plurality of electrodes 33 and a bridge electrode 34. For easy understanding of a relative position of the electrode 33 and the bridge electrode 34, only the bridge electrode 34 is shown by a broken line in FIG. 4B while only the bridge electrode 34 is shown by a solid line in FIG. 4C. There is no particular limitation on the formation order of the bridge electrode 34 and the electrodes 31 and 33, and either the bridge electrode 34 or the electrodes 31 and 33 may be provided on the substrate 30 side.

The island-shaped electrodes 33 are arranged in a vertical direction, and the two adjacent electrodes 33 are electrically connected to each other by the bridge electrode 34. With such a structure, the electrodes 33 and 31 can be formed at a time by processing the same conductive film. Therefore, variations in their film thicknesses or line widths can be reduced, and variations in the resistance of each electrode depending on positions can be suppressed. In addition, with such a structure, the electrodes 33 and 31 can be arranged in the same plane. Thus, the electrodes 31 and 33 are not misaligned in a height direction, whereby electrical lines of force generated therebetween can be uniformly distributed and the detection sensitivity of the input device 10 can be increased.

Although the electrode 32 has the bridge electrode 34 here, the electrode 31 may have such a structure. At that time, when the influence of the contact resistance become noticeable because of provision of the bridge electrode 34, a structure with the bridge electrodes 34 is preferably employed for the electrode 31 or 32, whichever is shorter, so that the number of bridge electrodes 34 in the one electrode can be reduced.

Figure 5A:
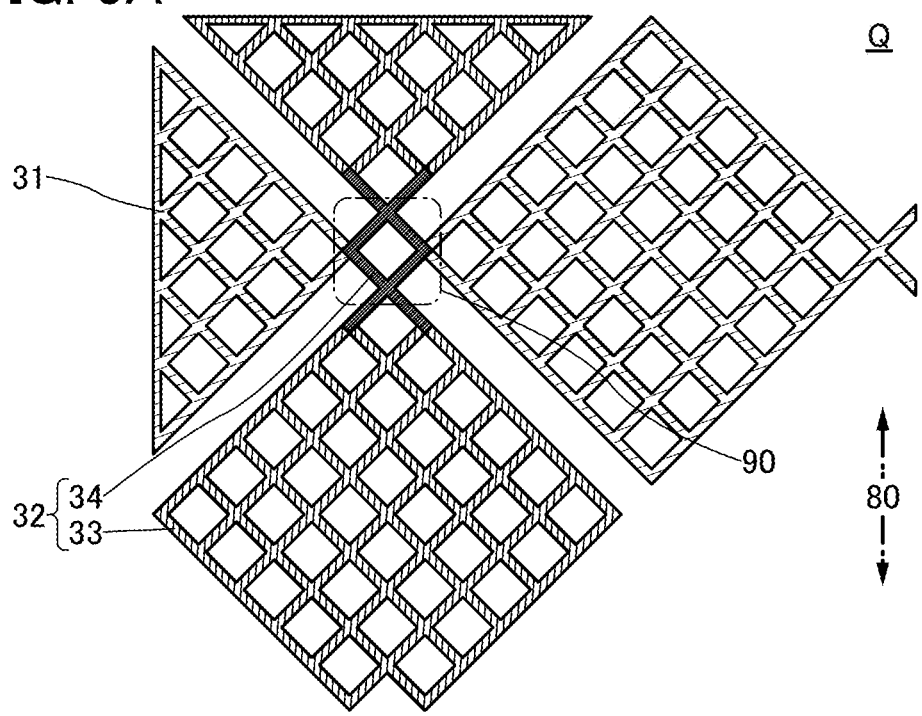
FIGS. 5A and 5B each illustrate a structure example of an input device of one embodiment.

FIG. 5A is an enlarged view of a region Q of FIG. 2A. The region Q is a region including a corner portion of the sensing region of the input device 10.

As shown in FIG. 5A, the electrodes 31 and 32 preferably have shapes in each of which an end portion is apparently cut parallel to or perpendicular to the direction 80 at the corner portion of the sensing region. The outlines of the electrodes 31 and 32 preferably have linear portions parallel to or perpendicular to the direction 80. With such a structure, the bezel of the touch panel 100 where the input device 10 and the display panel 70 are combined can be narrowed.

Figure 5B:
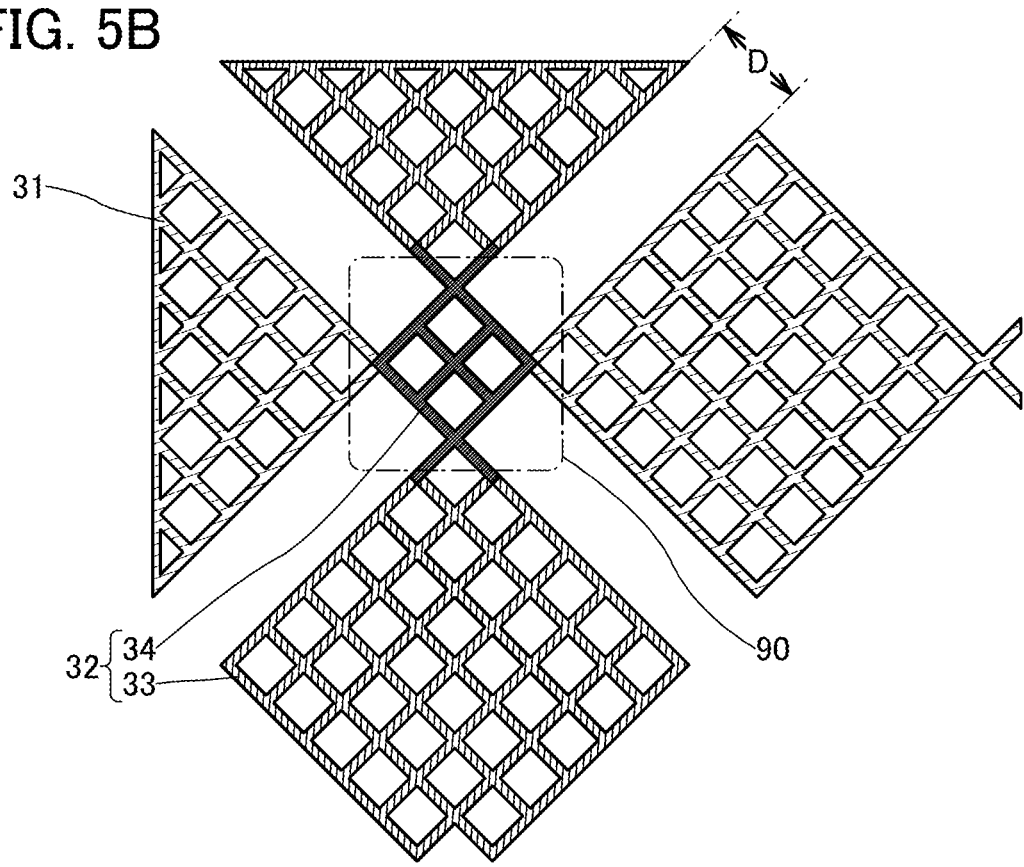

FIG. 5B shows the case where the gap D is wider than that of FIG. 5A. When the gap between the electrodes 31 and 32 is wide like this, the intersection portion 90 preferably has a lattice shape. FIG. 5B shows that the electrode 32 has the bridge electrode 34 with the lattice shape. When the bridge electrode 34 is not used as shown in FIG. 2B, each of the electrodes 31 and 32 may have a lattice shape at the intersection portion 90.

The case where the electrodes 31 and 32 have the lattice shapes is shown above, but the shapes of the electrodes 31 and 32 are not limited thereto and can have any of other various shapes as long as they have facing linear portions.

Figure 6A:
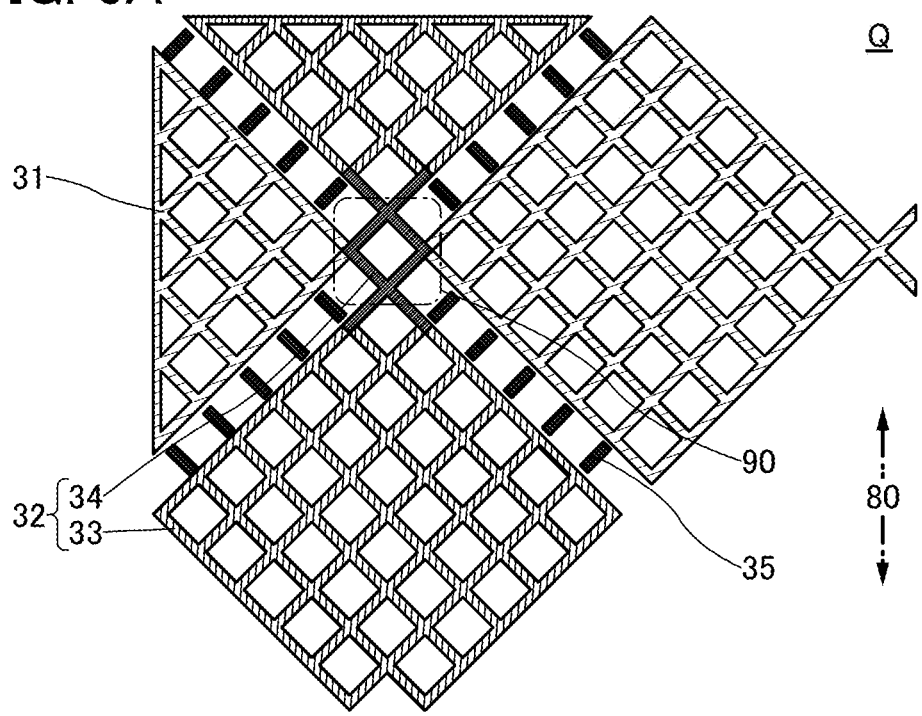
FIGS. 6A and 6B each illustrate a structure example of an input device of one embodiment.
Figure 6B:
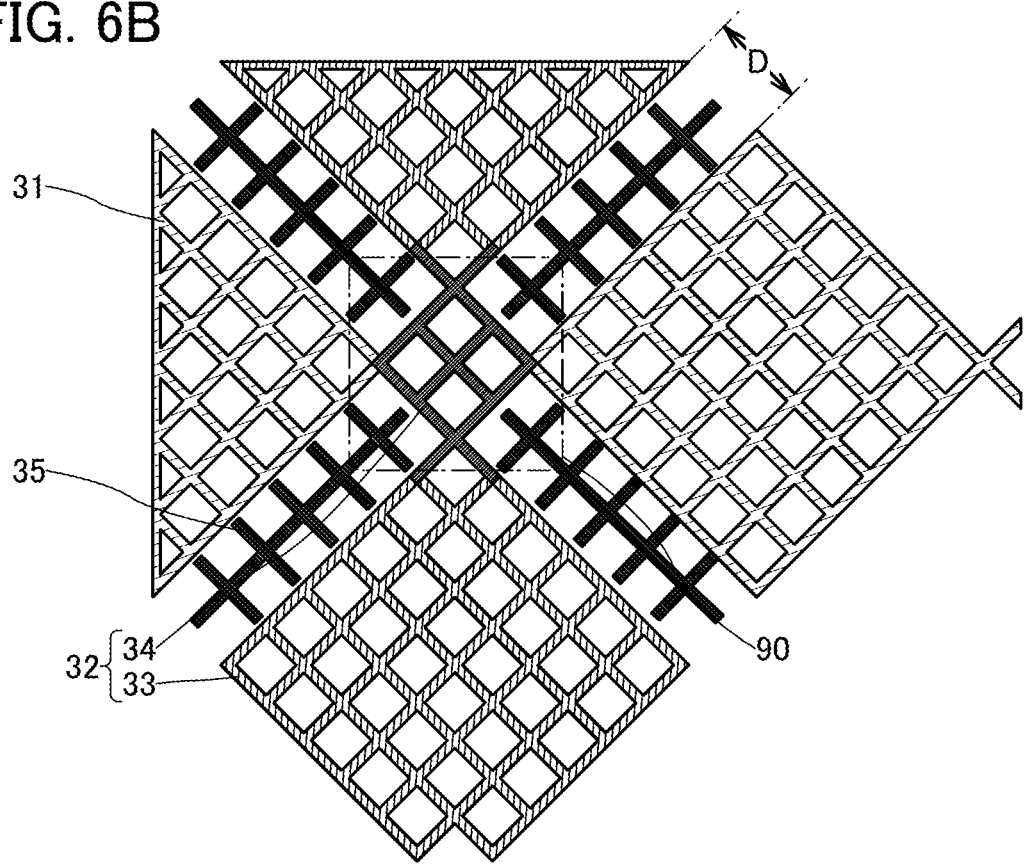

In addition, as shown in FIGS. 6A and 6B, a dummy electrode 35 that is electrically isolated from the electrodes 31 and 32 may be positioned between the electrodes 31 and the electrode 32. With such a structure, a region where neither the electrode 31 nor the electrode 32 exists is less likely to be recognized by a user.

Figure 7A:
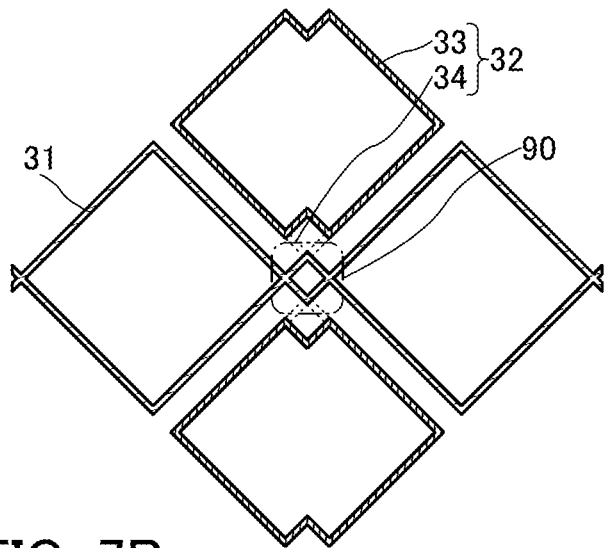
FIGS. 7A to 7C each illustrate a structure example of an input device of one embodiment.
Figure 7B:
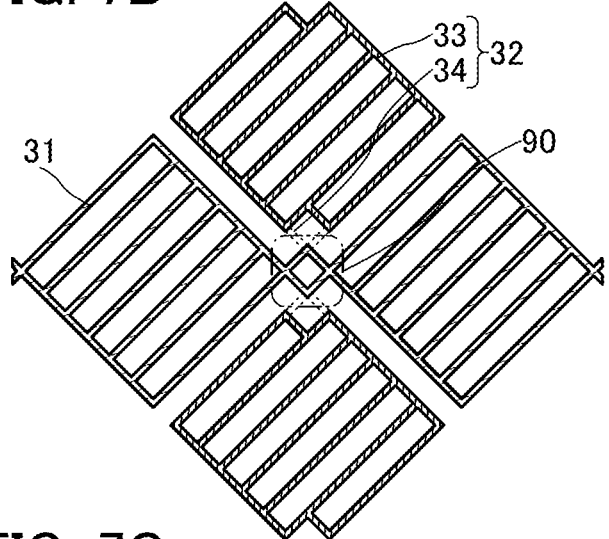
Figure 7C:
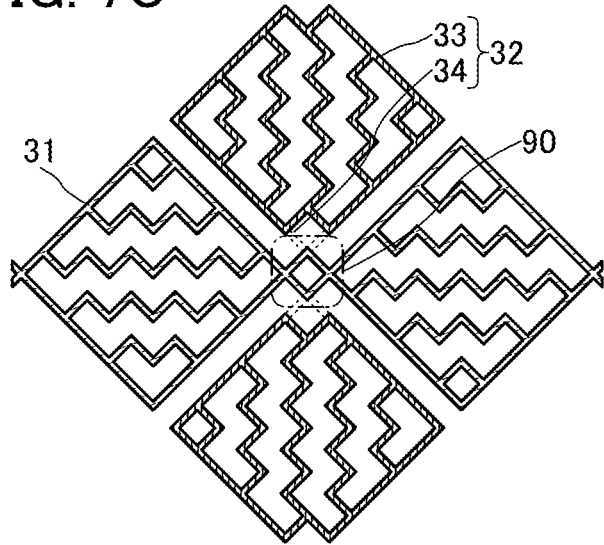

FIG. 7A shows the case where the insides of the rhombic patterns of the electrodes 31 and 33 of FIG. 4A are hollow and only the outlines thereof are formed. FIG. 7B shows the case where only the linear portions of the lattices in a certain direction remain in the electrodes 31 and 33. FIG. 7C shows the case where the electrodes 31 and 33 include zigzag patterns. In that case, the linear portions of the zigzag patterns are preferably parallel to the linear portions of the outline of the electrode 31 or 33. In addition, the zigzag patterns are preferably positioned to extend in the extending direction of the electrode 31 or 32 as shown in FIG. 7C, whereby electric resistance in the direction can be reduced.

Although the electrode 32 has the bridge electrode 34 in FIGS. 7A to 7C, the bridge electrode 34 is not necessarily provided as shown in FIG. 2B.

Although FIG. 2A and the like show the case where a plurality of rhombuses are connected in line is shown as a top surface shape of the electrode 31 or 32, the shapes of the electrodes 31 and 32 are not limited thereto and can have any of various top surface shapes, such as a stripe (rectangle) shape, a stripe shape with curves, or a zigzag shape. In addition, though the electrodes 31 and 32 are positioned to be perpendicular to each other above, they are not necessarily positioned to be perpendicular to each other and an angle between the two electrodes may be less than 90°.

Figure 8A:
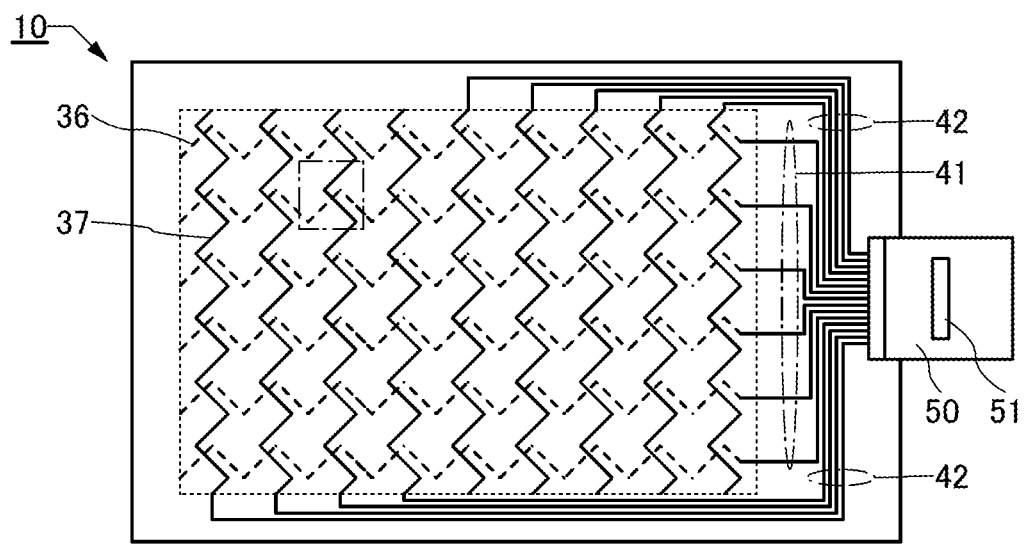
FIGS. 8A and 8B each illustrate a structure example of an input device of one embodiment.

FIG. 8A shows an example where electrodes 36 and 37 with zigzag top surface shapes are used. For clarification, in FIG. 8A and the like, the electrode 36 and the electrode 37 are shown by the broken line and the solid line, respectively. Here, as shown in FIG. 8A, it is preferable that the electrodes be positioned such that the center portion of a linear portion in the zigzag shape of one electrode not overlap with that of a linear portion in the zigzag shape of the other electrode, and the center portions be relatively off from each other. With such a preferable structure, the portions of the electrodes 36 and 37 that face and are parallel to each other can be close to each other, and the capacitance formed between the electrodes and the detection sensitivity can be increased. Alternatively, when part of the linear portions of the zigzag shapes projects in the top surface shapes of the electrodes 36 and 37 as shown in FIG. 8B, the capacitance between the electrodes can be increased because the length of the facing sides can be increased even if the center portions of the linear portions overlap with each other.

Figure 8B:
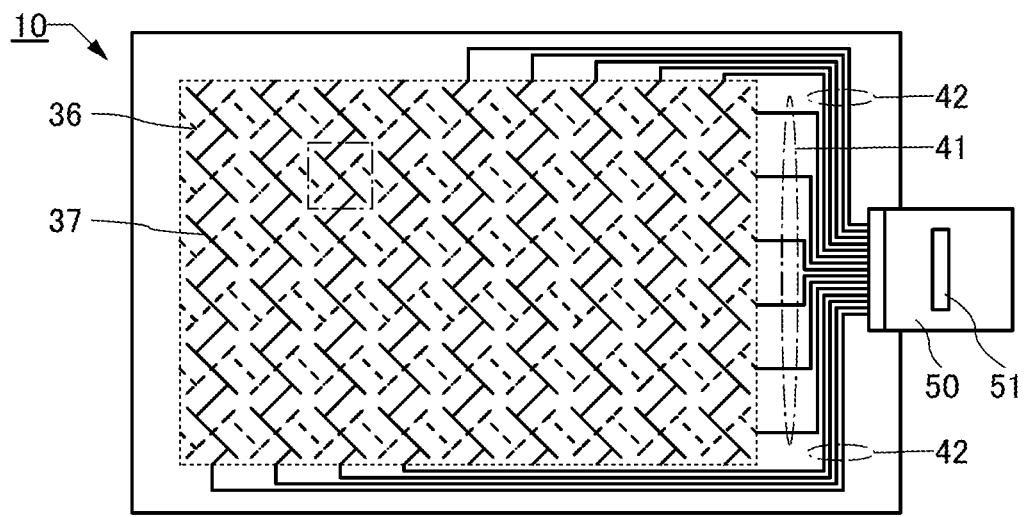
Figure 9A:
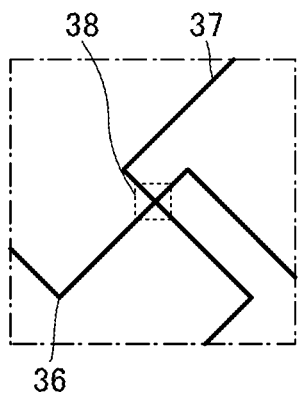
FIGS. 9A to 9F each illustrate a structure example of an input device of one embodiment.
Figure 9B:
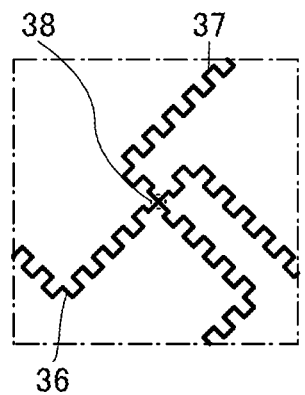
Figure 9C:
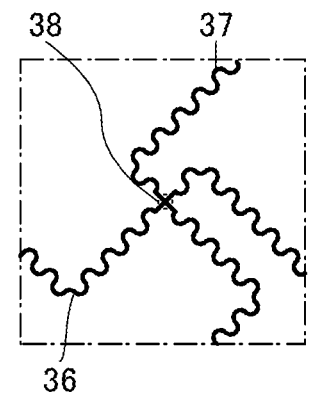
Figure 9D:
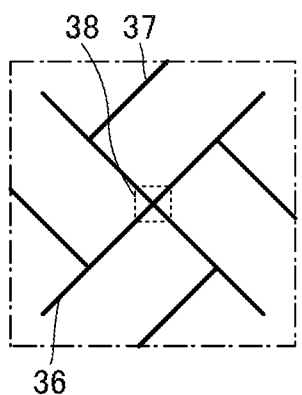
Figure 9E:
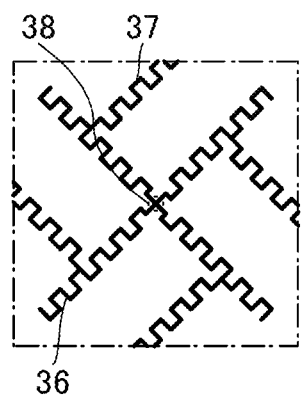
Figure 9F:
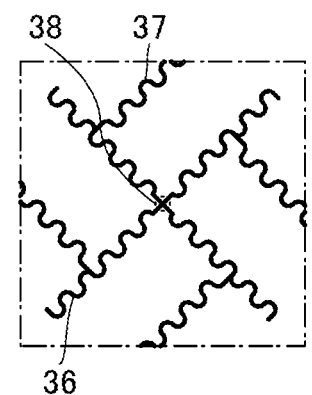

FIG. 9A is an enlarged view of a region surrounded by a chain line in FIG. 8A, and FIG. 9D is an enlarged view of a region surrounded by a chain line in FIG. 8B. Each drawing shows the electrode 36, the electrode 37, and an intersection portion 38 where these electrodes intersect with each other. Here, the linear portions of the electrodes 36 and 37 of FIGS. 9A and 9D may have meander shapes with angled corners as shown in FIGS. 9B and 9E. Alternatively, the linear portions of the electrodes 36 and 37 may have continuously-curved meander shapes as shown in FIGS. 9C and 9F.

That is the description of the structure examples of the input device.

[Structure Example of Pixel]

Structure examples of a pixel in the display panel 70 in the touch panel 100 of one embodiment of the present invention are described below.

As described above, there is a plurality of pixels in the display portion of the display panel 70. A pixel includes one or more display elements 60. If the display panel 70 displays a full color image, a structure where the display elements 60 for exhibiting three colors of red (R), green (G), and blue (B) are provided in one pixel is preferable, for example. A structure where the display elements 60 for exhibiting yellow (Y) and white (W) are provided in addition to the display elements for the above three colors is also preferable because power consumption can be reduced. Here, a structure including one display element 60 and a pixel circuit corresponding thereto is referred to as a subpixel in some cases. When a pixel includes the three display elements 60, the pixel can have a structure with three subpixels.

When the input device 10 overlaps with the display panel 70, it is preferable that the electrodes 31 and 32 in the input device 10 be positioned between the display elements 60. Then, the electrodes 31 and 32 do not block light from the display elements 60, whereby it is possible to almost completely avoid, or greatly reduce luminance decrease in the display panel 70 provided with the input device 10. Therefore, a touch panel with high visibility and low power consumption can be achieved. In addition, since the electrodes 31 and 32 do not overlap with the display element 60, it is not necessary to use a light-transmitting conductive material, which has relatively high resistance, for the electrodes 31 and 32. Therefore, it is possible to use a metal or an alloy material with low resistance for the electrodes 31 and 32, and thus it is possible to make the electrodes 31 and 32 extremely thin so as not to be recognized by bare eyes. Thus, the electrodes 31 and 32 are less likely to be recognized by light reflection or the like, whereby a touch panel with higher visibility can be obtained.

Figure 10:
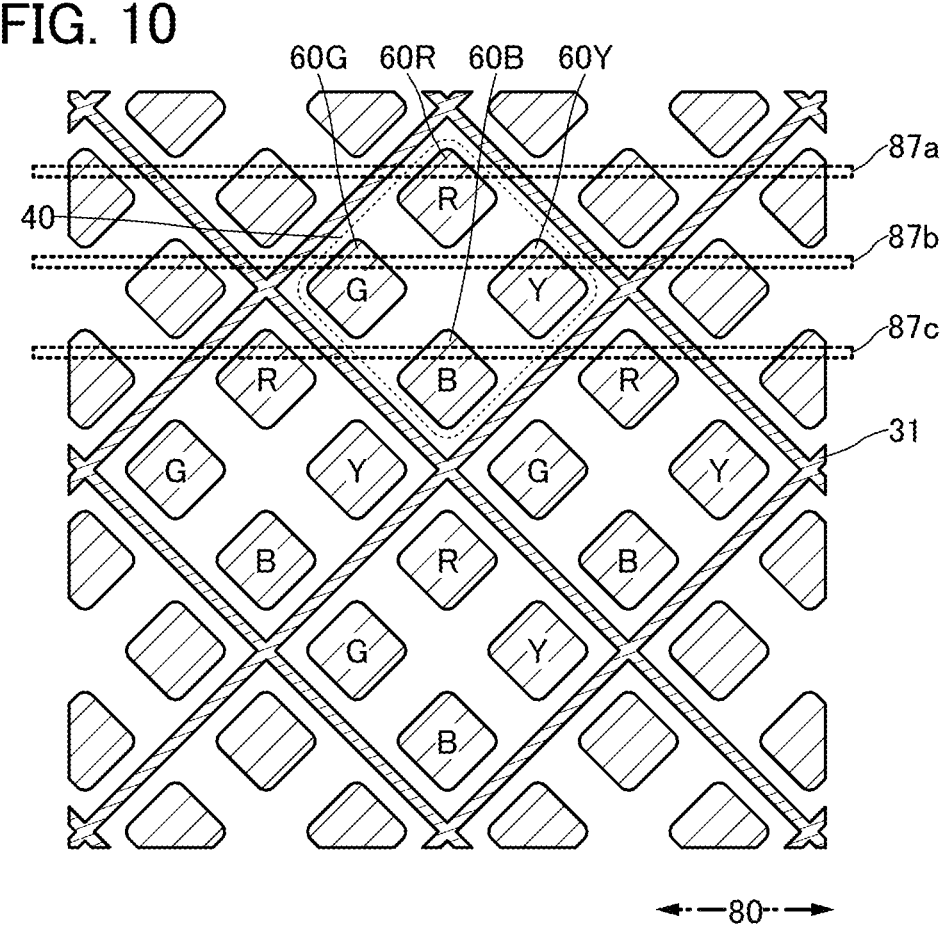
FIG. 10 illustrates a structure example of a touch panel of one embodiment.

FIG. 10 is an enlarged view of the display portion 81 and the input device 10 that overlap with each other when viewed from the display surface side of the touch panel 100 of FIG. 1A. Here, a pixel 40 in the display panel 70 includes four display elements 60 exhibiting different colors (a display element 60R, a display element 60G, a display element 60B, and a display element 60Y). Hereinafter, description is made for the display element 60 when matters common to the four kinds of display elements are described.

FIG. 10 shows a positional relationship between the electrode 31 and the display elements 60. Note that the electrode 31 is illustrated here, but the same applies to the electrode 32 (or the electrode 33 and the bridge electrode 34). In FIG. 10, for describing a direction of scan lines 87 in the display panel 70, three scan lines (a scan line 87a, a scan line 87b, and a scan line 87c) are shown by broken lines, and the direction 80 that is the extending direction of the scan lines is also shown.

In a structure in FIG. 10, an angle between a linear portion of the lattice of the electrode 31 and the scan line 87 is 45°. The display elements 60 are arranged along the linear portion of the electrode 31. Here, a plurality of display elements 60 arranged obliquely in FIG. 10 are two kinds of display elements 60 exhibiting different two colors that are alternately arranged. One pixel 40 includes the four adjacent display elements 60 (display elements 60R, 60G, 60B, and 60Y). Here, the display elements 60R, 60G, 60B, and 60Y are display elements exhibiting red, green, blue, and yellow, respectively.

An outline of one display element 60 preferably has a portion parallel to the linear portion of the lattice of the electrode 31. With such a form, a gap between the two display elements 60 can be reduced when the display elements 60 are arranged, whereby an aperture ratio can be increased. Although the outline of the display element 60 is a quadrangle with rounded corners, the outline shape is not limited thereto, and may be a square, a rectangle, a polygon, an ellipse, a circle, a polygon with rounded corners, or the like.

The scan line 87a in FIG. 10 corresponds to a scan line for driving a subpixel including the display element 60R, for example. The scan line 87b corresponds to a scan line for driving a subpixel including the display element 60G and a subpixel including the display element 60Y. The scan line 87c corresponds to a scan line for driving a subpixel including the display element 60B. Each scan line is electrically connected to a gate of a transistor in each subpixel. That is, in the structure shown in FIG. 10, one pixel can be driven by the three scan lines 87.

In FIG. 10, a structure where one pixel 40 (that is, four display elements 60) is included in an opening of the electrode 31 is shown; however, the structure of the electrode 31 is not limited thereto, and may be any of various structures as long as the electrode 31 is configured to be positioned between the adjacent display elements 60.

Figure 11A:
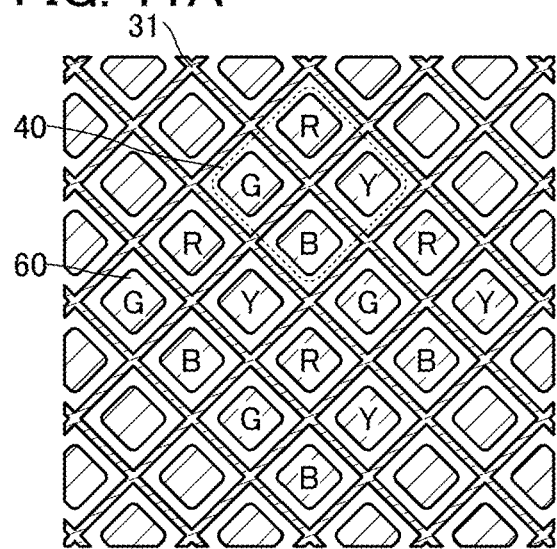
FIGS. 11A to 11F each illustrate a structure example of a touch panel of one embodiment.
Figure 11B:
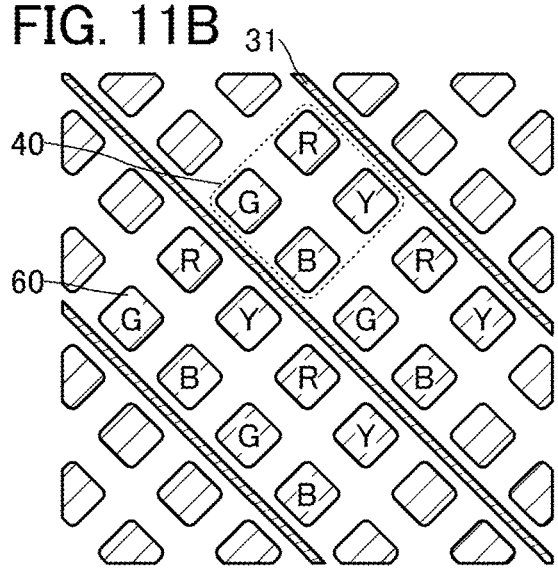
Figure 11C:
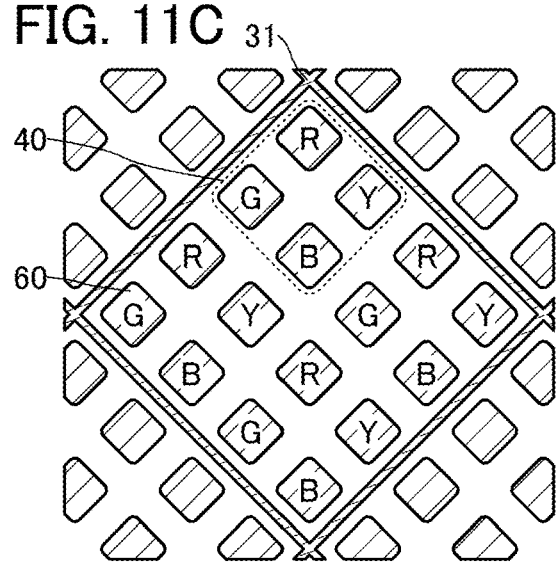
Figure 11D:
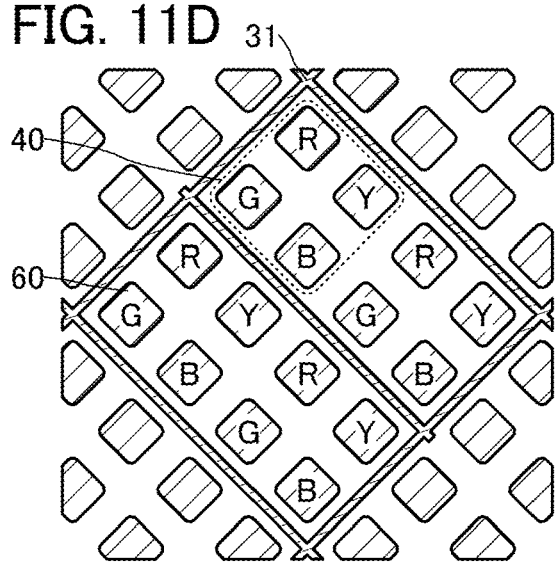
Figure 11E:
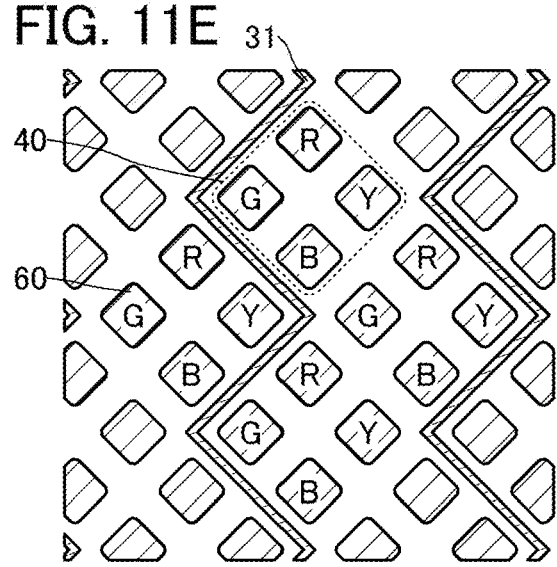
Figure 11F:
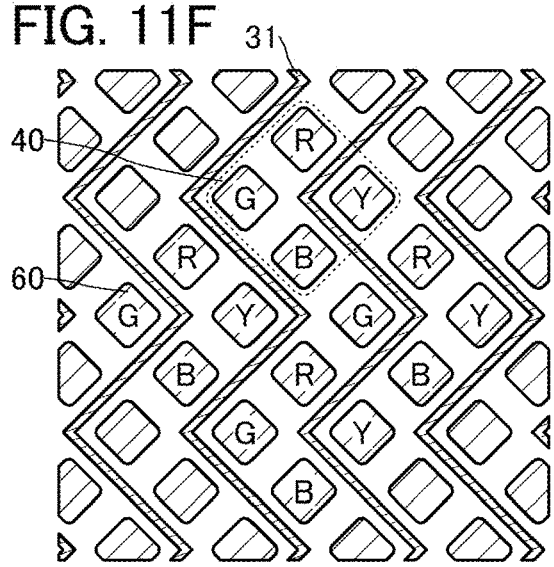

FIG. 11A shows the case where an opening of the lattice of the electrode 31 includes one display element 60. FIG. 11B shows the case where the electrode 31 has a stripe shape. FIG. 11C shows the case where an opening of the lattice of the electrode 31 includes a plurality of pixels 40. FIG. 11D shows the case where a pitch of the lattice in one direction is different from a pitch of the lattice in another direction perpendicular to the one direction. FIGS. 11E and 11F show the case where the electrode 31 has a zigzag shape like that shown in FIG. 7C.

FIG. 10 and FIGS. 11A to 11F show examples where one pixel 40 includes the display elements 60 of four colors, but the number of colors of display elements in a pixel is not limited thereto, and the display elements of three colors, five colors, or more may be provided.

Figure 12:
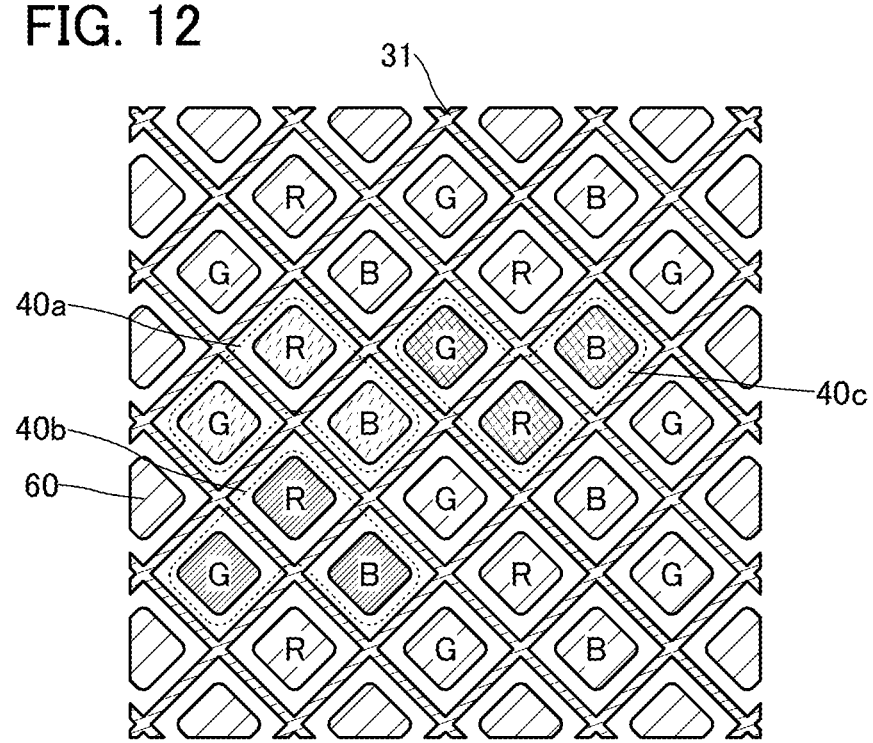
FIG. 12 illustrates a structure example of a touch panel of one embodiment.

FIG. 12 shows the case where one pixel 40 includes the display elements 60 of three colors. For simplifying the description, a pixel 40a, a pixel 40b, and a pixel 40c are shown separately from the others and three display elements 60 in each of the pixels 40a, 40b, and 40c are shown by the same hatching pattern in FIG. 12.

As to the pixels 40a and 40b that are aligned in a vertical direction, arrangement of the three display elements 60 in the pixel 40a is the same as that in the pixel 40b. As to the pixels 40a and 40c that are aligned in a horizontal direction, the arrangement of the three display elements 60 in the pixel 40a is in a vertically inverse relation to that in the pixel 40c.

In FIG. 12, the display elements 60 of the same color are aligned in a vertical direction of the drawing. Such a structure is preferable because the structure will make it easier to separately form color filters or light-emitting elements in accordance with colors of the display elements.

Figure 13A:
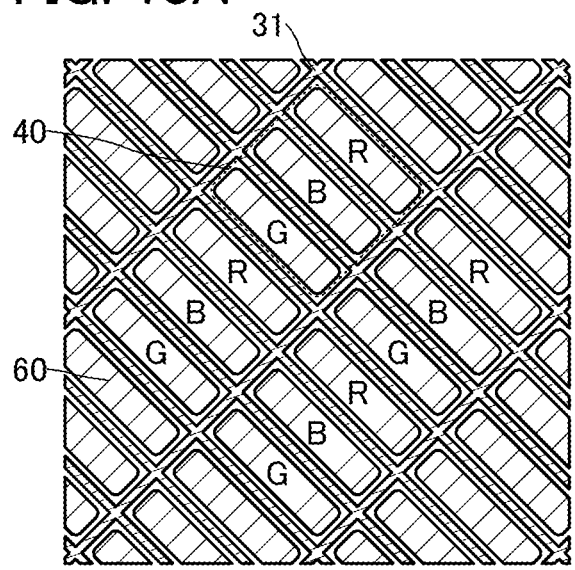
FIGS. 13A to 13D each illustrate a structure example of a touch panel of one embodiment.
Figure 13B:
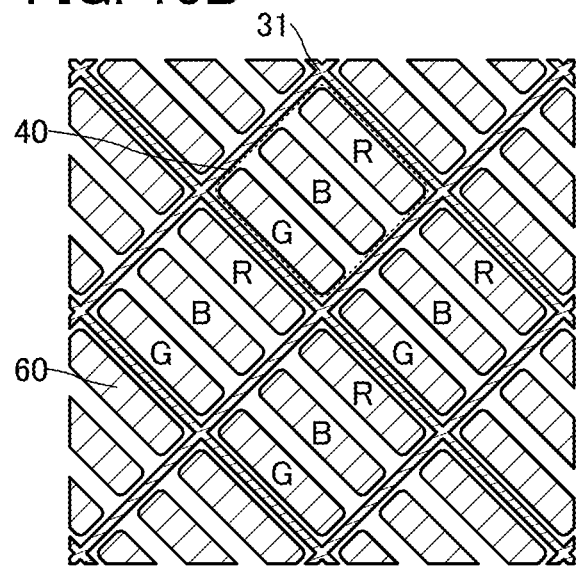
Figure 13C:
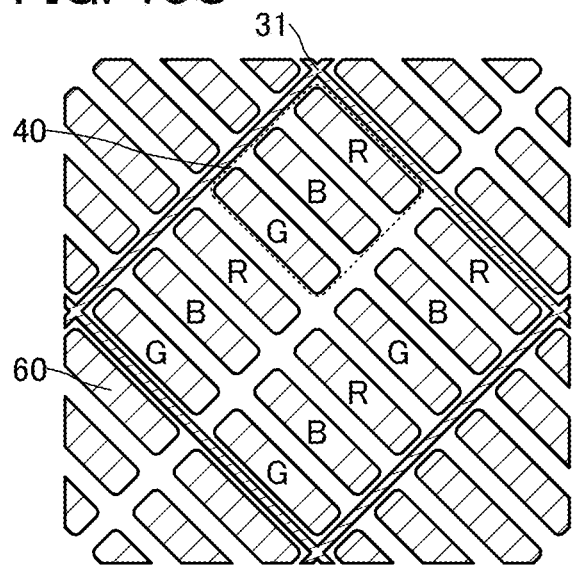
Figure 13D:
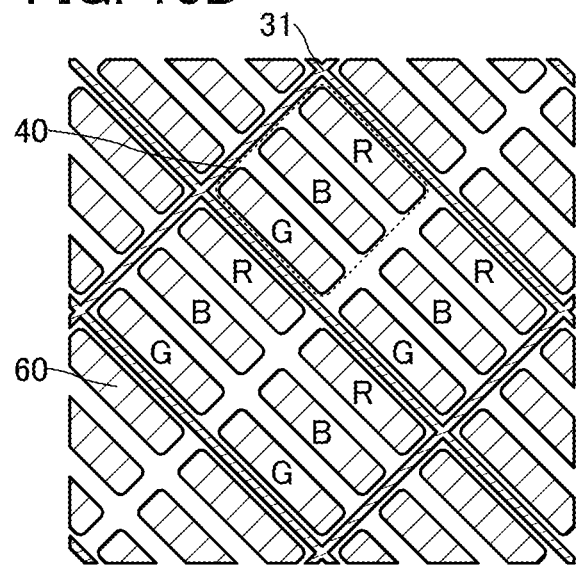

FIG. 13A shows the case where one pixel includes the display elements 60 of three colors. The outline of the display element 60 has a linear portion along a direction of the lattice of the electrode 31, and has a rectangular shape with rounded corners. The display elements of the same color are aligned in the direction of the linear portion of the lattice of the electrode 31, which constitutes stripe arrangement. In each of FIGS. 13B, 13C, and 13D, the electrode 31 has a different shape from that in FIG. 13A.

Note that marks such as R, G, B, and Y are given to some display elements 60 in FIG. 10 to FIG. 13D to facilitate description; however, the arrangement method is just an example, and does not limit an arrangement method of the display elements 60. R, G, B, and Y can be replaced with one another. In addition, W that corresponds to a display element of white may be provided in replacement of R, G, B, or Y.

The above is the description of the structure example of the pixel.

[Cross-Sectional Structure Example]

An example of a cross-sectional structure of the touch panel 100 is described below with reference to drawings.

[Cross-Sectional Structure Example 1]

Figure 14:
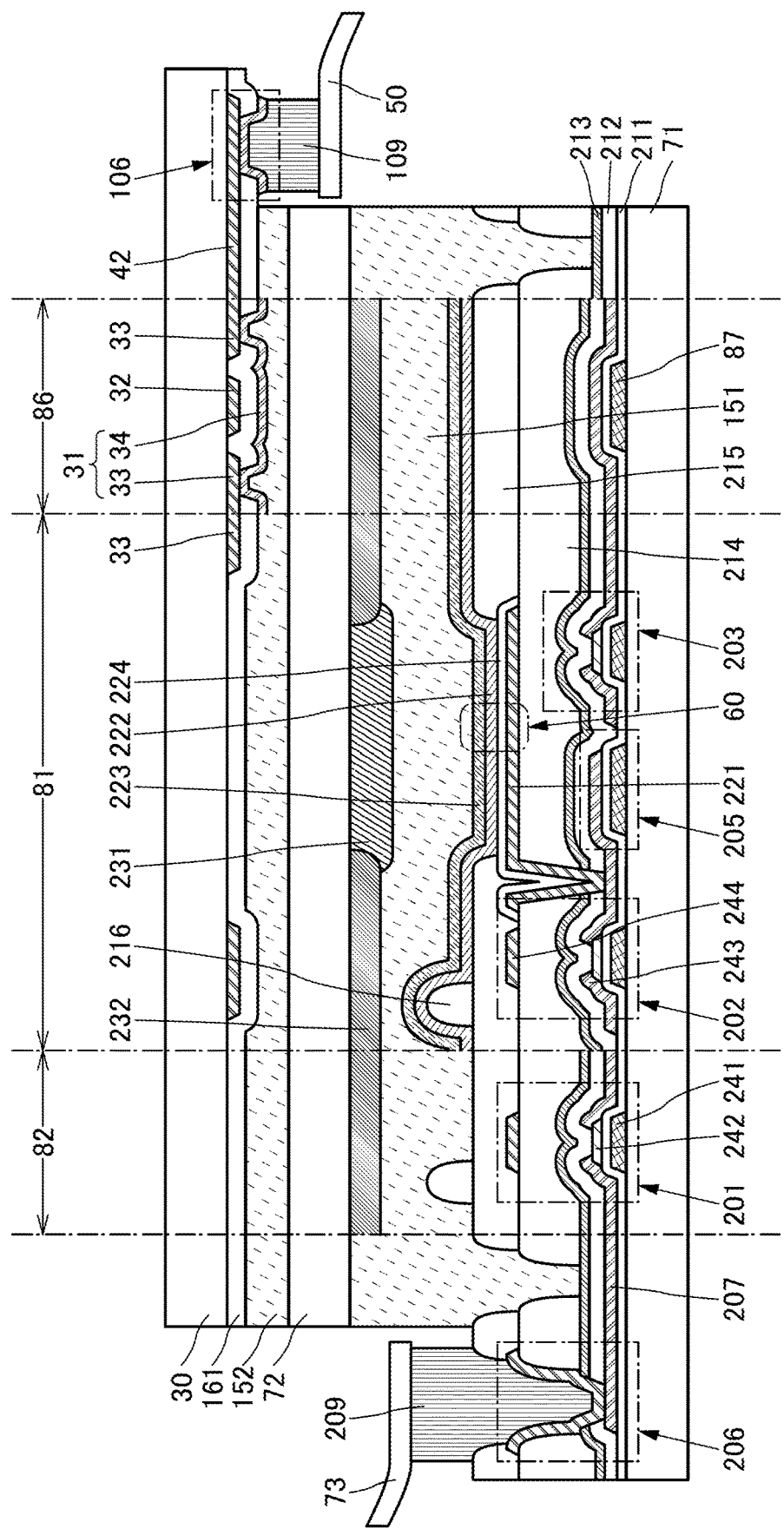
FIG. 14 illustrates a structure example of a touch panel of one embodiment.

FIG. 14 is a schematic cross-sectional view of the touch panel 100. FIG. 14 illustrates cross sections of a region including an FPC 73, a region including the driver circuit 82, a region including the display portion 81, and a region including the FPC 50 in FIG. 1A.

The substrate 71 and the substrate 72 are attached to each other with an adhesive layer 151. The substrate 72 and the substrate 30 are attached to each other with an adhesive layer 152. Here, a structure including the substrate 71, the substrate 72, and components provided therebetween corresponds to the display panel 70. A structure including the substrate 30 and components provided on the substrate 30 corresponds to the input device 10.

<Display Panel 70>

A transistor 201, a transistor 202, a transistor 203, the display element 60, a capacitor 205, a connection portion 206, a wiring 207, and the like are provided between the substrates 71 and 72.

An insulating layer 211, an insulating layer 212, an insulating layer 213, an insulating layer 214, an insulating layer 215, a spacer 216, and the like are provided over the substrate 71. Part of the insulating layer 211 functions as a gate insulating layer of each transistor, and another portion thereof functions as a dielectric of the capacitor 205. The insulating layer 212, the insulating layer 213, and the insulating layer 214 are provided to cover each transistor, the capacitor 205, and the like. The insulating layer 214 functions as a planarization layer. Note that an example where the three insulating layers, the insulating layers 212, 213, and 214, are provided to cover the transistors and the like is described here; however, the present invention is not limited to this example, and four or more insulating layers, a single insulating layer, or two insulating layers may be provided. The insulating layer 214 functioning as a planarization layer is not necessarily provided when not needed.

The display element 60 is provided over the insulating layer 214. Here, an example is shown where a top-emission type light-emitting element (organic EL element) is used as the display element 60. The display element 60 emits light toward a second electrode 223 side. When the transistors 202 and 203, the capacitor 205, the wiring or the like are provided to overlap with the light-emitting region of the display element 60, the aperture ratio of the display portion 81 can be increased.

The display element 60 includes an EL layer 222 between a first electrode 221 and the second electrode 223. An optical adjustment layer 224 is provided between the first electrode 221 and the EL layer 222. The insulating layer 215 is provided to cover end portions of the first electrode 221 and the optical adjustment layer 224.

FIG. 14 illustrates a cross section of one pixel as an example of the display portion 81. An example where the pixel includes the transistor 202 for current control, the transistor 203 for switching control, and the capacitor 205 is described here. One of a source and a drain of the transistor 202 and one electrode of the capacitor 205 are electrically connected to the first electrode 221 through an opening provided in the insulating layers 212, 213, and 214.

FIG. 14 illustrates an example of the driver circuit 82 in which the transistor 201 is provided.

Each of the transistors 201, 202 and 203 has a conductive layer 241 functioning as a gate electrode, a semiconductor layer 242, a pair of conductive layers 243, and an insulating layer 211 functioning as a gate insulator. One of the conductive layers 243 functions as a source electrode while the other of the conductive layers 243 functions as a drain electrode.

In the example illustrated in FIG. 14, the transistors 201 and 202 each have a structure in which a semiconductor layer where a channel is formed is provided between two gate electrodes (conductive layers 241 and 244). Such transistors can have higher field-effect mobility and thus have higher on-state current than other transistors. Consequently, a circuit capable of high-speed operation can be obtained. Furthermore, the area occupied by a circuit can be reduced. The use of the transistor having high on-state current can reduce signal delay in wirings and can reduce display luminance variation even in a display panel in which the number of wirings is increased because of increase in size or resolution.

Note that the transistors provided in the driver circuit 82 and the display portion 81 may have the same structure or different structures.

A material through which impurities such as water or hydrogen do not easily diffuse is preferably used for at least one of the insulating layers 212 and 213 which cover the transistors. That is, the insulating layer 212 or the insulating layer 213 can function as a barrier film. Such a structure can effectively suppress diffusion of the impurities into the transistors from the outside, and a highly reliable touch panel can be achieved.

The spacer 216 is provided over the insulating layer 215 and has a function of adjusting the distance between the substrate 71 and the substrate 72. In the example illustrated in FIG. 14, there is a gap between the spacer 216 and a light-blocking layer 232, which may however be in contact with each other. Although the spacer 216 is provided on the substrate 71 side in the structure described here, the spacer 216 may be provided on the substrate 72 side (e.g., in a position closer to the substrate 71 than that of the light-blocking layer 232). Alternatively, a particulate spacer may be used instead of the spacer 216. Although a material such as silica can be used for the particulate spacer, an elastic material such as an organic resin or rubber is preferably used. In some cases, the particulate spacer may be vertically crushed.

A coloring layer 231, the light-blocking layer 232, and the like are provided on the substrate 71 side of the substrate 72. The light-blocking layer 232 has an opening, and the opening overlaps with the display region of the display element 60. The coloring layer 231 overlaps with the display element 60.

As examples of a material that can be used for the light-blocking layer 232, carbon black, a metal oxide, and a composite oxide containing a solid solution of a plurality of metal oxides can be given. Stacked films containing the material of the coloring layer 231 can also be used for the light-blocking layer 232. For example, a material containing an acrylic resin can be used for the coloring layer 231, and a stacked-layer structure of a film containing a material of a coloring layer which transmits light of a certain color and a film containing a material of a coloring layer which transmits light of another color can be employed. It is preferable that the coloring layer 231 and the light-blocking layer 232 be formed using the same material because the same manufacturing apparatus can be used and the process can be simplified.

As examples of a material that can be used for the coloring layer 231, a metal material, a resin material, and a resin material containing a pigment or dye can be given.

An insulating layer which functions as an overcoat may be provided to cover the coloring layer 231 and the light-blocking layer 232.

The connection portion 206 is provided in a region near an end portion of the substrate 71. The connection portion 206 is electrically connected to the FPC 73 through a connection layer 209. In the example of the structure illustrated in FIG. 14, the connection portion 206 is formed by stacking part of the wiring 207 which is electrically connected to the driver circuit 82 and a conductive layer which is formed by processing a conductive film used for forming the first electrode 221. When the connection portion 206 is formed by stacking two or more conductive layers as described above, electric resistance can be reduced and mechanical strength of the connection portion 206 can be increased.

Furthermore, FIG. 14 illustrates a cross-sectional structure of an intersection portion 86 where a wiring formed by processing a conductive film used for forming the gate electrode of the transistor and a wiring formed by processing a conductive film used for forming a source electrode and a drain electrode of the transistor intersect with each other.

Here, the scan line 87 formed by processing a conductive film used for forming the gate electrode of the transistor is provided at the intersection portion 86. Note that the scan line 87 may be a wiring formed by processing a conductive film used for forming the source electrode and the drain electrode of a transistor or another conductive film.

<Input Device 10>

The electrode 31 and the electrode 32 are provided on the substrate 72 side of the substrate 30. An example where the electrode 31 includes the electrode 33 and the bridge electrode 34 is described here. As illustrated in the intersection portion 86 in FIG. 14, the electrode 32 and the electrode 33 are formed in the same plane. The bridge electrode 34 is provided over an insulating layer 161 which covers the electrode 32 and the electrode 33. The bridge electrode 34 electrically connects two electrodes 33, between which the electrode 32 is provided, through openings formed in the insulating layer 161.

In the structure of FIG. 14, the electrode 33 does not overlap with the display element 60. That is, the electrode 33 is provided such that an opening of the electrode 33 and the display element 60 overlap with each other. Here, it is preferable that the electrode 33 not overlap with the coloring layer 231. The electrode 33 preferably overlaps with the light-blocking layer 232. Note that an example of the electrode 33 is shown here, but it is preferable that the electrodes 31 and 32 and the bridge electrode 34 also not overlap with the display element 60 or the like.

A connection portion 106 is provided in a region near an end portion of the substrate 30. The connection portion 106 is electrically connected to the FPC 50 through a connection layer 109. In the example of the structure illustrated in FIG. 14, the connection portion 106 is formed by stacking part of the wiring 42 and a conductive layer which is formed by processing a conductive film used for forming the bridge electrode 34.

As the connection layer 109 or the connection layer 209, an anisotropic conductive film (ACF), an anisotropic conductive paste (ACP), or the like can be used.

The substrate 30 here can be used also as a substrate with which an object to be sensed, such as a finger or a stylus, is to be in contact. In that case, a protective layer (such as a ceramic coat) is preferably provided over the substrate 30. The protective layer can be formed using an inorganic insulating material such as silicon oxide, aluminum oxide, yttrium oxide, or yttria-stabilized zirconia (YSZ). Alternatively, tempered glass may be used for the substrate 30. The tempered glass which can be used here is one that has been subjected to physical or chemical treatment by an ion exchange method, a thermal tempering method, or the like and has a surface to which compressive stress has been added. In the case where the touch sensor is provided on one side of the tempered glass and the opposite side of the tempered glass is provided on, for example, the outermost surface of an electronic device for use as a touch surface, the thickness of the whole device can be decreased.

<Components>

The above-mentioned components are described below.

A substrate having a flat surface can be used as the substrate included in the touch panel. The substrate on the side from which light from the display element is extracted is formed using a material that transmits the light. For example, a material such as glass, quartz, ceramics, sapphire, or an organic resin can be used.

The weight and thickness of the touch panel can be decreased by using a thin substrate. A flexible touch panel can be obtained by using a substrate that is thin enough to have flexibility.

As the glass, for example, non-alkali glass, barium borosilicate glass, aluminoborosilicate glass, or the like can be used.

Examples of a material that has flexibility and transmits visible light include flexible glass, polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, a polyvinyl chloride resin, and a polytetrafluoroethylene (PTFE). In particular, a material whose thermal expansion coefficient is low is preferable, and for example, a polyamide imide resin, a polyimide resin, or PET can be suitably used. A substrate in which a glass fiber is impregnated with an organic resin or a substrate whose thermal expansion coefficient is reduced by mixing an organic resin with an inorganic filler can also be used. A substrate using such a material is lightweight, and accordingly a touch panel using this substrate can also be lightweight.

Since it is not necessary for the substrate through which light emission is not extracted to have a light-transmitting property, a metal substrate, a ceramic substrate, a semiconductor substrate, or the like can be used as well as the above-described substrates. A metal substrate, which has high thermal conductivity, is preferable because they can easily conduct heat to the whole substrate and accordingly can prevent a local temperature rise in the touch panel. To obtain flexibility and bendability, the thickness of a metal substrate is preferably greater than or equal to 10 µm and less than or equal to 200 µm, more preferably greater than or equal to 20 µm and less than or equal to 50 µm.

Although there is no particular limitation on a material of a metal substrate, it is favorable to use, for example, a metal such as aluminum, copper, and nickel, an aluminum alloy, or an alloy such as stainless steel.

It is preferable to use a substrate subjected to insulation treatment, e.g., a metal substrate whose surface is oxidized or provided with an insulating film. An insulating film may be formed by, for example, a coating method such as a spin-coating method and a dipping method, an electrodeposition method, an evaporation method, or a sputtering method. An oxide film may be formed over the substrate surface by a known method such as an anodic oxidation method, exposing to or heating in an oxygen atmosphere, or the like.

A hard coat layer (e.g., a silicon nitride layer) by which a touch panel surface is protected from damage, a layer (e.g., an aramid resin layer) that can disperse pressure, or the like may be stacked over the flexible substrate. Furthermore, to suppress a decrease in lifetime of the display element due to water and the like, an insulating film with low water permeability may be provided to the flexible substrate. For example, a film containing nitrogen and silicon (e.g., a silicon nitride film, a silicon oxynitride film), or a film containing nitrogen and aluminum (e.g., an aluminum nitride film) may be provided.

The substrate may be formed by stacking a plurality of layers. When a glass layer is used, a barrier property against water and oxygen can be improved and thus a highly reliable touch panel can be provided.

A substrate in which a glass layer, an adhesive layer, and an organic resin layer are stacked from the side closer to the display element can be used, for example. The thickness of the glass layer is greater than or equal to 20 µm and less than or equal to 200 µm, preferably greater than or equal to 25 µm and less than or equal to 100 µm. With such a thickness, the glass layer can have both a high barrier property against water and oxygen and a high flexibility. The thickness of the organic resin layer is greater than or equal to 10 µm and less than or equal to 200 µm, preferably greater than or equal to 20 µm and less than or equal to 50 µm. Providing such an organic resin layer outside the glass layer, occurrence of a crack or a break in the glass layer can be suppressed and mechanical strength can be improved. With the substrate that includes such a composite material of a glass material and an organic resin, a highly reliable flexible touch panel can be provided.

The transistor includes a conductive layer functioning as the gate electrode, the semiconductor layer, a conductive layer functioning as the source electrode, a conductive layer functioning as the drain electrode, and an insulating layer functioning as the gate insulating layer.

Note that there is no particular limitation on the structure of the transistor included in the touch panel of one embodiment of the present invention. For example, a forward staggered transistor or an inverted staggered transistor may be used. A top-gate transistor or a bottom-gate transistor may be used. There is no particular limitation on a semiconductor material that is used for the transistors, and for example, an oxide semiconductor, silicon, germanium, or an organic semiconductor can be used.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be suppressed.

As a semiconductor material for the semiconductor layer of the transistor, an element of Group 14, a compound semiconductor, or an oxide semiconductor can be used, for example. Typically, a semiconductor containing silicon, a semiconductor containing gallium arsenide, an oxide semiconductor containing indium, or the like can be used.

An oxide semiconductor is preferably used as a semiconductor in which the channel of the transistor is formed. In particular, an oxide semiconductor having a wider band gap than silicon is preferably used. A semiconductor material having a wider band gap and a lower carrier density than silicon is preferably used because off-state leakage current of the transistor can be reduced.

For example, at least indium (In) or zinc (Zn) is preferably included as the oxide semiconductor. More preferably, an In-M-Zn-based oxide (M is a metal such as Al, Ti, Ga, Ge, Y, Zr, Sn, La, Ce, or Hf) is included.

As the semiconductor layer, it is particularly preferable to use an oxide semiconductor film including a plurality of crystal parts whose c-axes are aligned substantially perpendicular to a surface on which the semiconductor layer is formed or the top surface of the semiconductor layer and in which a grain boundary is not observed between adjacent crystal parts.

There is no grain boundary in such an oxide semiconductor; therefore, generation of a crack in an oxide semiconductor film which is caused by stress when a display panel is bent is prevented. Therefore, such an oxide semiconductor can be preferably used for a flexible touch panel which is used in a bent state, or the like.

Moreover, the use of such an oxide semiconductor with crystallinity for the semiconductor layer makes it possible to provide a highly reliable transistor in which a change in the electrical characteristics is suppressed.

A transistor with an oxide semiconductor whose band gap is larger than the band gap of silicon can hold charges stored in a capacitor that is series-connected to the transistor for a long time, owing to the low off-state current of the transistor. When such a transistor is used for a pixel, operation of a driver circuit can be stopped while a gray scale of an image displayed in each display region is maintained. As a result, a display device with extremely low power consumption can be obtained.

Alternatively, silicon is preferably used as a semiconductor in which the channel of the transistor is formed. Although amorphous silicon may be used as silicon, silicon having crystallinity is particularly preferable. For example, microcrystalline silicon, polycrystalline silicon, single-crystal silicon, or the like is preferably used. In particular, polycrystalline silicon can be formed at a lower temperature than single-crystal silicon and has higher field effect mobility and higher reliability than amorphous silicon. When such a polycrystalline semiconductor is used for a pixel, the aperture ratio of the pixel can be improved. Even in the case where pixels are provided at extremely high resolution, a scan line driver circuit and a signal line driver circuit can be formed over a substrate over which the pixels are formed, and the number of components of an electronic device can be reduced.

As a gate, a source, and a drain of a transistor, and a wiring or an electrode included in a touch panel, any of metals such as aluminum, titanium, chromium, nickel, copper, yttrium, zirconium, molybdenum, silver, tantalum, and tungsten, or an alloy containing any of these metals as its main component can be used. A single-layer structure or multi-layer structure including a film containing any of these materials can be used. For example, the following structures can be given: a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, and a three-layer structure in which a molybdenum film or a molybdenum nitride film, an aluminum film or a copper film, and a molybdenum film or a molybdenum nitride film are stacked in this order. Note that a transparent conductive material containing indium oxide, tin oxide, or zinc oxide may be used. Copper containing manganese is preferably used because controllability of a shape by etching is increased.

As a light-transmitting material that can be used for conductive layers such as wirings and electrodes in the touch panel, a conductive oxide such as indium oxide, indium tin oxide, indium zinc oxide, zinc oxide, or zinc oxide to which gallium is added, or graphene can be used. Alternatively, a metal material such as gold, silver, platinum, magnesium, nickel, tungsten, chromium, molybdenum, iron, cobalt, copper, palladium, or titanium, or an alloy material containing any of these metal materials can be used. Alternatively, a nitride of the metal material (e.g., titanium nitride) or the like may be used. In the case of using the metal material or the alloy material (or the nitride thereof), the thickness is set small enough to be able to transmit light. Alternatively, a stack of any of the above materials can be used as the conductive layer. For example, a stacked film of indium tin oxide and an alloy of silver and magnesium is preferably used because the conductivity can be increased.

Examples of an insulating material that can be used for the insulating layers, the overcoat, the spacer, and the like include a resin such as acrylic or epoxy resin, a resin having a siloxane bond, and an inorganic insulating material such as silicon oxide, silicon oxynitride, silicon nitride oxide, silicon nitride, or aluminum oxide.

The light-emitting element is preferably provided between a pair of insulating films with low water permeability, in which case impurities such as water can be prevented from entering the light-emitting element. Thus, a decrease in device reliability can be prevented.

As an insulating film with low water permeability, a film containing nitrogen and silicon (e.g., a silicon nitride film or a silicon nitride oxide film), a film containing nitrogen and aluminum (e.g., an aluminum nitride film), or the like can be used. Alternatively, a silicon oxide film, a silicon oxynitride film, an aluminum oxide film, or the like can be used.

For example, the water vapor transmittance of the insulating film with low water permeability is lower than or equal to $1\times10^{-5}$ [g/(m$^2$·day)], preferably lower than or equal to $1\times10^{-6}$ [g/(m$^2$·day)], further preferably lower than or equal to $1\times10^{-7}$ [g/(m$^2$·day)], still further preferably lower than or equal to $1\times10^{-8}$ [g/(m$^2$·day)].

As the adhesive layers, a variety of curable adhesives such as a reactive curable adhesive, a thermosetting adhesive, an anaerobic adhesive, and a photo curable adhesive such as an ultraviolet curable adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. In particular, a material with low water permeability, such as an epoxy resin, is preferable. Alternatively, a two-component-mixture-type resin may be used. Further alternatively, an adhesive sheet or the like may be used.

Further, the resin may include a drying agent. For example, a substance that adsorbs water by chemical adsorption, such as oxide of an alkaline earth metal (e.g., calcium oxide or barium oxide), can be used. Alternatively, a substance that adsorbs water by physical adsorption, such as zeolite or silica gel, may be used. The drying agent is preferably included because it can prevent impurities such as water from entering the functional element, thereby improving the reliability of the display panel.

In addition, it is preferable to mix a filler with a high refractive index or light-scattering member into the resin, in which case the efficiency of light extraction from the light-emitting element can be improved. For example, titanium oxide, barium oxide, zeolite, zirconium, or the like can be used.

As the light-emitting element, a self-luminous element can be used, and an element whose luminance is controlled by current or voltage is included in the category of the light-emitting element. For example, a light-emitting diode (LED), an organic EL element, an inorganic EL element, or the like can be used.

The light-emitting element may be a top emission, bottom emission, or dual emission light-emitting element. A conductive film that transmits visible light is used as the electrode through which light is extracted. A conductive film that reflects visible light is preferably used as the electrode through which light is not extracted.

The EL layer includes at least a light-emitting layer. In addition to the light-emitting layer, the EL layer may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

Either a low molecular compound or a high molecular compound can be used for the EL layer, and an inorganic compound may also be used. The layers included in the EL layer can be formed by any of the following methods: an evaporation method (including a vacuum evaporation method), a transfer method, a printing method, an inkjet method, a coating method, and the like.

When a voltage higher than the threshold voltage of the light-emitting element is applied between the anode and the cathode, holes are injected to the EL layer from the anode side and electrons are injected to the EL layer from the cathode side. The injected electrons and holes are recombined in the EL layer, so that a light-emitting substance contained in the EL layer emits light.

In the case where a light-emitting element emitting white light is used as the light-emitting element, the EL layer preferably contains two or more kinds of light-emitting substances. For example, light-emitting substances are selected so that two or more light-emitting substances emit complementary colors to obtain white light emission. Specifically, it is preferable to contain two or more light-emitting substances selected from light-emitting substances emitting light of red (R), green (G), blue (B), yellow (Y), orange (O), and the like and light-emitting substances emitting light containing two or more of spectral components of R, G, and B. The light-emitting element preferably emits light with a spectrum having two or more peaks in the wavelength range of a visible light region (e.g., 350 nm to 750 nm). An emission spectrum of a material emitting light having a peak in the wavelength range of a yellow light preferably includes spectral components also in the wavelength range of a green light and a red light.

A light-emitting layer containing a light-emitting material emitting light of one color and a light-emitting layer containing a light-emitting material emitting light of another color are preferably stacked in the EL layer. For example, the plurality of light-emitting layers in the EL layer may be stacked in contact with each other or may be stacked with a separation layer therebetween. For example, between a fluorescent layer and a phosphorescent layer, a region containing the same material as one in the fluorescent layer or phosphorescent layer (for example, a host material or an assist material) and no light-emitting element may be provided. This facilitates the manufacture of the light-emitting element and reduces the drive voltage.

The conductive film that transmits visible light can be formed using, for example, indium oxide, indium tin oxide (ITO), indium zinc oxide, zinc oxide, or zinc oxide to which gallium is added. Alternatively, a film of a metal material such as gold, silver, platinum, magnesium, nickel, tungsten, chromium, molybdenum, iron, cobalt, copper, palladium, or titanium; an alloy containing any of these metal materials; or a nitride of any of these metal materials (e.g., titanium nitride) can be used when formed thin so as to have a light-transmitting property. Alternatively, a stack of any of the above materials can be used as the conductive layer. For example, a stacked film of ITO and an alloy of silver and magnesium is preferably used, in which case conductivity can be increased. Further alternatively, graphene or the like may be used.

For the conductive film that reflects visible light, for example, a metal material, such as aluminum, gold, platinum, silver, nickel, tungsten, chromium, molybdenum, iron, cobalt, copper, or palladium or an alloy including any of these metal materials can be used. Lanthanum, neodymium, germanium, or the like may be added to the metal material or the alloy. Furthermore, an alloy containing aluminum (an aluminum alloy) such as an alloy of aluminum and titanium, an alloy of aluminum and nickel, or an alloy of aluminum and neodymium; or an alloy containing silver such as an alloy of silver and copper, an alloy of silver, copper, and palladium, or an alloy of silver and magnesium can be used for the conductive film. An alloy of silver and copper is preferable because of its high heat resistance. Moreover, a metal film or a metal oxide film is stacked on an aluminum alloy film, whereby oxidation of the aluminum alloy film can be suppressed. Examples of a material for the metal film or the metal oxide film are titanium and titanium oxide. Alternatively, the conductive film having a property of transmitting visible light and a film containing any of the above metal materials may be stacked. For example, a stacked film of silver and ITO or a stacked film of an alloy of silver and magnesium and ITO can be used.

The conductive film may be formed separately by an evaporation method or a sputtering method. Alternatively, a discharging method such as an ink-jet method, a printing method such as a screen printing method, or a plating method may be used.

The light-emitting element may be a single element including one EL layer or a tandem element in which a plurality of EL layers are stacked with a charge generation layer therebetween.

The above is the descriptions of the components.

Structure examples which partly differ from the above cross-sectional structure example 1 will be described below with reference to drawings. Note that descriptions of the portions already described are omitted and different portions are described below.

[Cross-Sectional Structure Example 2]

Figure 15:
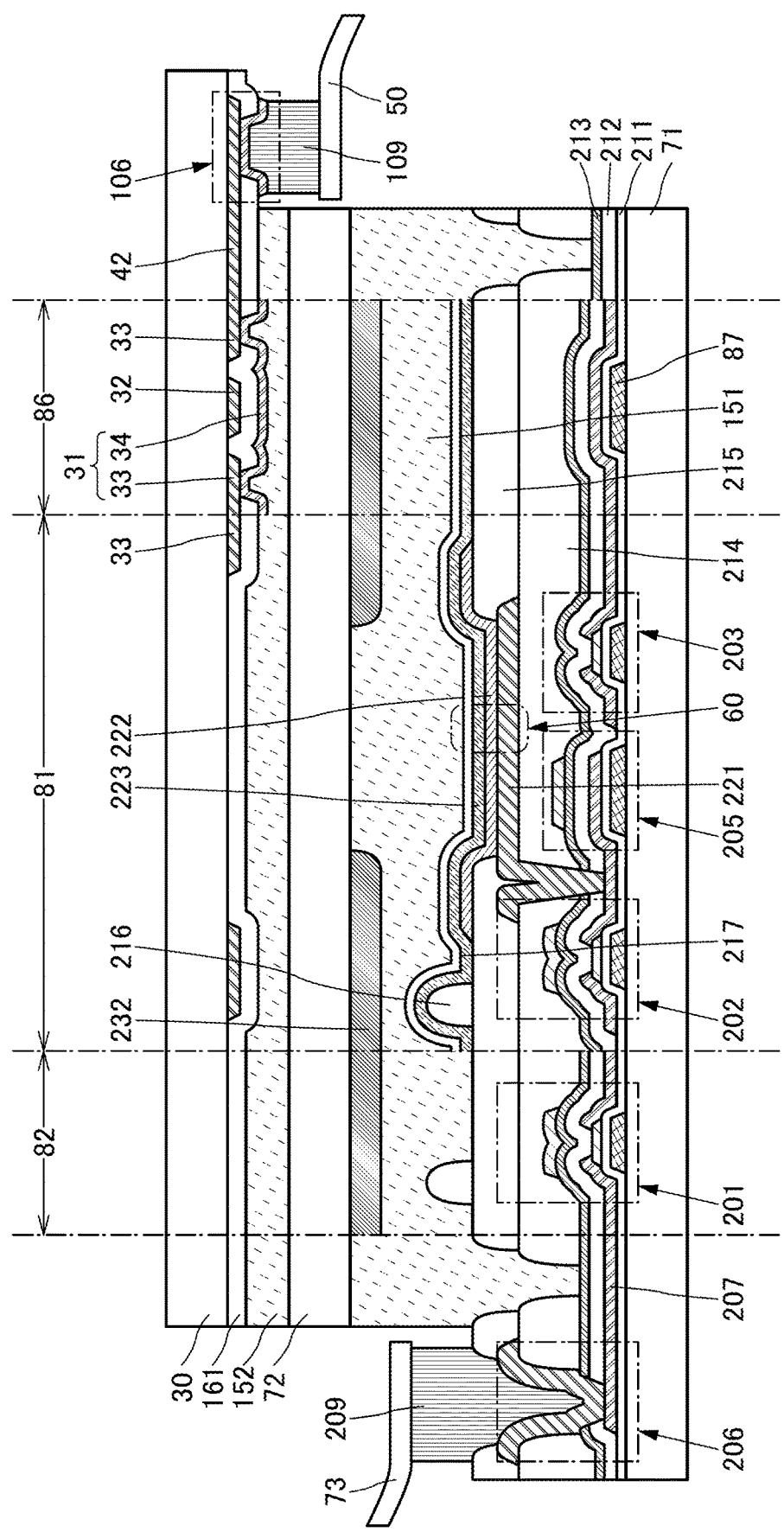
FIG. 15 illustrates a structure example of a touch panel of one embodiment.

FIG. 15 illustrates a cross-sectional structure example of the touch panel 100 which partly differs from the structure of FIG. 14.

In FIG. 15, in the transistors 201 and 202, conductive layers functioning as the second gates are provided between the insulating layer 213 and the insulating layer 214. Such a structure is preferable because the voltage to be applied to the second gates can be lowered as compared with the structure in FIG. 14.

FIG. 15 illustrates an example where the display element 60 is formed by a separate coloring method. Specifically, pixels of different colors include different EL layers 222 which emit light of the respective colors. In a region outside the light-emitting region of the display element 60, an end portion of the EL layer 222 is covered with the second electrode 223. The EL layer 222 can be formed by, for example, an evaporation method using a metal mask, a printing method, an inkjet method, or the like.

In the example illustrated in FIG. 15, the optical adjustment layer 224 and the coloring layer 231 illustrated in FIG. 14 are not provided.

FIG. 15 shows an example where a protection film 217 is provided to cover the second electrode 223. The protection film 217 serves as a barrier film that prevents impurities such as water from diffusing into the display element 60.

Although not illustrated in the drawing, an end portion of the EL layer 222 or an end portion of the second electrode 223 is covered with the protection film 217, whereby entry of water into the display element 60 can be more effectively inhibited.

As the protection film 217, an organic insulation material or an inorganic insulation material can be used. An inorganic insulation material is preferably used because a film with a high barrier property can be formed to be thin. When an inorganic insulation material is used as the protection film 217, silicon nitride, silicon nitride oxide, aluminum oxide, aluminum oxynitride, aluminum nitride oxide, aluminum nitride, hafnium oxide, or the like is preferably used. Aluminum oxide is particularly preferable because of its excellent barrier property. As a deposition method of the protection film 217, a sputtering method, an evaporation method, a chemical vapor deposition (CVD) method, an atomic layer deposition (ALD) method, or the like can be used. The ALD method is particularly preferable to inhibit damage to the display element 60 at the time of deposition. Although a thermal ALD method can be used as the ALD method, a plasma enhanced ALD (PEALD) method is more preferable because a film can be formed at low temperatures around room temperature.

Note that the structures of the transistors, the display elements 60, the protection film 217, and the like can be replaced with those of the transistors, the display elements and the like shown in FIG. 14 and cross-sectional structures described below.

[Cross-Sectional Structure Example 3]

Figure 16:
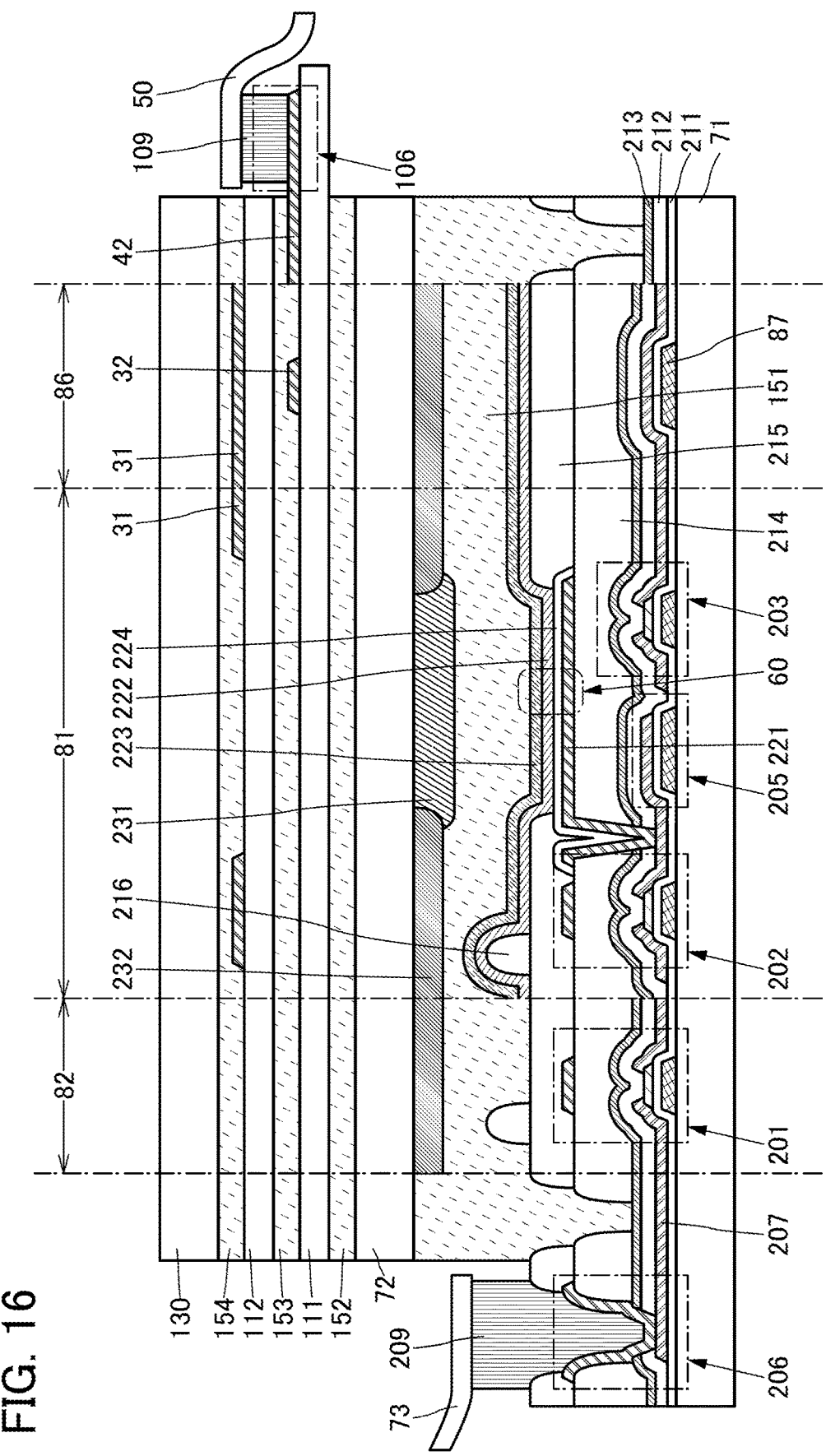
FIG. 16 illustrates a structure example of a touch panel of one embodiment.

A touch panel illustrated in FIG. 16 includes a substrate 111 and a substrate 112. The substrate 111 and the substrate 72 are attached to each other with the adhesive layer 152, and the substrate 111 and the substrate 112 are attached to each other with an adhesive layer 153.

The substrate 111 is provided with the electrode 32, the wiring 42, and the like. The substrate 112 is provided with the electrode 31, the wiring 41 (not illustrated), and the like. In FIG. 16, the FPC 50 is provided for the substrate 111; the substrate 112 is similarly provided with an FPC in a region not illustrated in the drawing.

In the case where two substrates are used in the structure of the input device 10 as described above, substrates as thin as, or thinner than, the substrates 71 and 72 are preferably used as the substrates 111 and 112. In particular, the material having flexibility described above is preferably used for the substrates 111 and 112, in which case the thickness of the touch panel 100 can be decreased.

A protective substrate 130 may be provided over the substrate 112 with an adhesive layer 154 therebetween as illustrated in FIG. 16. A surface of the protective substrate 130 on a side opposite to the substrate 112 side functions as a touch surface. The above description of the substrate 30 can be referred to for a material of the protective substrate 130.

[Cross-Sectional Structure Example 4]

Figure 17:
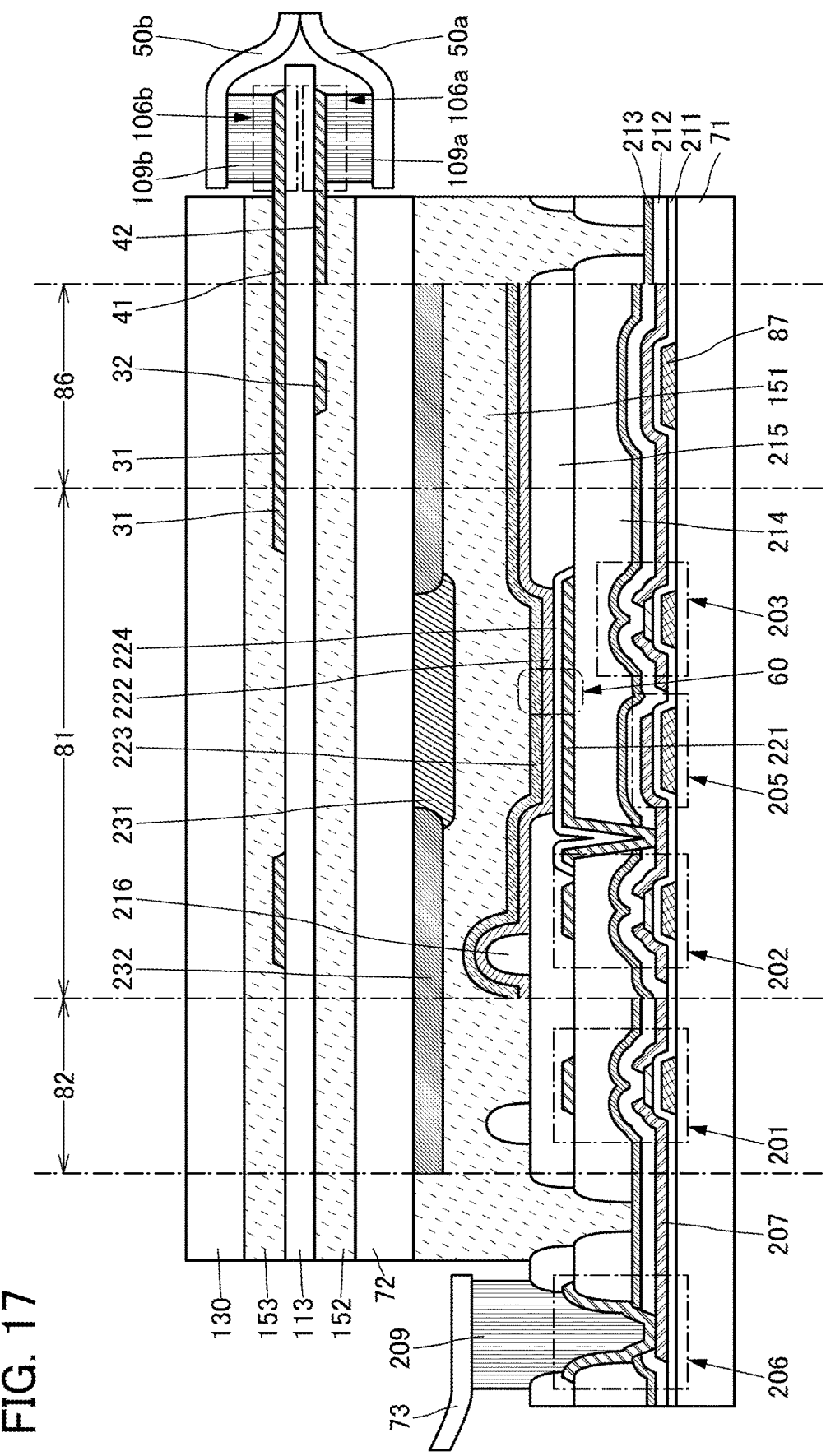
FIG. 17 illustrates a structure example of a touch panel of one embodiment.

A touch panel shown in FIG. 17 includes a substrate 113. The substrates 113 and 72 are attached to each other with the adhesive layer 152.

The substrate 113 is provided with the electrode 32, the wiring 42, and the like on one side. The substrate 113 is also provided with the electrode 31, the wiring 41, and the like on the other side. That is, the electrodes and wirings in the touch sensor are provided on both sides of the substrate 113.

FIG. 17 illustrates an example in which an FPC 50*a* and a connection layer 109*a* are provided in a connection portion 106*a* where part of the wiring 42 is exposed, and an FPC 50*b* and a connection layer 109*b* are provided in a connection portion 106*b* where part of the wiring 41 is exposed. Note that the connection portion 106*a* and the connection portion 106*b* may overlap with each other in a plan view, or may be arranged so as not to overlap with each other.

[Cross-Sectional Structure Example 5]

Figure 18:
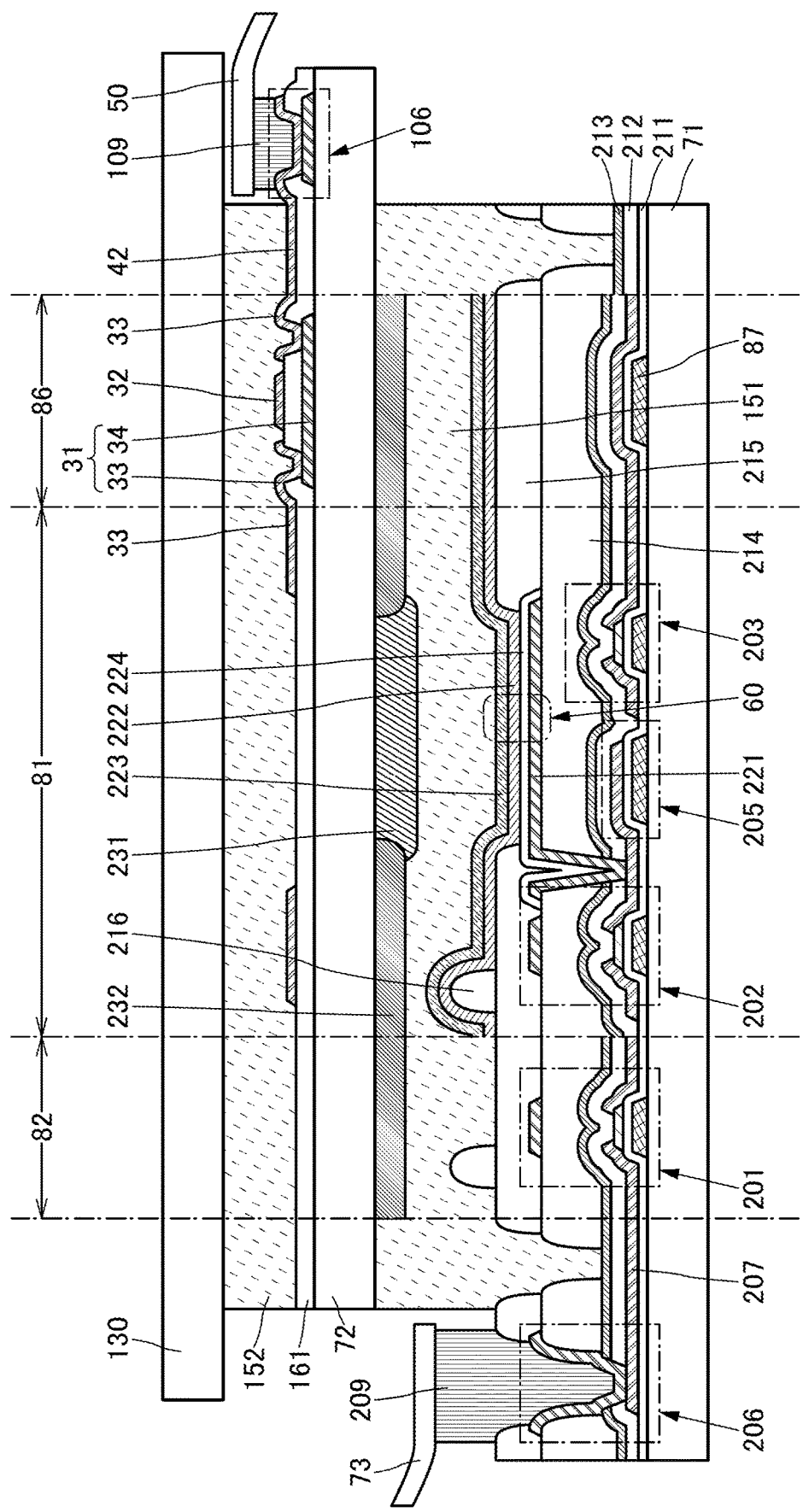
FIG. 18 illustrates a structure example of a touch panel of one embodiment.

In a touch panel illustrated in FIG. 18, the electrodes and the like of the touch sensor are provided over a surface of the substrate 72 that is opposite to a surface facing the substrate 71. Specifically, the substrate 72 is provided with the bridge electrode 34, and the insulating layer 161 covering part of the bridge electrode 34; and the electrode 31, the electrode 32, the wiring 41 (not illustrated), the wiring 42, and the like are over the insulating layer 161.

As illustrated in FIG. 18, the protective substrate 130 and the substrate 72 may be attached to each other with the adhesive layer 152.

In this structure, the input device 10 and the display panel 70 can share the substrate; thus, the thickness of the touch panel can be significantly decreased.

[Cross-Sectional Structure Example 6]

Figure 19:
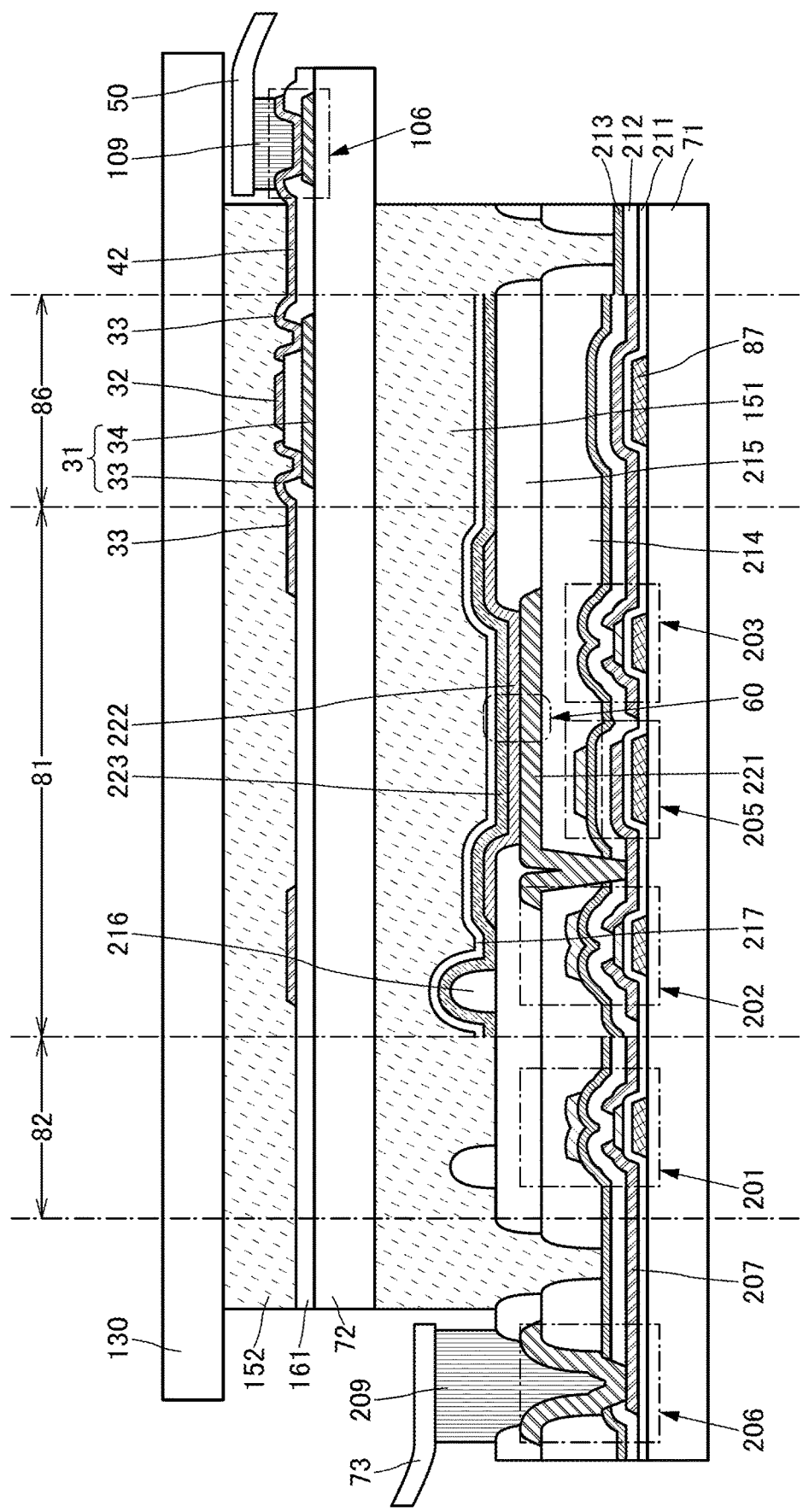
FIG. 19 illustrates a structure example of a touch panel of one embodiment.

FIG. 19 illustrates an example in which the structure of the touch sensor illustrated in FIG. 18 is combined with the structure of the touch panel illustrated in FIG. 15 where the light-emitting element formed by a separate coloring method is used as the display element 60. In the example illustrated in FIG. 19, the light-blocking layer 232 is not provided.

[Cross-Sectional Structure Example 7]

Figure 20:
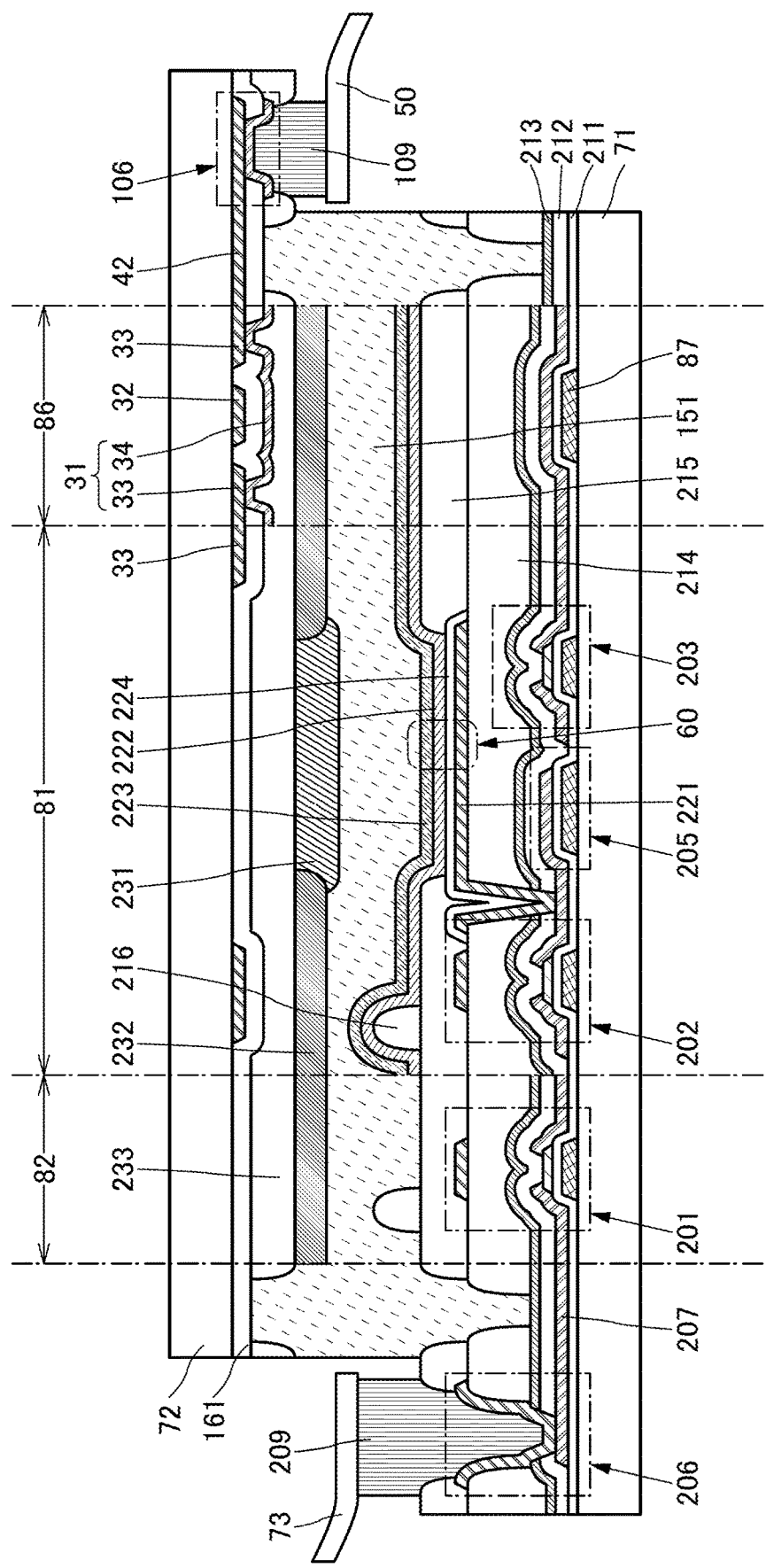
FIG. 20 illustrates a structure example of a touch panel of one embodiment.

In a touch panel illustrated in FIG. 20, the electrodes and the like of the touch sensor are provided on the substrate 71 side of the substrate 72. Specifically, the substrate 72 is provided with the electrode 32, the electrode 33, the wiring 41 (not illustrated), the wiring 42, the insulating layer 161 covering these components, and the bridge electrode 34 over the insulating layer 161, and the like.

An insulating layer 233 is provided to cover the electrodes and the like in the touch sensor. In addition, the coloring layer 231, the light-blocking layer 232, and the like are provided over the insulating layer 233.

In this structure, the input device 10 and the display panel 70 can share the substrate and one surface of the substrate 72 can be used as a touch surface; thus, the thickness of the touch panel 100 can be further decreased.

[Cross-Sectional Structure Example 8]

Figure 21:
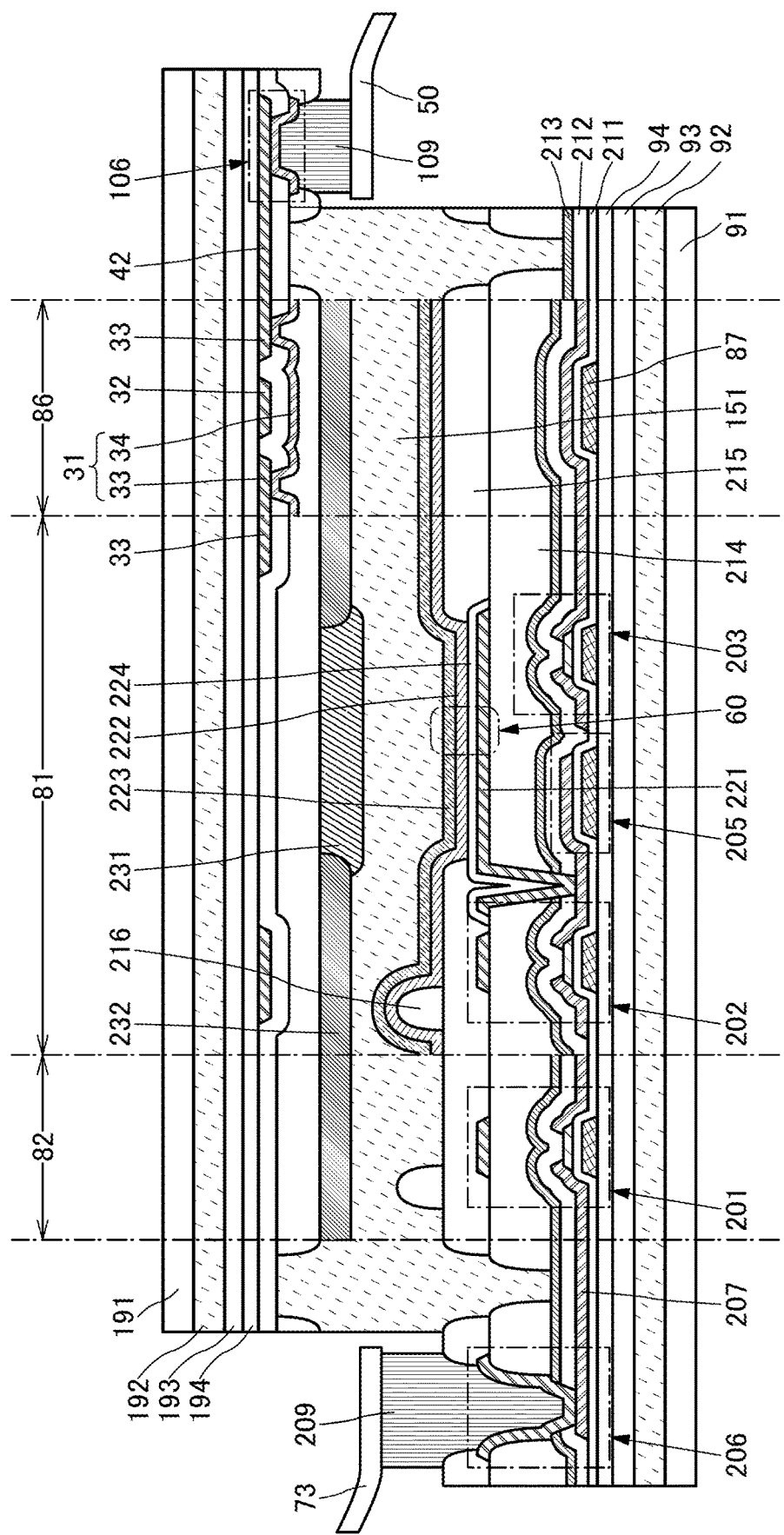
FIG. 21 illustrates a structure example of a touch panel of one embodiment.

FIG. 21 illustrates a modification example of the touch panel shown in FIG. 20.

The touch panel in FIG. 21 has a stacked-layer structure including a substrate 91, an adhesive layer 92, a substrate 93, and an insulating layer 94 in place of the substrate 71. The touch panel also has a stacked-layer structure including a substrate 191, an adhesive layer 192, a substrate 193, and an insulating layer 194 in place of the substrate 72.

A material through which impurities such as water or hydrogen do not easily diffuse can be used for the insulating layer 94 and the insulating layer 194. Such a structure can effectively suppress diffusion of the impurities into the display element 60 and the transistors even in the case of using a material permeable to water for the substrate 91, the substrate 93, the substrate 191, and the substrate 193, and a highly reliable touch panel can be achieved.

A material such as a resin having flexibility can be used for the substrate 93 and the substrate 193. Films having flexibility or the like are preferably used as the substrate 91 and the substrate 191. With the use of a material having flexibility for these substrates, a bendable touch panel can be achieved.

[Cross-Sectional Structure Example 9]

Figure 22:
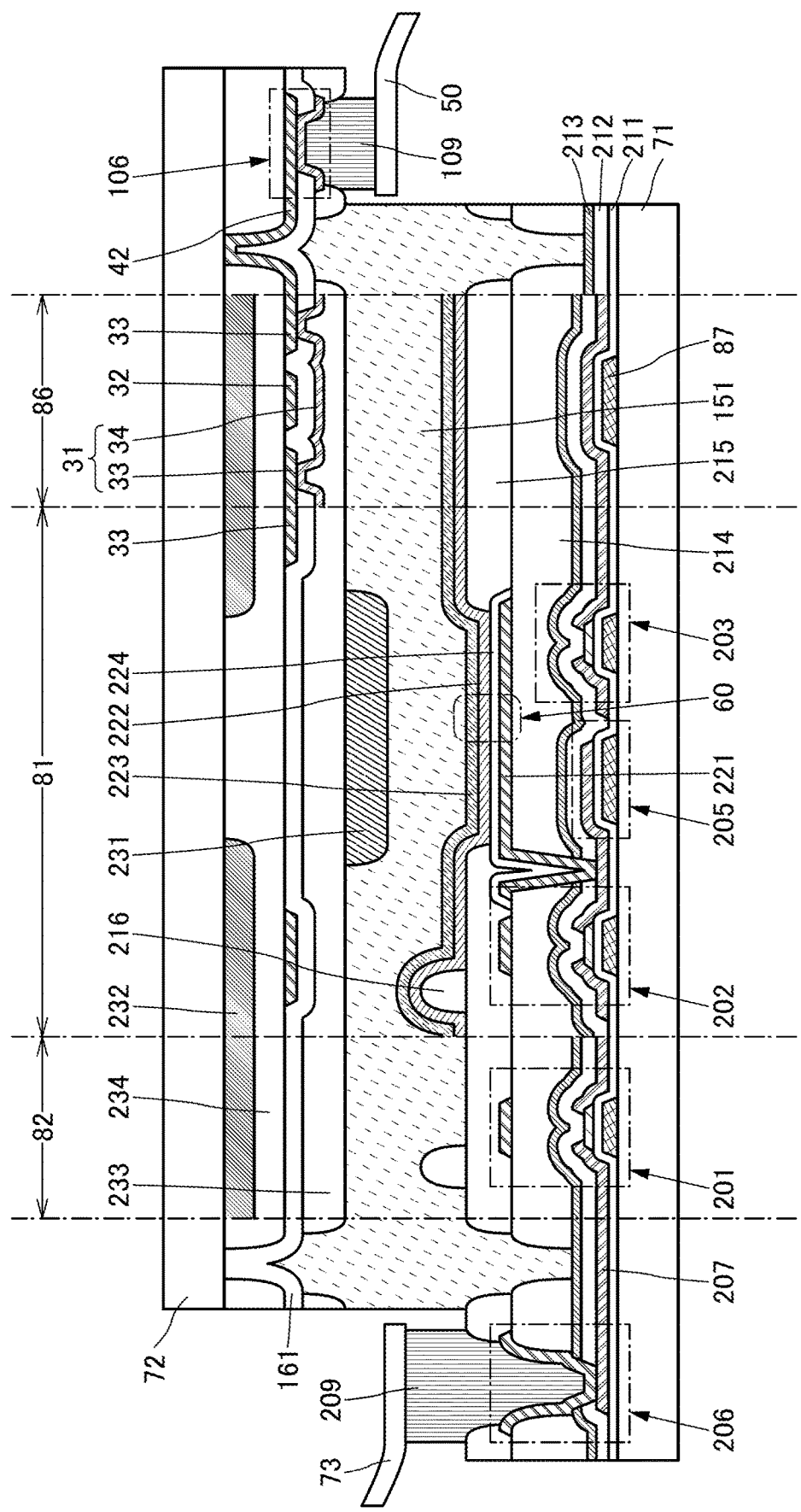
FIG. 22 illustrates a structure example of a touch panel of one embodiment.

In a touch panel illustrated in FIG. 22, the light-blocking layer 232 is provided between the electrodes and the like of the touch sensor and the substrate 72. Specifically, the substrate 72 is provided with the light-blocking layer 232, and an insulating layer 234 is formed to cover the light-blocking layer 232. The electrode 32, the electrode 33, the wiring 41 (not illustrated), the wiring 42, the insulating layer 161 covering these components, and the bridge electrode 34 riding the insulating layer 161, and the like are provided for an insulating layer 234. In addition, the insulating layer 233 is formed to ride the bridge electrode 34 and the insulating layer 161, and the coloring layer 231 is formed to ride the insulating layer 233, and the like.

The insulating layers 233 and 234 have a function as a planarization film. Note that the insulating layer 233 and 234 are not necessarily provided when not needed.

With such a structure, the light-blocking layer 232 provided in a position closer to the viewing side than the electrodes and the like of the touch sensor is can prevent external light from being reflected by the electrodes and the like, and prevent the electrodes and the like from being visible. Thus, a touch panel with not only small thickness but also improved visibility can be achieved.

[Cross-Sectional Structure Example 10]

Figure 23:
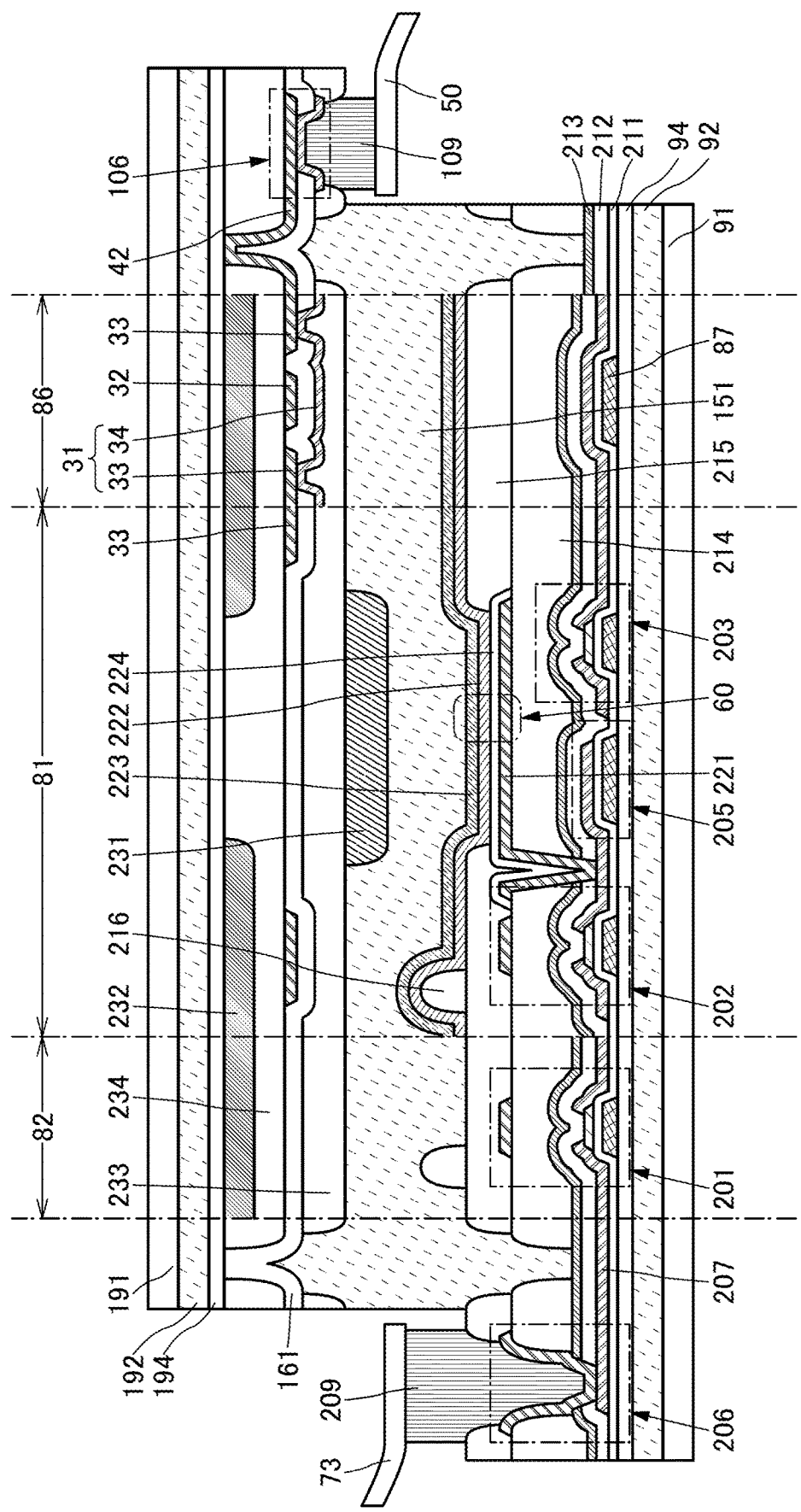
FIG. 23 illustrates a structure example of a touch panel of one embodiment.

FIG. 23 illustrates a modification example of the touch panel illustrated in FIG. 22.

The touch panel in FIG. 23 has a stacked-layer structure including the substrate 91, the adhesive layer 92, and the insulating layer 94 in place of the substrate 71. The touch panel also has a stacked-layer structure including the substrate 191, the adhesive layer 192, and the insulating layer 194 in place of the substrate 72.

With the use of a material having flexibility for the substrates 91 and 191, a bendable touch panel can be achieved.

[Cross-Sectional Structure Example 11]

Figure 24:
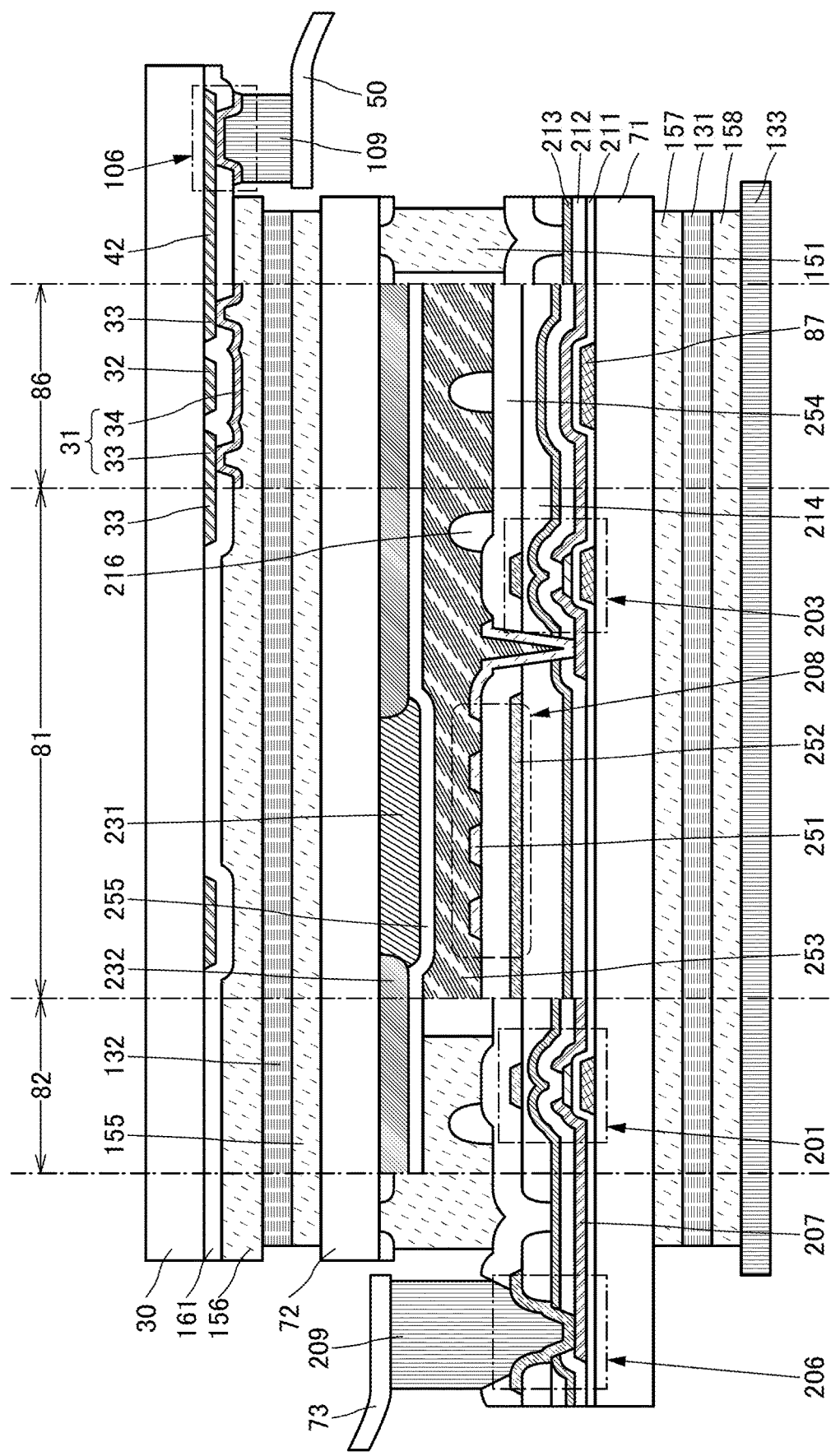
FIG. 24 illustrates a structure example of a touch panel of one embodiment.

FIG. 24 illustrates a cross-sectional structure example of a touch panel where a liquid crystal display device is used as the display panel 70. In the touch panel illustrated in FIG. 24, a liquid crystal element is used as a display element 208. The touch panel includes a polarizing plate 131, a polarizing plate 132, and a backlight 133.

In the example illustrated here, a liquid crystal element using a fringe field switching (FFS) mode is used as the display element 208. The display element 208 includes an electrode 251, an electrode 252, and a liquid crystal 253. The electrode 251 is provided over the electrode 252 with an insulating layer 254 provided therebetween, and has a comb-like shape or a shape provided with a slit.

An overcoat 255 is provided to cover the coloring layer 231 and the light-blocking layer 232. The overcoat 255 has a function of preventing a pigment or the like which is included in the coloring layer 231 or the light-blocking layer 232 from diffusing into the liquid crystal 253.

Surfaces of the overcoat 255, the insulating layer 254, the electrode 251, and the like which are in contact with the liquid crystal 253 may be provided with alignment films for controlling the orientation of the liquid crystal 253.

In FIG. 24, the polarizing plate 131 is attached to the substrate 71 with an adhesive layer 157. The backlight 133 is attached to the polarizing plate 131 with an adhesive layer 158. The polarizing plate 132 is positioned between the substrate 72 and the substrate 30. The polarizing plate 132 is attached to the substrate 72 with an adhesive layer 155, and is attached to the substrate 30 (specifically, part of the insulating layer 161 provided with the substrate 30) with an adhesive layer 156.

Although the liquid crystal element using an FFS mode is described above, a vertical alignment (VA) mode, a twisted nematic (TN) mode, an in-plane-switching (IPS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, or the like can be used.

As the liquid crystal, a thermotropic liquid crystal, a low-molecular liquid crystal, a high-molecular liquid crystal, a ferroelectric liquid crystal, an anti-ferroelectric liquid crystal, a polymer dispersed liquid crystal (PDLC), or the like can be used. Moreover, a liquid crystal exhibiting a blue phase is preferably used because an alignment film is not needed and a wide viewing angle is obtained in that case.

[Cross-Sectional Structure Example 12]

Figure 25:
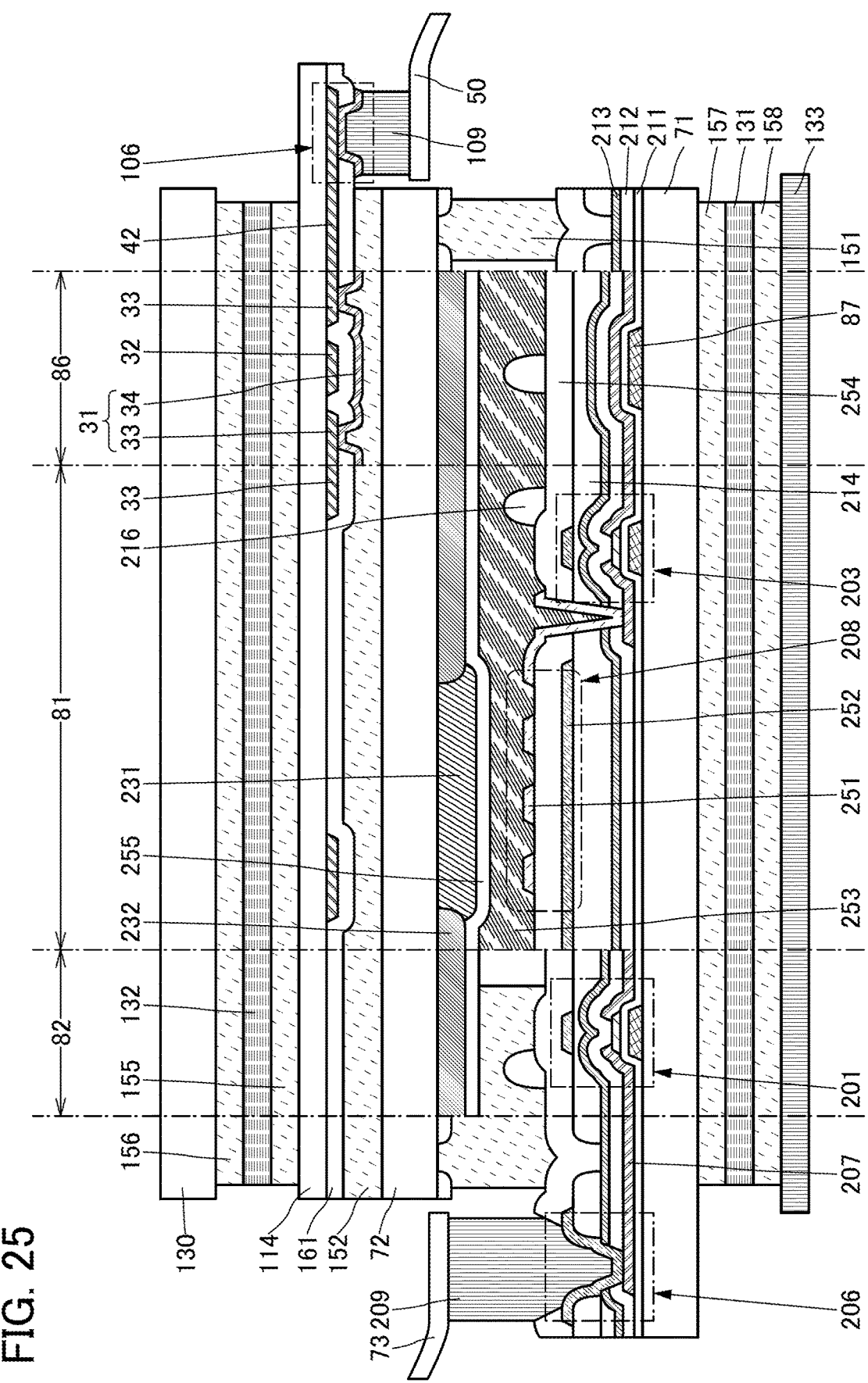
FIG. 25 illustrates a structure example of a touch panel of one embodiment.

FIG. 25 illustrates a cross-sectional structure example of a touch panel where a liquid crystal display device is used as the display panel 70. In the touch panel illustrated in FIG. 25, the polarizing plate 132 is provided in a position closer to the viewing side than that of the electrodes and the like in the touch sensor. Specifically, a substrate 114 provided with the electrode 31, the electrode 32, and the like is attached to the substrate 72 with the adhesive layer 152, and the polarizing plate 132 is attached to the substrate 114 with the adhesive layer 155. The protective substrate 130 attached to the polarizing plate 132 with the adhesive layer 156 is provided in a position closer to the viewing side than that of the polarizing plate 132.

A film having flexibility or the like is preferably used as the substrate 114 because the thickness of the touch panel can be decreased.

[Cross-Sectional Structure Example 13]

Figure 26:
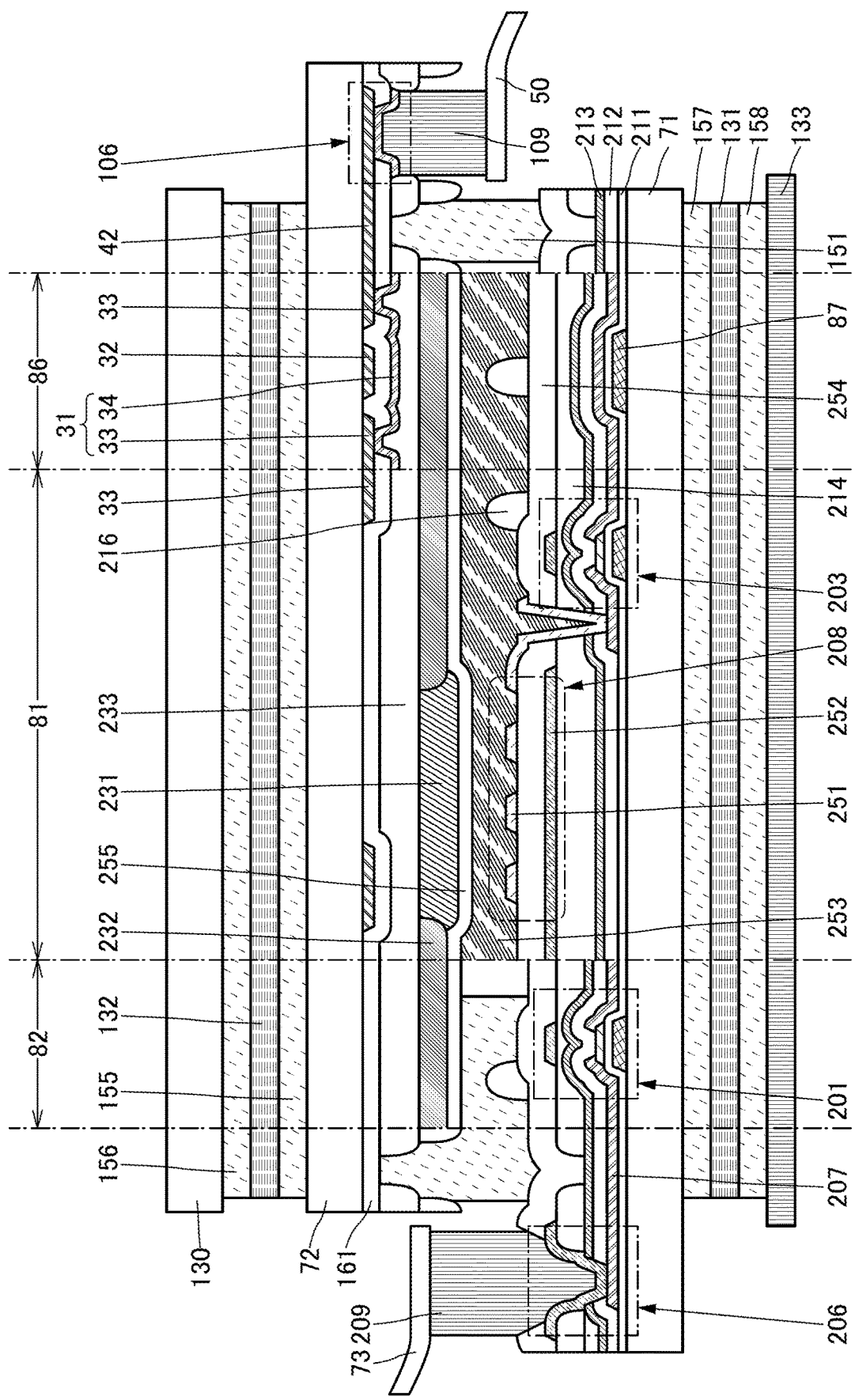
FIG. 26 illustrates a structure example of a touch panel of one embodiment.

FIG. 26 illustrates a cross-sectional structure example of a touch panel where a liquid crystal display device is used as the display panel. In the example of the touch panel illustrated in FIG. 26, the electrodes and the like of the touch sensor are formed on the substrate 71 side of the substrate 72. Specifically, the substrate 72 is provided with the electrode 32, the electrode 33, the wiring 41 (not illustrated), the wiring 42, the insulating layer 161 covering these components, and the bridge electrode 34 riding the insulating layer 161, and the like. The insulating layer 233 is formed to cover the electrodes and the like of the touch sensor. In addition, the coloring layer 231, the light-blocking layer 232, and the like are formed over the insulating layer 233.

The polarizing plate 132 is attached to the opposite side of the substrate 72 with the adhesive layer 155. The protective substrate 130 is attached to the polarizing plate 132 with the adhesive layer 156.

In this structure, the input device and the display panel can share the substrate and one surface of the substrate 72 can be used as a touch surface; thus, the thickness of the touch panel can be further decreased.

[Cross-Sectional Structure Example 14]

Figure 27:
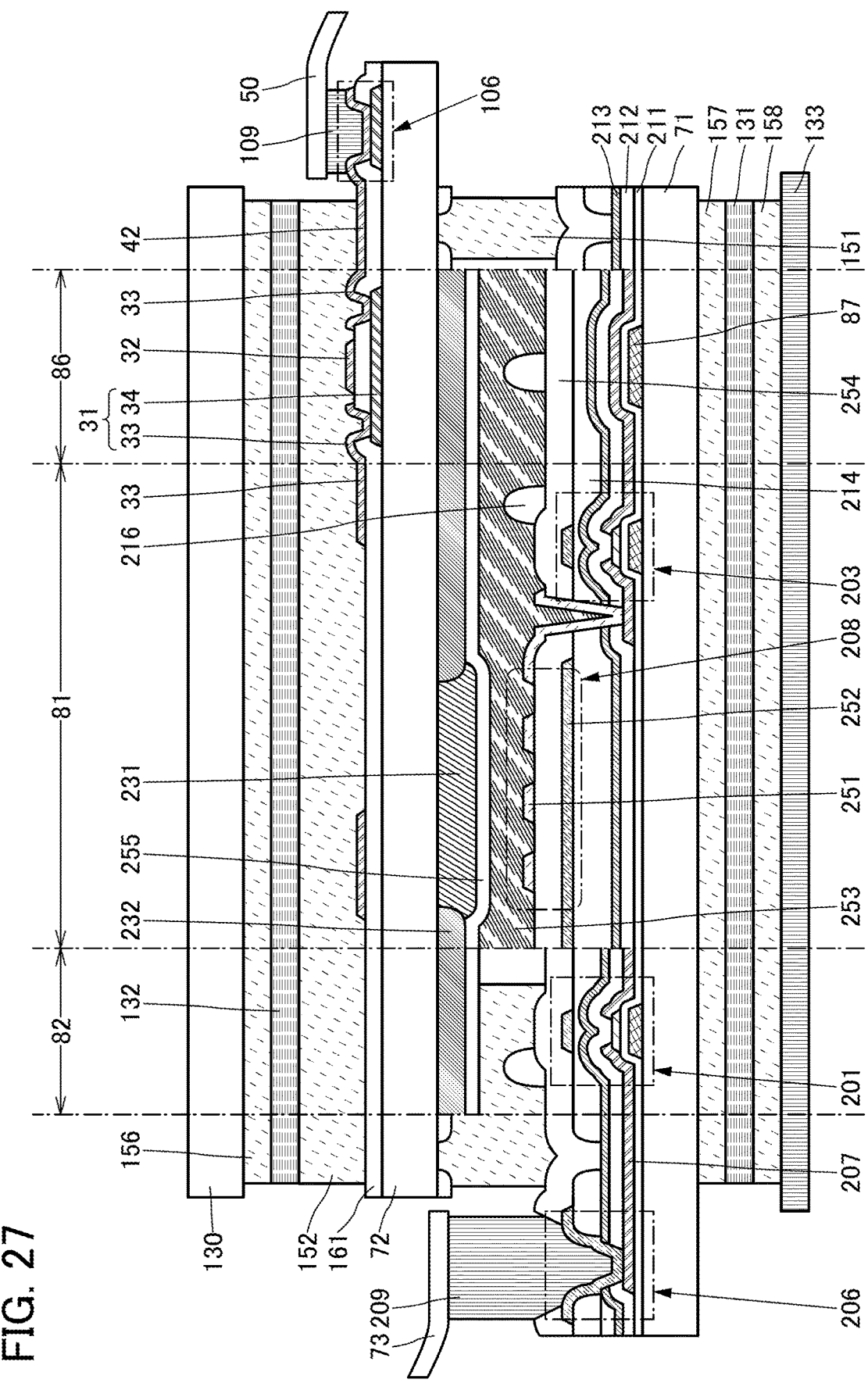
FIG. 27 illustrates a structure example of a touch panel of one embodiment.

FIG. 27 illustrates a cross-sectional structure example of a touch panel where a liquid crystal display device is used as the display panel. In the example of the touch panel illustrated in FIG. 27, the electrodes and the like of the touch sensor are provided on a side of the substrate 72 opposite to the substrate 71 side. Specifically, the bridge electrode 34 is formed over a surface of the substrate 72 on a side opposite to the side where the coloring layer 231 and the like are provided; the insulating layer 161 is formed to cover part of the bridge electrode 34; and the electrode 31, the electrode 32, the wiring 41 (not illustrated), the wiring 42, and the like are formed over the insulating layer 161. The polarizing plate 132 is attached to the substrate 72 with the adhesive layer 152, and the protective substrate 130 is attached to the polarizing plate 132 with the adhesive layer 156.

The above is the description of the cross-sectional structure examples.

[Example of Manufacturing Method]

Here, a method for manufacturing a flexible touch panel is described.

For convenience, a structure including a pixel and a circuit, a structure including an optical member such as a color filter, a structure including an electrode or a wiring of a touch sensor, or the like is referred to as an element layer. An element layer includes a display element, for example, and may include a wiring electrically connected to a display element or an element such as a transistor used in a pixel or a circuit in addition to the display element.

Here, a support body (e.g., the substrate 91 or the substrate 191 in FIG. 23) with an insulating surface where an element layer is formed is referred to as a substrate.

As a method for forming an element layer over a flexible substrate provided with an insulating surface, there are a method in which an element layer is formed directly over a substrate, and a method in which an element layer is formed over a supporting base material that has stiffness and then the element layer is separated from the supporting base material and transferred to the substrate.

In the case where a material of the substrate can withstand heating temperature in a process for forming the element layer, it is preferable that the element layer be formed directly over the substrate, in which case a manufacturing process can be simplified. At this time, the element layer is preferably formed in a state where the substrate is fixed to a supporting base material, in which case transfer thereof in an apparatus and between apparatuses can be easy.

In the case of employing the method in which the element layer is formed over the supporting base material and then transferred to the substrate, first, a separation layer and an insulating layer are stacked over the supporting base material, and then the element layer is formed over the insulating layer. Next, the element layer is separated from the supporting base material and then transferred to the substrate. At this time, selected is a material with which separation at an interface between the supporting base material and the separation layer, at an interface between the separation layer and the insulating layer, or in the separation layer occurs.

For example, it is preferable that a stacked layer of a layer including a high-melting-point metal material, such as tungsten, and a layer including an oxide of the metal material be used as the insulating layer as the separation layer, and a stacked layer of a plurality of layers, such as a silicon nitride layer and a silicon oxynitride layer be used as the insulating layer over the separation layer. The use of the high-melting-point metal material is preferable because the degree of freedom of the process for forming the element layer can be increased.

The separation may be performed by application of mechanical power, by etching of the separation layer, by dripping of a liquid into part of the separation interface to penetrate the entire separation interface, or the like. Alternatively, separation may be performed by heating the separation interface by utilizing a difference in thermal expansion coefficient.

The separation layer is not necessarily provided in the case where separation can occur at an interface between the supporting base material and the insulating layer. For example, glass and an organic resin such as polyimide may be used as the supporting base material and the insulating layer, respectively, and a separation trigger may be formed by locally heating part of the organic resin by laser light or the like, so that separation may be performed at an interface between the glass and the insulating layer. Alternatively, a metal layer may be provided between the supporting base material and the insulating layer formed of an organic resin, and separation may be performed at the interface between the metal layer and the insulating layer formed of an organic resin by heating the metal layer by feeding current to the metal layer. A layer of a light-absorbing material (e.g., a metal, a semiconductor, or an insulator) may be provided between the supporting base layer and the insulating layer formed of an organic resin and locally heated with laser light or the like to form a separation trigger. In these methods, the insulating layer formed of an organic resin can be used as a substrate.

Examples of such a substrate having flexibility include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, and a polyvinyl chloride resin. In particular, a material whose thermal expansion coefficient is low, for example, lower than or equal to $30 \times 10^{-6}$/K is preferable, and a polyamide imide resin, a polyimide resin, or PET can be suitably used. A substrate in which a fibrous body is impregnated with a resin (also referred to as prepreg) or a substrate whose thermal expansion coefficient is reduced by mixing an inorganic filler with an organic resin can also be used.

In the case where a fibrous body is included in the above material, a high-strength fiber of an organic compound or an inorganic compound is used as the fibrous body. The high-strength fiber is specifically a fiber with a high tensile elastic modulus or a fiber with a high Young's modulus. Typical examples thereof include a polyvinyl alcohol based fiber, a polyester based fiber, a polyamide based fiber, a polyethylene based fiber, an aramid based fiber, a polyparaphenylene benzobisoxazole fiber, a glass fiber, and a carbon fiber. As the glass fiber, glass fiber using E glass, S glass, D glass, Q glass, or the like can be used. These fibers may be used in a state of a woven fabric or a nonwoven fabric, and a structure body in which this fibrous body is impregnated with a resin and the resin is cured may be used as the flexible substrate. The structure body including the fibrous body and the resin is preferably used as the flexible substrate, in which case the reliability against bending or breaking due to local pressure can be increased.

Alternatively, glass, metal, or the like that is thin enough to have flexibility can be used as the substrate. Alternatively, a composite material where glass and a resin material are attached to each other may be used.

In the structure shown in FIG. 23, for example, a first separation layer and the insulating layer 94 are formed in this order over a first supporting base material, and then components over the first separation layer and the insulating layer 94 are formed. Separately, a second separation layer and the insulating layer 194 are formed in this order over a second supporting base material, and then upper components are formed. Next, the first supporting base material and the second supporting base material are attached to each other with the adhesive layer 151. After that, separation at an interface between the second separation layer and the insulating layer 194 is conducted so that the second supporting base material and the second separation layer are removed, and then the substrate 191 is attached to the insulating layer 194 with the adhesive layer 192. Further, separation at an interface between the first separation layer and the insulating layer 94 is conducted so that the first supporting base material and the first separation layer are removed, and then the substrate 91 is attached to the insulating layer 94 with the adhesive layer 92. Note that either side may be subjected to separation and attachment first.

The above is the description of a manufacturing method of a flexible touch panel.

Although a light-emitting element and a liquid crystal element are used as a display element here, one embodiment of the present invention is not limited thereto.

For example, a display element such as a micro electro mechanical system (MEMS) element or an electron-emissive element can be used in the display device. Examples of MEMS display elements include a MEMS shutter display element, an optical interference type MEMS display element, and the like. A carbon nanotube may be used for the electron-emissive element. Alternatively, electronic paper may be used. As the electronic paper, an element using a microcapsule method, an electrophoretic method, an electrowetting method, an Electronic Liquid Powder (registered trademark) method, or the like can be used.

At least part of this embodiment can be implemented in combination with any of the embodiments described in this specification as appropriate.

Embodiment 2

In this embodiment, examples of a driving method of an input device or an input/output device of one embodiment of the present invention are described with reference to drawings.

[Example of Sensing Method of Sensor]

Figure 28A:
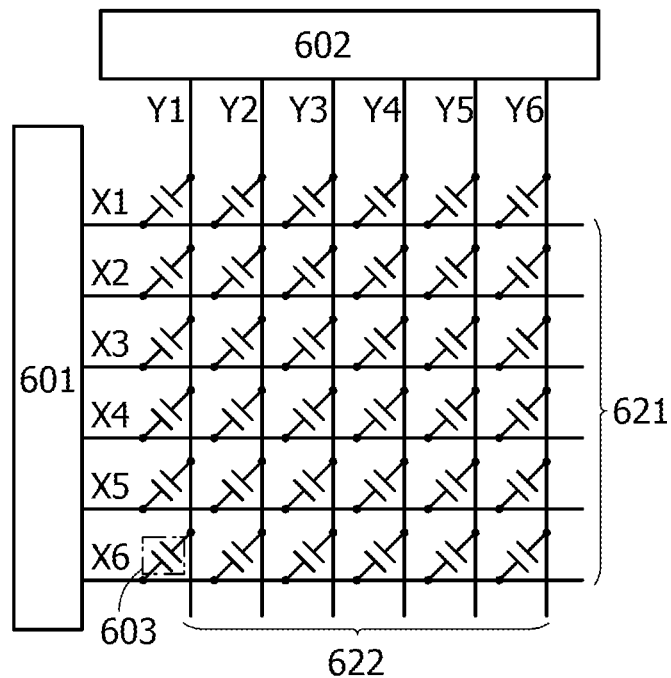
FIGS. 28A and 28B are a block diagram and a timing chart of a touch sensor of one embodiment.

FIG. 28A is a block diagram illustrating the structure of a mutual capacitive touch sensor. FIG. 28A illustrates a pulse voltage output circuit 601 and a current sensing circuit 602. Note that in FIG. 28A, six wirings X1 to X6 represent electrodes 621 to which a pulse voltage is applied, and six wirings Y1 to Y6 represent electrodes 622 that sense changes in current. FIG. 28A also illustrates a capacitor 603 that is formed where electrodes 621 and 622 overlap with each other. Note that functional replacement between the electrodes 621 and 622 is possible.

The pulse voltage output circuit 601 is a circuit for sequentially applying a pulse voltage to the wirings X1 to X6. By application of a pulse voltage to the wirings X1 to X6, an electric field is generated between the electrodes 621 and 622 of the capacitor 603. When the electric field between the electrodes is shielded, for example, a change occurs in mutual capacitance of the capacitor 603. The approach or contact of an object can be sensed by utilizing this change.

The current sensing circuit 602 is a circuit for sensing changes in current flowing through the wirings Y1 to Y6 that are caused by the change in capacitance in the capacitor 603. No change in current value is sensed in the wirings Y1 to Y6 when there is no approach or contact of an object, whereas a decrease in current value is sensed when capacitance is decreased owing to the approach or contact of an object. Note that an integrator circuit or the like is used for sensing of current values.

Figure 28B:
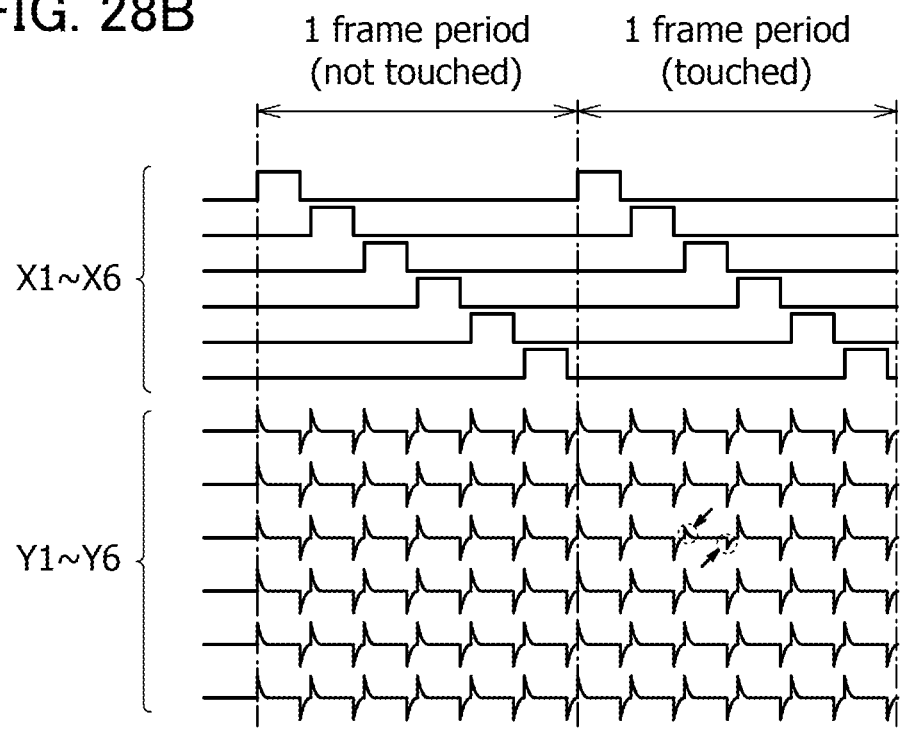

FIG. 28B is a timing chart showing input and output waveforms in the mutual capacitive touch sensor illustrated in FIG. 28A. In FIG. 28B, detection of an object is performed in all the rows and columns in one frame period. FIG. 28B shows a period when an object is not detected (not touched) and a period when an object is detected (touched). Sensed current values of the wirings Y1 to Y6 are shown as waveforms of voltage values.

A pulse voltage is sequentially applied to the wirings X1 to X6, and waveforms of the wirings Y1 to Y6 change in accordance with the pulse voltage. When there is no proximity or contact of an object, the waveforms of the wirings Y1 to Y6 change in accordance with changes in the voltages of the wirings X1 to X6. The current value is decreased at the point of approach or contact of the object and accordingly the waveform of the voltage value changes.

By sensing a change in mutual capacitance in this manner, proximity or contact of an object can be sensed.

It is preferable that the pulse voltage output circuit 601 and the current sensing circuit 602 be mounted on a substrate in a housing of an electronic appliance or on the touch panel in the form of an IC. In the case where the touch panel has flexibility, parasitic capacitance might be increased in a bent portion of the touch panel, and the influence of noise might be increased. In view of this, it is preferable to use an IC to which a driving method less influenced by noise is applied. For example, it is preferable to use an IC to which a driving method capable of increasing a signal-noise ratio (S/N ratio) is applied.

Figure 29:
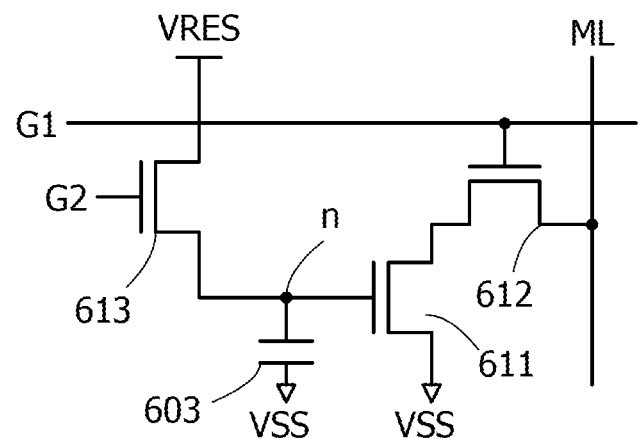
FIG. 29 is a circuit diagram of a touch sensor of one embodiment.

Although FIG. 28A is a passive matrix type touch sensor in which only the capacitor 603 is provided at the intersection portion of wirings as a touch sensor, an active matrix type touch sensor including a transistor and a capacitor may be used. FIG. 29 is a sensor circuit included in an active matrix type touch sensor.

The sensor circuit includes the capacitor 603 and transistors 611, 612, and 613. A signal G2 is input to a gate of the transistor 613. A voltage VRES is applied to one of a source and a drain of the transistor 613, and one electrode of the capacitor 603 and a gate of the transistor 611 are electrically connected to the other of the source and the drain of the transistor 613. One of a source and a drain of the transistor 611 is electrically connected to one of a source and a drain of the transistor 612, and a voltage VSS is applied to the other of the source and the drain of the transistor 611. A signal G1 is input to a gate of the transistor 612, and a wiring ML is electrically connected to the other of the source and the drain of the transistor 612. The voltage VSS is applied to the other electrode of the capacitor 603.

Next, the operation of the sensor circuit will be described. First, a potential for turning on the transistor 613 is supplied as the signal G2, and a potential with respect to the voltage VRES is thus applied to the node n connected to the gate of the transistor 611. Then, a potential for turning off the transistor 613 is applied as the signal G2, whereby the potential of the node n is maintained.

Then, capacitance of the capacitor 603 changes owing to the approach or contact of an object such as a finger, and accordingly the potential of the node n is changed from VRES.

In reading operation, a potential for turning on the transistor 612 is supplied as the signal G1. A current flowing through the transistor 611, that is, a current flowing through the wiring ML is changed in accordance with the potential of the node n. By sensing this current, the approach or contact of an object can be detected.

It is preferable that the transistors 611, 612, and 613 each include an oxide semiconductor in a semiconductor layer where a channel is formed. In particular, by using an oxide semiconductor in a semiconductor layer where a channel of the transistor 613 is formed, the potential of the node n can be held for a long time and the frequency of operation (refresh operation) of resupplying VRES to the node n can be reduced.

[Structure Example of In-Cell Touch Panel]

Although the examples where the electrodes in the touch sensor are formed over a substrate different from a substrate where the display element and the like are provided are described above, one or both of the pair of electrodes in the touch sensor may be formed over the substrate where the display element and the like are provided.

A structural example of a touch panel incorporating the touch sensor into a display portion including a plurality of pixels is described below. Here, an example where a liquid crystal element is used as a display element provided in the pixel is shown.

Figure 30A:
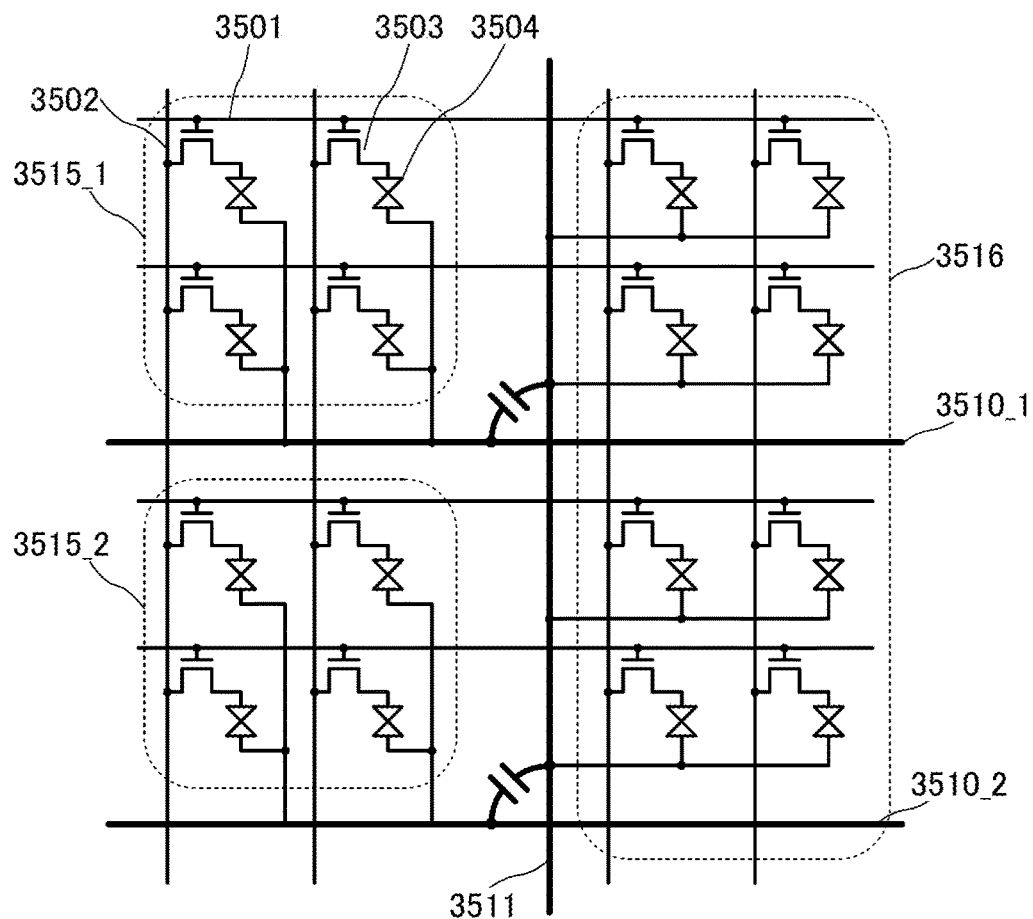
FIGS. 30A and 30B illustrate a pixel provided with a touch sensor of one embodiment.

FIG. 30A is an equivalent circuit diagram of part of a pixel circuit provided in the display portion of the touch panel in this structure example.

Each pixel includes at least a transistor 3503 and a liquid crystal element 3504. In addition, a gate of the transistor 3503 is electrically connected to a wiring 3501, and one of a source and a drain of the transistor 3503 is electrically connected to a wiring 3502.

The pixel circuit includes a plurality of wirings extending in the X direction (e.g., a wiring 3510_1 and a wiring 3510_2) and a plurality of wirings extending in the Y direction (e.g., a wiring 3511). These wirings are provided to intersect with each other, and capacitance is formed therebetween.

Among the pixels provided in the pixel circuit, electrodes on one side of the liquid crystal elements of some pixels adjacent to each other are electrically connected to each other to form one block. The block is classified into two types: an island-shaped block (e.g., a block 3515_1 or a block 3515_2) and a linear block (e.g., a block 3516) extending in the Y direction. Note that only part of the pixel circuit is illustrated in FIGS. 30A and 30B, but actually, these two kinds of blocks are repeatedly arranged in the X direction and the Y direction.

The wiring 3510_1 (or 3510_2) extending in the X direction is electrically connected to the island-shaped block 3515_1 (or the block 3515_2). Although not illustrated, the wiring 3510_1 extending in the X direction is electrically connected to a plurality of island-shaped blocks 3515_1 which are provided discontinuously along the X direction with the linear blocks therebetween. Further, the wiring 3511 extending in the Y direction is electrically connected to the linear block 3516.

Figure 30B:
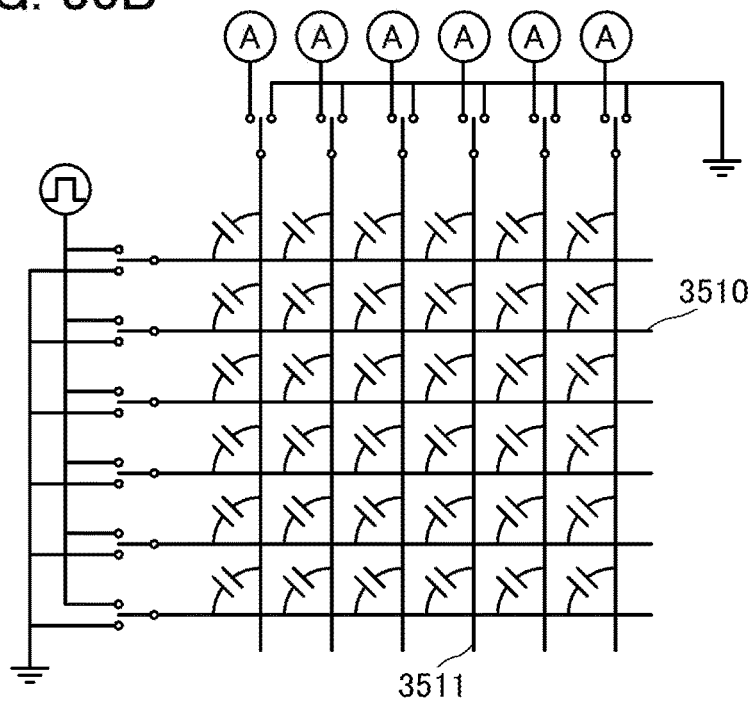

FIG. 30B is an equivalent circuit diagram illustrating the connection between a plurality of wirings 3510 extending in the X direction and the plurality of wirings 3511 extending in the Y direction. An input voltage or a common potential can be input to each of the wirings 3510 extending in the X direction. Further, a ground potential can be input to each of the wirings 3511 extending in the Y direction, or the wirings 3511 can be electrically connected to the sensing circuit.

Operation of the above-described touch panel is described with reference to FIGS. 31A and 31B.

Here, one frame period is divided into a writing period and a sensing period. The writing period is a period in which image data is written to a pixel, and the wirings 3510 (also referred to as gate lines or scan lines) are sequentially selected. On the other hand, the sensing period is a period in which sensing is performed by a touch sensor, and the wirings 3510 extending in the X direction are sequentially selected and an input voltage is input.

Figure 31A:
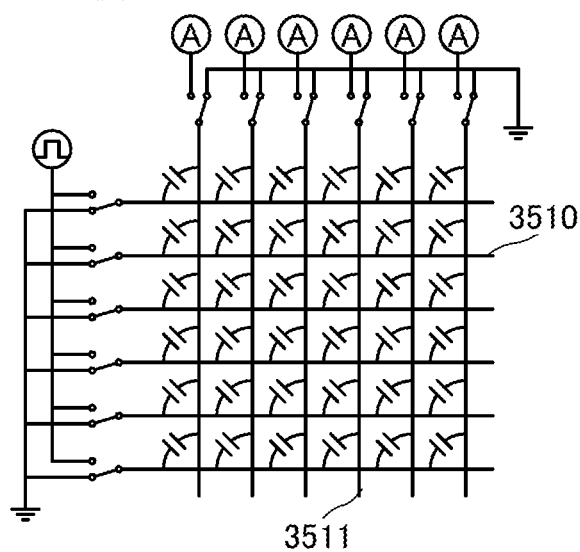
FIGS. 31A and 31B illustrate operation of a touch sensor and a pixel of one embodiment.

FIG. 31A is an equivalent circuit diagram in the writing period. In the writing period, a common potential is input to both the wiring 3510 extending in the X direction and the wiring 3511 extending in the Y direction.

Figure 31B:
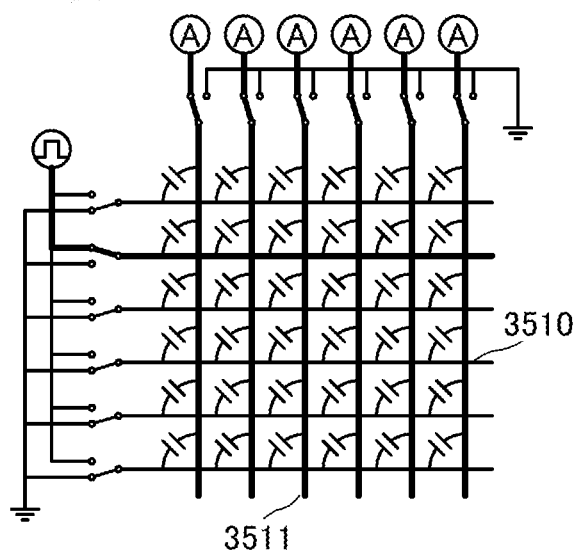

FIG. 31B is an equivalent circuit diagram at a certain point of time in the sensing period. In the sensing period, each of the wirings 3511 extending in the Y direction is electrically connected to the sensing circuit. An input voltage is input to the wirings 3510 extending in the X direction which are selected, and a common potential is input to the wirings 3510 extending in the X direction which are not selected.

Note that the driving method described here can be applied to not only an in-cell touch panel but also the above-described touch panels, and can be used in combination with the method described in the driving method example.

It is preferable that a period in which an image is written and a period in which sensing is performed by a touch sensor be separately provided as described above. Thus, a decrease in sensitivity of the touch sensor caused by noise generated when data is written to a pixel can be suppressed.

Embodiment 3

In this embodiment, electronic devices and lighting devices of one embodiment of the present invention will be described with reference to drawings.

Electronic devices and lighting devices can be manufactured by using the input device, the display device, or the input/output device of one embodiment of the present invention. Highly reliable electronic devices and lighting devices with curved surfaces can be manufactured by using the input device, the display device, or the input/output device of one embodiment of the present invention. In addition, flexible and highly reliable electronic devices and lighting devices can be manufactured by using the input device, the display device, or the input/output device of one embodiment of the present invention. Furthermore, electronic devices and lighting devices including touch sensors with improved detection sensitivity and sensing accuracy can be manufactured by using the input device or the input/output device of one embodiment of the present invention.

Examples of electronic devices include a television set (also referred to as a television or a television receiver), a monitor of a computer or the like, a digital camera, a digital video camera, a digital photo frame, a mobile phone (also referred to as a mobile phone device), a portable game machine, a portable information terminal, an audio reproducing device, a large game machine such as a pinball machine, and the like.

The electronic device or the lighting device of one embodiment of the present invention has flexibility and therefore can be incorporated along a curved inside/outside wall surface of a house or a building or a curved interior/exterior surface of a car.

Furthermore, the electronic device of one embodiment of the present invention may include a secondary battery. It is preferable that the secondary battery be capable of being charged by contactless power transmission.

As examples of the secondary battery, a lithium ion secondary battery such as a lithium polymer battery (lithium ion polymer battery) using a gel electrolyte, a lithium ion battery, a nickel-hydride battery, a nickel-cadmium battery, an organic radical battery, a lead-acid battery, an air secondary battery, a nickel-zinc battery, and a silver-zinc battery can be given.

The electronic device of one embodiment of the present invention may include an antenna. When a signal is received by the antenna, the electronic device can display an image, data, or the like on a display portion. When the electronic device includes a secondary battery, the antenna may be used for contactless power transmission.

FIGS. 32A, 32B, 32C1, 32C2, 32D, and 32E illustrate examples of an electronic device including a display portion 7000 with a curved surface. The display surface of the display portion 7000 is bent, and images can be displayed on the bent display surface. The display portion 7000 may be flexible.

The display portion 7000 can be formed using the display device, the input/output device, or the like of one embodiment of the present invention. One embodiment of the present invention makes it possible to provide a highly reliable electronic device having a curved display portion.

FIG. 32A illustrates an example of a mobile phone. A mobile phone 7100 includes a housing 7101, the display portion 7000, operation buttons 7103, an external connection port 7104, a speaker 7105, a microphone 7106, and the like.

The mobile phone 7100 illustrated in FIG. 32A includes a touch sensor in the display portion 7000. Moreover, operations such as making a call and inputting a letter can be performed by touch on the display portion 7000 with a finger, a stylus, or the like.

With the operation buttons 7103, power ON or OFF can be switched. In addition, types of images displayed on the display portion 7000 can be switched; for example, switching from a mail creation screen to a main menu screen can be performed.

FIG. 32B illustrates an example of a television set. In a television set 7200, the display portion 7000 is incorporated into a housing 7201. Here, the housing 7201 is supported by a stand 7203.

The television set 7200 illustrated in FIG. 32B can be operated with an operation switch of the housing 7201 or a separate remote controller 7211. The display portion 7000 may include a touch sensor. The display portion 7000 can be operated by touching the display portion with a finger or the like. The remote controller 7211 may be provided with a display portion for displaying data output from the remote controller 7211. With operation keys or a touch panel of the remote controller 7211, channels and volume can be controlled and images displayed on the display portion 7000 can be controlled.

The television set 7200 is provided with a receiver, a modem, and the like. A general television broadcast can be received with the receiver. When the television set is connected to a communication network with or without wires via the modem, one-way (from a transmitter to a receiver) or two-way (between a transmitter and a receiver or between receivers) data communication can be performed.

FIGS. 32C1, 32C2, 32D, and 32E illustrate examples of a portable information terminal. Each of the portable information terminals includes a housing 7301 and the display portion 7000. Each of the portable information terminals may also include an operation button, an external connection port, a speaker, a microphone, an antenna, a battery, or the like. The display portion 7000 is provided with a touch sensor. An operation of the portable information terminal can be performed by touching the display portion 7000 with a finger, a stylus, or the like.

FIG. 32C1 is a perspective view of a portable information terminal 7300. FIG. 32C2 is a top view of the portable information terminal 7300. FIG. 32D is a perspective view of a portable information terminal 7310. FIG. 32E is a perspective view of a portable information terminal 7320.

Each of the portable information terminals illustrated in this embodiment functions as, for example, one or more of a telephone set, a notebook, and an information browsing system. Specifically, the portable information terminals each can be used as a smartphone. Each of the portable information terminals illustrated in this embodiment is capable of executing a variety of applications such as mobile phone calls, e-mailing, reading and editing texts, music reproduction, Internet communication, and a computer game, for example.

The portable information terminals 7300, 7310, and 7320 can display characters and image information on its plurality of surfaces. For example, as illustrated in FIGS. 32C1 and 32D, three operation buttons 7302 can be displayed on one surface, and information 7303 indicated by a rectangle can be displayed on another surface. FIGS. 32C1 and 32C2 illustrate an example in which information is displayed at the top of the portable information terminal. FIG. 32D illustrates an example in which information is displayed on the side of the portable information terminal. Information may be displayed on three or more surfaces of the portable information terminal. FIG. 32E illustrates an example where information 7304, information 7305, and information 7306 are displayed on different surfaces.

Examples of the information include notification from a social networking service (SNS), display indicating reception of an e-mail or an incoming call, the title of an e-mail or the like, the sender of an e-mail or the like, the date, the time, remaining battery, and the reception strength of an antenna. Alternatively, the operation button, an icon, or the like may be displayed instead of the information.

For example, a user of the portable information terminal 7300 can see the display (here, the information 7303) on the portable information terminal 7300 put in a breast pocket of his/her clothes.

Specifically, a caller's phone number, name, or the like of an incoming call is displayed in a position that can be seen from above the portable information terminal 7300. Thus, the user can see the display without taking out the portable information terminal 7300 from the pocket and decide whether to answer the call.

FIGS. 32F to 32H each illustrate an example of a lighting device having a curved light-emitting portion.

The light-emitting portion included in each of the lighting devices illustrated in FIGS. 32F to 32H can be manufactured using the display device, an input/output device, or the like of one embodiment of the present invention. According to one embodiment of the present invention, a highly reliable lighting device having a curved light-emitting portion can be provided.

A lighting device 7400 illustrated in FIG. 32F includes a light-emitting portion 7402 with a wave-shaped light-emitting surface and thus is a good-design lighting device.

A light-emitting portion 7412 included in the lighting device 7410 illustrated in FIG. 32G has two convex-curved light-emitting portions symmetrically placed. Thus, all directions can be illuminated with the lighting device 7410 as a center.

Alighting device 7420 illustrated in FIG. 32H includes a concave-curved light-emitting portion 7422. This is suitable for illuminating a specific range because light emitted from the concave-curved light-emitting portion 7422 is collected to the front of the lighting device 7420. In addition, with this structure, a shadow is less likely to be produced.

The light-emitting portion included in each of the lighting devices 7400, 7410 and 7420 may be flexible. The light-emitting portion may be fixed on a plastic member, a movable frame, or the like so that a light-emitting surface of the light-emitting portion can be bent freely depending on the intended use.

The lighting devices 7400, 7410, and 7420 each include a stage 7401 provided with an operation switch 7403 and the light-emitting portion supported by the stage 7401.

Note that although the lighting device in which the light-emitting portion is supported by the stage is described as an example here, a housing provided with a light-emitting portion can be fixed on a ceiling or suspended from a ceiling. Since the light-emitting surface can be curved, the light-emitting surface is curved to have a concave shape, whereby a particular region can be brightly illuminated, or the light-emitting surface is curved to have a convex shape, whereby a whole room can be brightly illuminated.

FIGS. 33A1, 33A2, 33B, 33C, 33D, 33E, 33F, 33G, 33H, and 33I each illustrate an example of a portable information terminal including a display portion 7001 having flexibility.

The display portion 7001 is manufactured using the display device, the input/output device, or the like of one embodiment of the present invention. For example, a display device, or an input/output device that can be bent with a radius of curvature of greater than or equal to 0.01 mm and less than or equal to 150 mm can be used. The display portion 7001 may include a touch sensor so that the portable information terminal can be operated by touching the display portion 7001 with a finger or the like. One embodiment of the present invention makes it possible to provide a highly reliable electronic device including a display portion having flexibility.

FIGS. 33A1 and 33A2 are a perspective view and a side view illustrating an example of the portable information terminal, respectively. A portable information terminal 7500 includes a housing 7501, the display portion 7001, a display portion tab 7502, operation buttons 7503, or the like.

The portable information terminal 7500 includes a rolled flexible display portion 7001 in the housing 7501.

The portable information terminal 7500 can receive a video signal with a control portion incorporated therein and can display the received video on the display portion 7001. The portable information terminal 7500 incorporates a battery. A terminal portion for connecting a connector may be included in the housing 7501 so that a video signal or power can be directly supplied from the outside with a wiring.

By pressing the operation buttons 7503, power ON/OFF, switching of displayed videos, and the like can be performed. Although FIGS. 33A1, 33A2, and 33B illustrate an example where the operation buttons 7503 are positioned on a side surface of the portable information terminal 7500, one embodiment of the present invention is not limited thereto. The operation buttons 7503 may be placed on a display surface (a front surface) or a rear surface of the portable information terminal 7500.

FIG. 33B illustrates the portable information terminal 7500 in a state where the display portion 7001 is pulled out with the display portion tab 7502. Videos can be displayed on the display portion 7001 in this state. In addition, the portable information terminal 7500 may perform different displays in the state where part of the display portion 7001 is rolled as shown in FIG. 33A1 and in the state where the display portion 7001 is pulled out with the display portion tab 7502 as shown in FIG. 33B. For example, in the state shown in FIG. 33A1, the rolled portion of the display portion 7001 is put in a non-display state, which results in a reduction in power consumption of the portable information terminal 7500.

A reinforcement frame may be provided for a side portion of the display portion 7001 so that the display portion 7001 has a flat display surface when pulled out.

Note that in addition to this structure, a speaker may be provided for the housing so that sound is output with the use of an audio signal received together with a video signal.

FIGS. 33C to 33E illustrate an example of a foldable portable information terminal. FIG. 33C illustrates a portable information terminal 7600 that is opened. FIG. 33D illustrates the portable information terminal 7600 that is being opened or being folded. FIG. 33E illustrates the portable information terminal 7600 that is folded. The portable information terminal 7600 is highly portable when folded, and is highly browsable when opened because of a seamless large display area.

A display portion 7001 is supported by three housings 7601 joined together by hinges 7602. By folding the portable information terminal 7600 at a connection portion between two housings 7601 with the hinges 7602, the portable information terminal 7600 can be reversibly changed in shape from an opened state to a folded state.

FIGS. 33F and 33G illustrate an example of a foldable portable information terminal. FIG. 33F illustrates a portable information terminal 7650 that is folded so that the display portion 7001 is on the inside. FIG. 33G illustrates the portable information terminal 7650 that is folded so that the display portion 7001 is on the outside. The portable information terminal 7650 includes the display portion 7001 and a non-display portion 7651. When the portable information terminal 7650 is not used, the portable information terminal 7650 is folded so that the display portion 7001 is on the inside, whereby the display portion 7001 can be prevented from being contaminated or damaged.

FIG. 33H illustrates an example of a flexible portable information terminal. A portable information terminal 7700 includes a housing 7701 and the display portion 7001. The portable information terminal 7700 may include buttons 7703a and 7703b which serve as input means, speakers 7704a and 7704b which serve as sound output means, an external connection port 7705, a microphone 7706, or the like. A flexible battery 7709 can be included in the portable information terminal 7700. The battery 7709 may be arranged to overlap with the display portion 7001, for example.

The housing 7701, the display portion 7001, the battery 7709 are flexible. Thus, it is easy to curve the portable information terminal 7700 into a desired shape or to twist the portable information terminal 7700. For example, the portable information terminal 7700 can be curved so that the display portion 7001 is on the inside or on the outside. The portable information terminal 7700 can be used in a rolled state. Since the housing 7701 and the display portion 7001 can be transformed freely in this manner, the portable information terminal 7700 is less likely to be broken even when the portable information terminal 7700 falls down or external stress is applied to the portable information terminal 7700.

The portable information terminal 7700 can be used conveniently in various situations because the portable information terminal 7700 is lightweight. For example, the portable information terminal 7700 can be used in the state where the upper portion of the housing 7701 is suspended by a clip or the like, or in the state where the housing 7701 is fixed to a wall by magnets or the like.

FIG. 33I illustrates an example of a wrist-watch-type portable information terminal. The portable information terminal 7800 includes a band 7801, the display portion 7001, an input-output terminal 7802, operation buttons 7803, and the like. The band 7801 has a function of a housing. A flexible battery 7805 can be included in the portable information terminal 7800. The battery 7805 may overlap with the display portion 7001 and the band 7801, for example.

The band 7801, the display portion 7001, and the battery 7805 have flexibility. Thus, the portable information terminal 7800 can be easily curved to have a desired shape.

With the operation buttons 7803, a variety of functions such as time setting, ON/OFF of the power, ON/OFF of wireless communication, setting and cancellation of silent mode, and setting and cancellation of power saving mode can be performed. For example, the functions of the operation buttons 7803 can be set freely by the operating system incorporated in the portable information terminal 7800.

By touching an icon 7804 displayed on the display portion 7001 with a finger or the like, application can be started.

The portable information terminal 7800 can employ near field communication conformable to a communication standard. In that case, for example, mutual communication between the portable information terminal and a headset capable of wireless communication can be performed, and thus hands-free calling is possible.

The portable information terminal 7800 may include the input-output terminal 7802. In the case where the input-output terminal 7802 is included in the portable information terminal 7800, data can be directly transmitted to and received from another information terminal via a connector. Charging through the input-output terminal 7802 is also possible. Note that charging of the portable information terminal described as an example in this embodiment can be performed by contactless power transmission without using the input-output terminal.

Figure 34A:
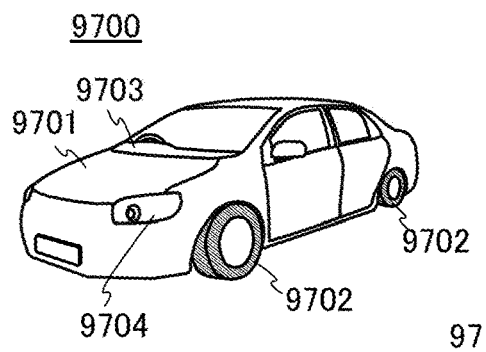
FIGS. 34A to 34E illustrate examples of electronic devices of one embodiment.
Figure 34B:
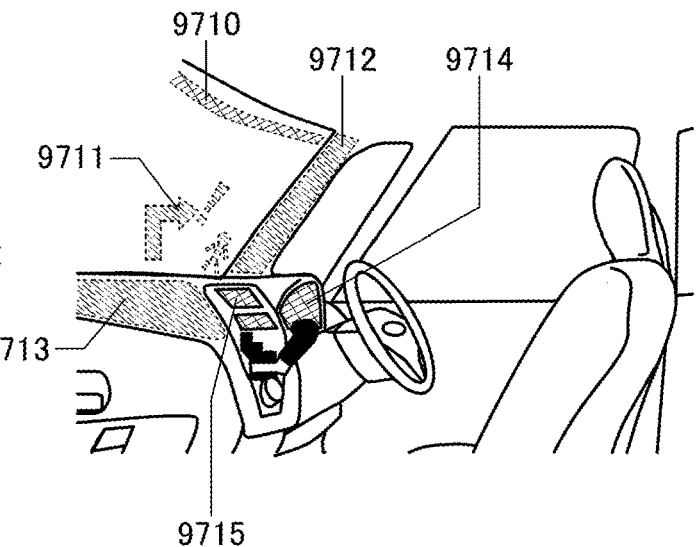

FIG. 34A is an external view of an automobile 9700. FIG. 34B illustrates a driver's seat of the automobile 9700. The automobile 9700 includes a car body 9701, wheels 9702, a dashboard 9703, lights 9704, and the like. The display device or the input/output device of one embodiment of the present invention can be used in a display portion or the like of the automobile 9700. For example, the display device or the input/output device of one embodiment of the present invention can be used in display portions 9710 to 9715 illustrated in FIG. 34B.

The display portion 9710 and the display portion 9711 are display devices or input/output devices provided in an automobile windshield. The display device or input/output device of one embodiment of the present invention can be a see-through display device or input/output device, through which the opposite side can be seen, by using a light-transmitting conductive material for its electrodes. Such a see-through display device or input/output device does not hinder driver's vision during the driving of the automobile 9700. Therefore, the display device or input/output device of one embodiment of the present invention can be provided in the windshield of the automobile 9700. Note that in the case where a transistor or the like for driving the display device or input/output device is provided in the display device or input/output device, a transistor having light-transmitting properties, such as an organic transistor using an organic semiconductor material or a transistor using an oxide semiconductor, is preferably used.

The display portion 9712 is a display device or an input device provided on a pillar portion. For example, an image taken by an imaging unit provided in the car body is displayed on the display portion 9712, whereby the view hindered by the pillar portion can be compensated. The display portion 9713 is a display device or an input device provided on the dashboard. For example, an image taken by an imaging unit provided in the car body is displayed on the display portion 9713, whereby the view hindered by the dashboard can be compensated. That is, by displaying an image taken by an imaging unit provided on the outside of the automobile, blind areas can be eliminated and safety can be increased. Displaying an image to compensate for the area which a driver cannot see makes it possible for the driver to confirm safety easily and comfortably.

Figure 34C:
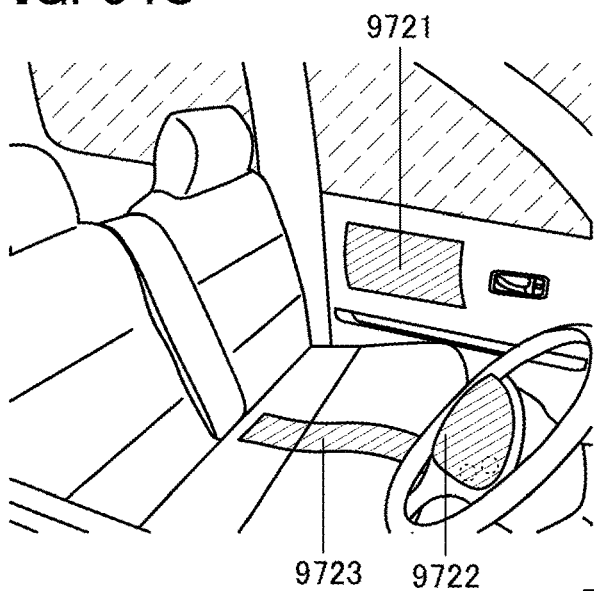

FIG. 34C illustrates the inside of a car in which a bench seat is used as a driver seat and a front passenger seat. A display portion 9721 is a display device or input/output device provided in a door portion. For example, the display portion 9721 can compensate for the view hindered by the door portion by showing an image taken by an imaging unit provided on the car body. A display portion 9722 is a display device or input/output device provided in a steering wheel. A display portion 9723 is a display device or input/output device provided in the middle of a seating face of the bench seat. Note that the display device or input/output device can be used as a seat heater by providing the display device or input/output device on the seating face or backrest and by using heat generated by the display device or input/output device as a heat source.

The display portion 9714, the display portion 9715, and the display portion 9722 can provide a variety of kinds of information such as navigation data, a speedometer, a tachometer, a mileage, a fuel meter, a gearshift indicator, and air-condition setting. The content, layout, or the like of the display on the display portions can be changed freely by a user as appropriate. The information listed above can also be displayed on the display portions 9710 to 9713, 9721, and 9723. The display portions 9710 to 9715 and 9721 to 9723 can also be used as lighting devices. The display portions 9710 to 9715 and 9721 to 9723 can also be used as heating devices.

The display portions each including the display device or input/output device of one embodiment of the present invention can be flat, in which case the display device or input/output device of one embodiment of the present invention does not necessarily have a curved surface or flexibility.

Figure 34D:
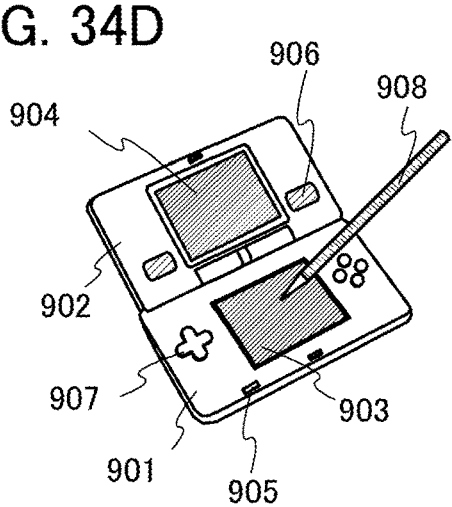

FIG. 34D illustrates a portable game machine including a housing 901, a housing 902, a display portion 903, a display portion 904, a microphone 905, a speaker 906, an operation button 907, a stylus 908, and the like.

The portable game machine illustrated in FIG. 34D includes two display portions 903 and 904. Note that the number of display portions of an electronic device of one embodiment of the present invention is not limited to two and can be one or three or more as long as at least one display portion includes the display device or input/output device of one embodiment of the present invention.

Figure 34E:
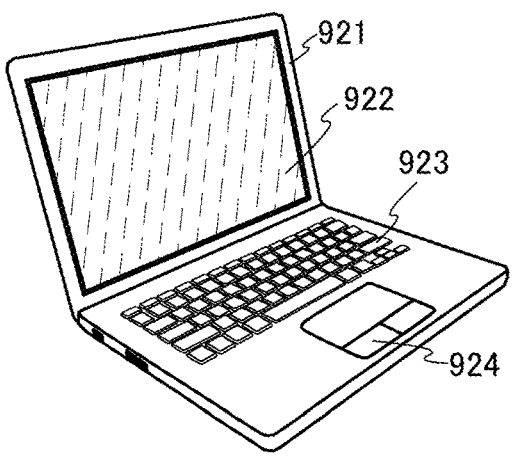

FIG. 34E illustrates a laptop personal computer, which includes a housing 921, a display portion 922, a keyboard 923, a pointing device 924, and the like.

The display device or input/output device of one embodiment of the present invention can be used in the display portion 922.

Figure 35A:
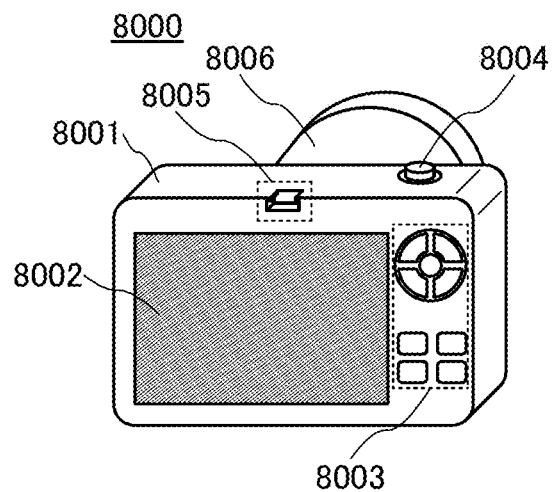
FIGS. 35A to 35C illustrate examples of electronic devices of one embodiment.

FIG. 35A is an external view of a camera 8000. The camera 8000 includes a housing 8001, a display portion 8002, an operation button 8003, a shutter button 8004, and a connection portion 8005. A lens 8006 can be put on the camera 8000.

The connection portion 8005 includes an electrode to connect with a finder 8100, which is described below, a stroboscope, or the like.

Although the lens 8006 of the camera 8000 here is detachable from the housing 8001 for replacement, the lens 8006 may be included in a housing.

Images can be taken at a touch of the shutter button 8004. In addition, images can be taken at a touch of the display portion 8002 which serves as a touch panel.

The display device or input/output device of one embodiment of the present invention can be used in the display portion 8002.

Figure 35B:
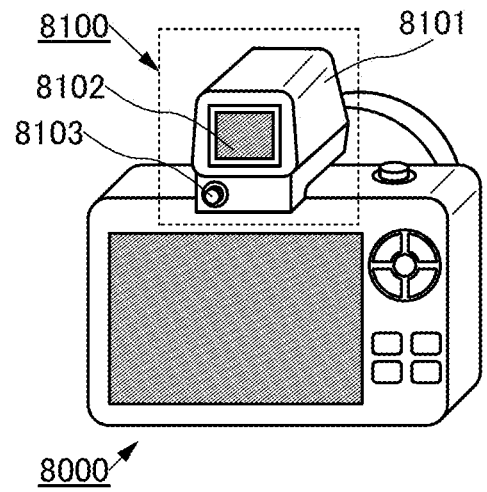

FIG. 35B shows the camera 8000 with the finder 8100 connected.

The finder 8100 includes a housing 8101, a display portion 8102, and a button 8103.

The housing 8101 includes a connection portion for the connection portion 8005 of the camera 8000, and the finder 8100 can be connected to the camera 8000. The connection portion includes an electrode, and an image or the like received from the camera 8000 through the electrode can be displayed on the display portion 8102.

The button 8103 has a function of a power button, and the display portion 8102 can be turned on and off with the button 8103.

The display device or input/output device of one embodiment of the present invention can be used in the display portion 8102.

Although the camera 8000 and the finder 8100 are separate and detachable electronic devices in FIGS. 35A and 35B, the housing 8001 of the camera 8000 may include a finder having the display device or input/output device of one embodiment of the present invention.

Figure 35C:
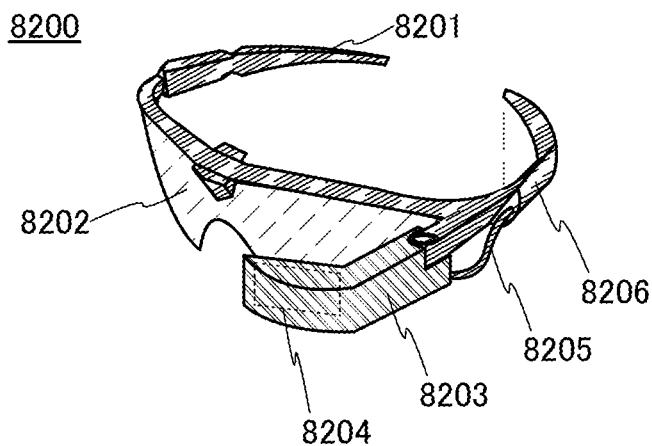

FIG. 35C illustrates an external view of a head-mounted display 8200.

The head-mounted display 8200 includes a mounting portion 8201, a lens 8202, a main body 8203, a display portion 8204, a cable 8205, and the like. The mounting portion 8201 includes a battery 8206.

Power is supplied from the battery 8206 to the main body 8203 through the cable 8205. The main body 8203 includes a wireless receiver or the like to receive video data, such as image data, and display it on the display portion 8204. In addition, the movement of the eyeball and the eyelid of a user can be captured by a camera in the main body 8203 and then coordinates of the points the user looks at can be calculated based on the captured data to utilize the eye point of the user as an input means.

The mounting portion 8201 may include a plurality of electrodes that are to be in contact with the user. The main body 8203 may be configured to sense current flowing through the electrodes with the movement of the user's eyeball to recognize the location of his/her eye. The main body 8203 may be configured to sense current flowing through the electrodes to monitor the user's pulse. The mounting portion 8201 may include sensors, such as a temperature sensor, a pressure sensor, or an acceleration sensor and display the user's biological information on the display portion 8204. The main body 8203 may be configured to sense the movement of the user's head to move an image displayed on the display portion 8204 in synchronization with the movement of the user's head.

The display device or input/output device of one embodiment of the present invention can be used in the display portion 8204.

At least part of this embodiment can be implemented in combination with any of the embodiments described in this specification as appropriate.

This application is based on Japanese Patent Application serial no. 2014-212646 filed with Japan Patent Office on Oct. 17, 2014, the entire contents of which are hereby incorporated by reference.

What is claimed is:

1. A display device comprising:
   a display portion including a plurality of transistors, a plurality of organic EL elements, and a scan line; and
   a capacitive touch sensor over the display portion, the capacitive touch sensor including a first conductive layer and a second conductive layer,
   wherein:
     the scan line is electrically connected to the plurality of transistors,
     the first conductive layer has a lattice shape with a plurality of openings,
     one of the plurality of organic EL elements emitting blue light is in one of the plurality of openings in a plan view,
     the lattice shape has a linear portion,
     an angle between a first extending direction of the linear portion of the lattice shape and a second extending direction of the scan line is greater than or equal to 30° and smaller than or equal to 60°, and
     in a plan view of the display portion, a line connecting two diagonally-opposed corners of the one of the plurality of openings of the first conductive layer is aligned with a line connecting two diagonally-opposed corners of the one of the plurality of organic EL elements emitting blue light and is substantially parallel to the second extending direction.

2. The display device according to claim 1, wherein the angle between the first extending direction of the linear portion of the lattice shape and the second extending direction of the scan line is greater than or equal to 40° and smaller than or equal to 50°.

3. The display device according to claim 1, wherein the angle between the first extending direction of the linear portion of the lattice shape and the second extending direction of the scan line is greater than or equal to 42° and smaller than or equal to 48°.

4. The display device according to claim 1, wherein in a plan view of the display portion, two of the plurality of organic EL elements positioned along a horizontal direction, each emitting blue light, and two of the plurality of organic EL elements positioned along a vertical direction, each emitting blue light, are adjacent to one of the plurality of organic EL elements emitting red light, with no intervening other ones of the plurality of organic EL elements.

5. The display device according to claim 1, wherein in a plan view of the display portion, a line connecting two diagonally-opposed corners of the one of the plurality of openings of the first conductive layer is aligned with a line connecting two diagonally-opposed corners of one of the plurality of organic EL elements emitting red light.

6. A display device comprising:
   a display portion including a plurality of transistors, a plurality of organic EL elements, and a scan line; and
   a capacitive touch sensor over the display portion, the capacitive touch sensor including a first conductive layer and a second conductive layer,
   wherein:
     the scan line is electrically connected to the plurality of transistors, the first conductive layer has a lattice shape with a plurality of openings, one of the plurality of organic EL elements emitting blue light is in one of the plurality of openings in a plan view, the lattice shape of the first conductive layer has a first linear portion, the one of the plurality of organic EL elements has a second linear portion, a first angle between a first extending direction of the first linear portion and a second extending direction of the scan line is greater than or equal to 30° and smaller than or equal to 60°, a second angle between a third extending direction of the second linear portion and the second extending direction of the scan line is greater than or equal to 30° and smaller than or equal to 60°, and in a plan view of the display portion, a line connecting two diagonally-opposed corners of the one of the plurality of openings of the first conductive layer is aligned with a line connecting two diagonally-opposed corners of the one of the plurality of organic EL elements emitting blue light and substantially parallel to the second extending direction.

7. The display device according to claim 6, wherein the first angle and the second angle are each greater than or equal to 40° and smaller than or equal to 50°.

8. The display device according to claim 6, wherein the first angle and the second angle are each greater than or equal to 42° and smaller than or equal to 48°.

9. The display device according to claim 6, wherein in a plan view of the display portion, two of the plurality of organic EL elements positioned along a horizontal direction, each emitting blue light, and two of the plurality of organic EL elements positioned along a vertical direction, each emitting blue light, are adjacent to one of the plurality of organic EL elements emitting red light, with no intervening other ones of the plurality of organic EL elements.

10. The display device according to claim 6, wherein in a plan view of the display portion, a line connecting two diagonally-opposed corners of the first conductive layer is aligned with a line connecting two diagonally-opposed corners of one of the plurality of organic EL elements emitting red light.

11. A display device comprising:
a display portion including a plurality of transistors, a plurality of organic EL elements, and a scan line; and
a capacitive touch sensor over the display portion, the capacitive touch sensor including a first conductive layer and a second conductive layer, wherein:
the first conductive layer has a lattice shape with a plurality of openings,
one of the plurality of organic EL elements emitting blue light is in one of the plurality of openings in a plan view, and
in a plan view of the display portion, a line connecting two diagonally-opposed corners of the one of the plurality of openings of the first conductive layer is aligned with a line connecting two diagonally-opposed corners of the one of the plurality of organic EL elements emitting blue light and is substantially parallel to an extending direction of the scan line.

12. The display device according to claim 11, wherein in a plan view of the display portion, two of the plurality of organic EL elements positioned along a horizontal direction, each emitting blue light, and two of the plurality of organic EL elements positioned along a vertical direction, each emitting blue light, are adjacent to one of the plurality of organic EL elements emitting red light, with no intervening other ones of the plurality of organic EL elements.

13. The display device according to claim 11, wherein in a plan view of the display portion, a line connecting two diagonally-opposed corners of the one of the plurality of openings of the first conductive layer is aligned with a line connecting two diagonally-opposed corners of one of the plurality of organic EL elements emitting red light.

* * * * *